US010121065B2

(12) United States Patent
Ota et al.

(10) Patent No.: US 10,121,065 B2
(45) Date of Patent: *Nov. 6, 2018

(54) ATHLETIC ATTRIBUTE DETERMINATIONS FROM IMAGE DATA

(71) Applicant: NIKE Inc., Beaverton, OR (US)

(72) Inventors: Jeffrey Ota, Beaverton, OR (US);
Vikram Malhotra, Portland, OR (US);
Jay Meschter, Beaverton, OR (US);
James Molyneux, Beaverton, OR (US);
Kristopher L. Homsi, Beaverton, OR (US); Paul Winsper, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/773,946

(22) PCT Filed: Mar. 14, 2014

(86) PCT No.: PCT/US2014/027519
§ 371 (c)(1),
(2) Date: Sep. 9, 2015

(87) PCT Pub. No.: WO2014/152601
PCT Pub. Date: Sep. 25, 2014

(65) Prior Publication Data
US 2016/0125234 A1  May 5, 2016

Related U.S. Application Data

(60) Provisional application No. 61/783,328, filed on Mar. 14, 2013, provisional application No. 61/908,585, filed on Nov. 25, 2013.

(51) Int. Cl.
*G06K 9/00* (2006.01)
*G06T 7/20* (2017.01)
*G06K 9/62* (2006.01)

(52) U.S. Cl.
CPC ..... *G06K 9/00342* (2013.01); *G06K 9/00624* (2013.01); *G06K 9/6267* (2013.01);
(Continued)

(58) Field of Classification Search
None
See application file for complete search history.

(56) References Cited

U.S. PATENT DOCUMENTS 5,627,915 A * 5/1997 Rosser ............... G06K 9/6282
382/219
5,788,283 A * 8/1998 Adler ..................... B42F 5/00
281/38

(Continued)

FOREIGN PATENT DOCUMENTS

CN  101779199 A  7/2010
CN  102763395 A  10/2012
(Continued)

OTHER PUBLICATIONS

Igor Faynberg et al: "On dynamic access control in Web 2.0 and beyond: Trends and Technologies", Bell Labs Technical Journey, vol. 16, No. 2, Sep. 1, 2011.
(Continued)

Primary Examiner — Shervin Nakhjavan
(74) Attorney, Agent, or Firm — Banner & Witcoff, Ltd.

(57) ABSTRACT

Systems and methods for determining athletic attributes are disclosed. Aspects of this disclosure relate to determining athletic attributes of an athlete from image data. One or more determinations may be based alterations of image data between different images, such as alterations in pixels rep-
(Continued)

resenting objects or portions of objects. Image data may be utilized to determine whether certain thresholds are met. Various threshold levels may be applied to one or more objects represented in the image data. Landmarks/distance calibrations may be utilized from time-stamped image data to allow for precise measuring of performance (including, but not limited to: sprint or agility times, flight time for vertical jump, distance for throws). Data retrieved or derived from the image data may be used in scoring and/or ranking athletes. Such data may be used to provide training advice or regimes to the athletes or other individuals, such as coaches or trainers.

20 Claims, 18 Drawing Sheets

(52) U.S. Cl.
CPC ...... *G06T 7/20* (2013.01); *G06T 2207/10016* (2013.01); *G06T 2207/30196* (2013.01); *G06T 2207/30221* (2013.01)

(56) References Cited

U.S. PATENT DOCUMENTS

| | | | |
|---|---|---|---|
| 6,707,487 B1* | 3/2004 | Aman | A63B 24/0003 348/169 |
| 6,710,713 B1* | 3/2004 | Russo | A63B 24/0021 340/573.1 |
| 7,018,211 B1 | 3/2006 | Birkholzer et al. | |
| 8,024,784 B1 | 9/2011 | Issa | |
| 8,292,788 B2 | 10/2012 | Chapa, Jr. et al. | |
| 2005/0285877 A1 | 12/2005 | Dengler et al. | |
| 2006/0022833 A1 | 2/2006 | Ferguson et al. | |
| 2006/0133173 A1 | 6/2006 | Jain et al. | |
| 2007/0033068 A1 | 2/2007 | Rao et al. | |
| 2007/0082729 A1* | 4/2007 | Letovsky | A63F 13/10 463/23 |
| 2007/0135264 A1 | 6/2007 | Rosenberg | |
| 2007/0260482 A1 | 11/2007 | Nurmela et al. | |
| 2007/0293370 A1 | 12/2007 | Klingler | |
| 2008/0038702 A1 | 2/2008 | Choquet | |
| 2008/0146416 A1 | 6/2008 | Mueller et al. | |
| 2009/0147025 A1* | 6/2009 | Grigsby | A63B 24/0021 345/633 |
| 2009/0220124 A1 | 9/2009 | Siegel | |
| 2009/0298649 A1 | 12/2009 | Dyer et al. | |
| 2009/0299232 A1 | 12/2009 | Lanfermann et al. | |
| 2010/0009750 A1 | 1/2010 | Egozy et al. | |
| 2010/0011425 A1 | 1/2010 | Eyal | |
| 2010/0022351 A1 | 1/2010 | Lanfermann et al. | |
| 2010/0076347 A1 | 3/2010 | McGrath et al. | |
| 2010/0184564 A1 | 7/2010 | Molyneux et al. | |
| 2010/0235641 A1 | 9/2010 | Hickmott et al. | |
| 2010/0280418 A1 | 11/2010 | Klose | |
| 2011/0098928 A1* | 4/2011 | Hoffman | A63B 24/0062 702/5 |
| 2011/0183307 A1 | 7/2011 | Shum et al. | |
| 2011/0191697 A1 | 8/2011 | Sumner et al. | |
| 2011/0202988 A1 | 8/2011 | Otranen et al. | |
| 2011/0209221 A1 | 8/2011 | Hanson et al. | |
| 2011/0230274 A1 | 9/2011 | Lafortune et al. | |
| 2011/0281638 A1 | 11/2011 | Bansi et al. | |
| 2012/0053015 A1 | 3/2012 | Esaki et al. | |
| 2012/0116550 A1 | 5/2012 | Hoffman et al. | |
| 2012/0139731 A1 | 6/2012 | Razoumov et al. | |
| 2012/0142436 A1 | 6/2012 | Sato | |
| 2012/0183940 A1 | 7/2012 | Aragones et al. | |
| 2012/0259652 A1 | 10/2012 | Mallon et al. | |
| 2012/0277891 A1 | 11/2012 | Aragones et al. | |
| 2012/0283016 A1 | 11/2012 | Persaud et al. | |
| 2012/0290109 A1 | 11/2012 | Engelberg et al. | |
| 2012/0296235 A1 | 11/2012 | Rupp et al. | |
| 2012/0296455 A1 | 11/2012 | Ohnemus et al. | |
| 2013/0028489 A1* | 1/2013 | Tracton | G06K 9/228 382/128 |
| 2013/0072353 A1 | 3/2013 | Alessandri et al. | |
| 2013/0083009 A1* | 4/2013 | Geisner | A63F 13/02 345/419 |
| 2013/0085713 A1 | 4/2013 | Rogel et al. | |
| 2013/0110832 A1 | 5/2013 | Wood et al. | |
| 2013/0188809 A1 | 7/2013 | Jones et al. | |
| 2013/0196822 A1 | 8/2013 | Watterson et al. | |
| 2013/0204410 A1 | 8/2013 | Napolitano | |
| 2013/0223707 A1 | 8/2013 | Stephenson | |
| 2013/0266918 A1* | 10/2013 | Tinjust | A63B 69/0053 434/247 |
| 2013/0316316 A1 | 11/2013 | Flavell et al. | |
| 2013/0337828 A1 | 12/2013 | Fink | |
| 2014/0282105 A1 | 9/2014 | Nordstrom | |
| 2016/0027325 A1* | 1/2016 | Malhotra | G06F 19/3481 434/252 |

FOREIGN PATENT DOCUMENTS

| | | |
|---|---|---|
| JP | 2002334056 A | 11/2002 |
| JP | 2004021599 A | 1/2004 |
| JP | 2005321970 A | 11/2005 |
| JP | 2006119769 A | 5/2006 |
| JP | 2008009607 A | 1/2008 |
| JP | 2010282460 A | 12/2010 |
| JP | 2011227884 A | 11/2011 |
| JP | 2012173801 A | 9/2012 |
| JP | 2013041550 A | 2/2013 |
| WO | 2009101443 A2 | 8/2009 |
| WO | 2012155279 A2 | 11/2012 |

OTHER PUBLICATIONS

Hardt D et al: "The OAuth 2.0 Authorization Framwork: rfc6749. text", Internet Engineering Task Force, pp. 1-76, Oct. 13, 2013.
Nov. 12, 2014—(WO) ISR App. No. PCT/US14/054336.
Jean-Marc Pelletier: "Sonified Motion Flow Fields as a Means of Musical Expression", 8th International Conference New Interfaces for Musical Expression, Jun. 5, 2008.
Jun. 15, 2014—(WO) ISR—App. No. PCT/US2014/027519.
Mar. 11, 2014—(WO) International Search Report PCT/US2014/040351.

* cited by examiner

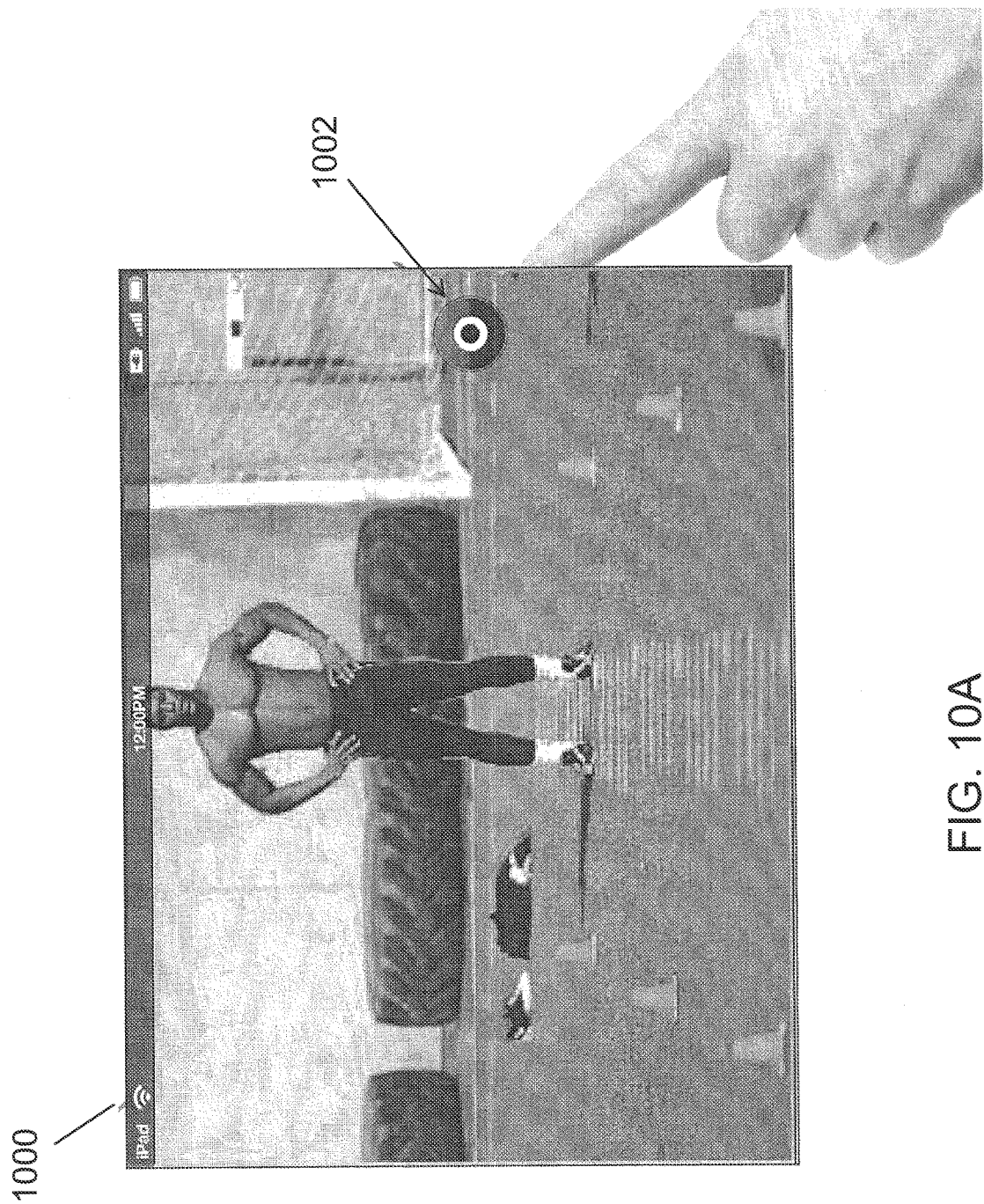

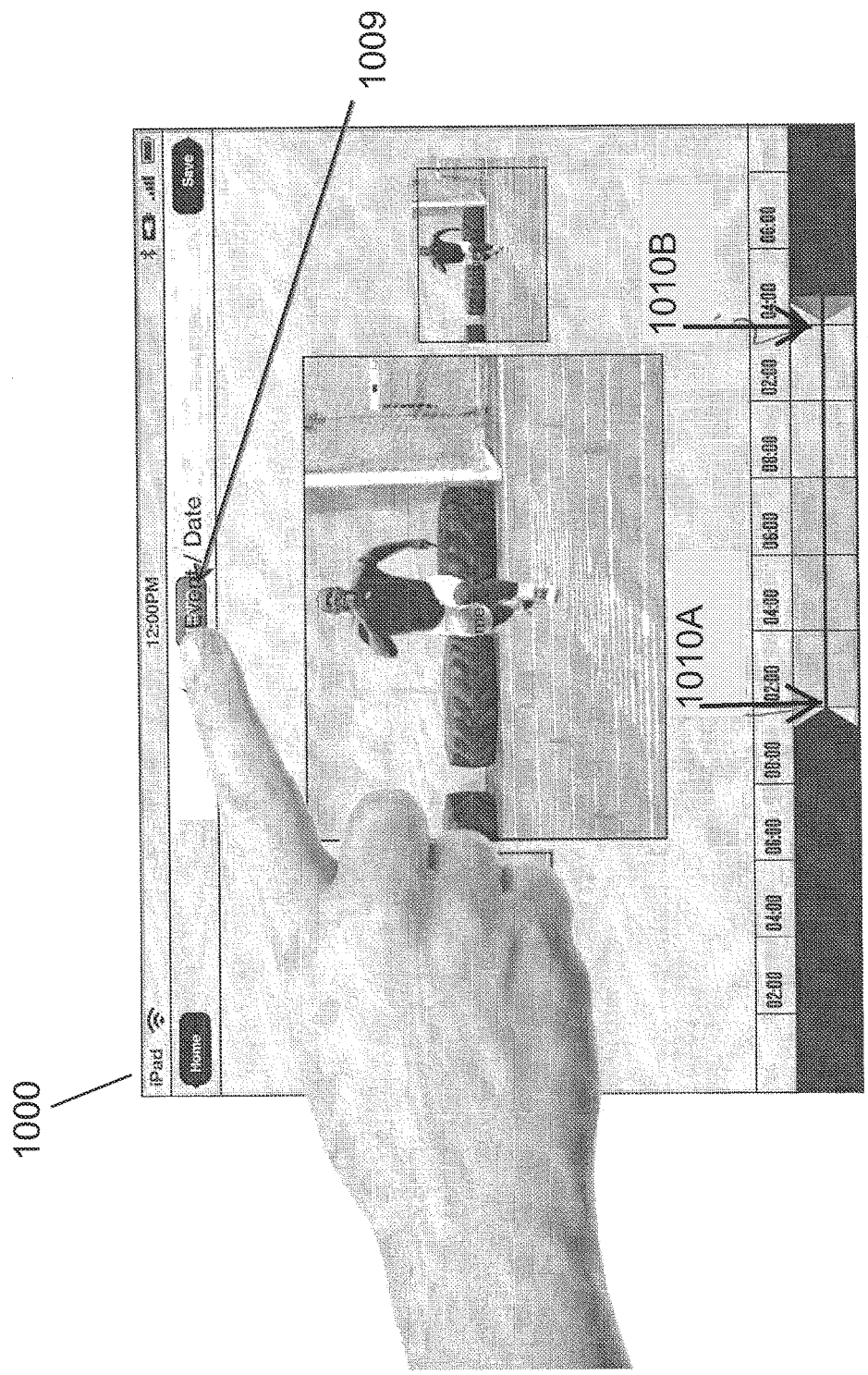

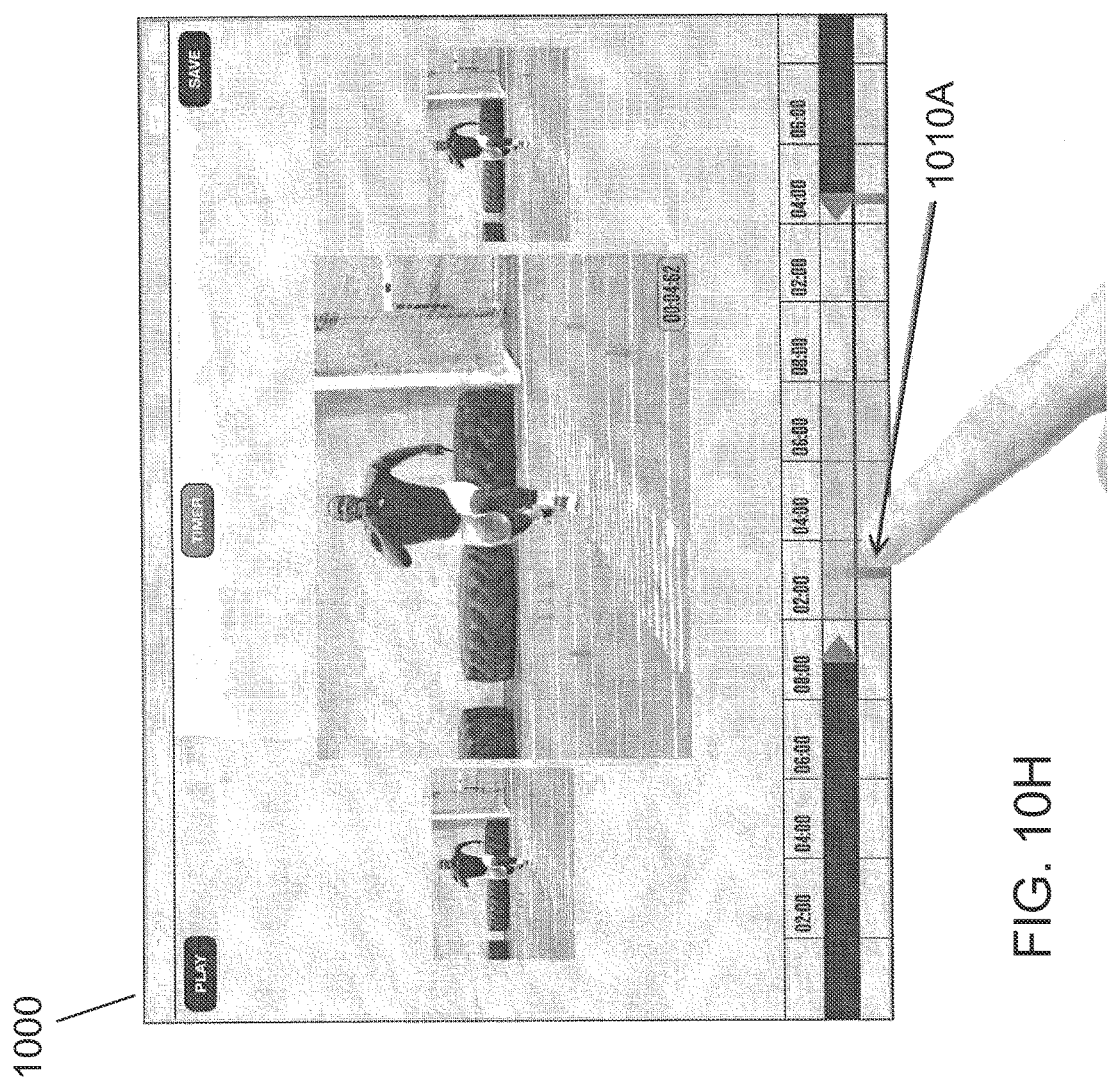

ATHLETIC ATTRIBUTE DETERMINATIONS FROM IMAGE DATA

CROSS REFERENCE TO RELATED APPLICATIONS

This application claims the benefit of U.S. Provisional Application Ser. No. 61/783,328, entitled "Athletic Attribute Determinations from Image Data," filed Mar. 14, 2013, and U.S. Provisional Application Ser. No. 61/908,585, entitled "Athletic Attribute Determinations from Image Data," filed Nov. 25, 2013, each of which are incorporated by reference in their entirety in this application.

BACKGROUND

Athletes, both amateur and professional, often desire to improve their performance for a particular sport or athletic activity. In addition to improving physical prowess, athletes may see large sport-specific improvements with drills directed towards vision, reaction time, or other abilities. Improper use of equipment or devices may actually lower athletic performance. Similarly, incorrectly administering drills or routines can also prevent the athlete to be properly trained and/or lead to a false conclusion that an athlete is not performing to threshold level.

Many athletes and trainers, therefore, are often unable to accurately determine athletic attributes and performance levels of the athlete. This causes difficulty in training the athlete as well as accurately comparing the athlete's performance to others. Existing options include requiring the athlete to travel to a specific location (often hundreds of miles away) to a specific facility on a specific date to conduct a series of drills that will permit a more accurate determination of their abilities and performance level. Unfortunately, the athlete may not be able to afford the trip and/or be available on the specific date. Additionally, the athlete may have a sub-par performance on one day and thus be considered well-below their actual performance level. This often leads to athletes not attending these events, and as such, continue to misjudge their performance of specific activities and drills. Therefore, despite heavy training, the athlete may not be improving in the proper areas in an efficient manner.

Therefore, in view of the foregoing, improved systems and methods are desirable. Aspects of this disclosure are directed towards novel systems and methods that address one or more of these deficiencies. Further aspects relate to minimizing other shortcomings in the art.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure relate to processing of data taken while a user performs an athletic activity to determine athletic attributes. Image data, such as video, of an athlete performing physical activity may be utilized to determine one or more attributes. In certain embodiments, a triggering event may be used to instruct or prompt the athlete to perform a predefined physical activity. Whether to implement a triggering event and/or what trigger(s) may be utilized as part of the triggering event may depend on the physical activity, location of the trigger and/or user, a user input, predefined computer-executable instructions located on a non-transitory computer-readable medium, or combinations thereof. A trigger flag associated with the timing of the triggering event may be correlated with corresponding image data.

Further aspects of this disclosure relate to processing image data of the athlete performing the physical activity. Image data may be processed to determine whether one or more movements of objects represented by image data meet a threshold criterion. Exemplary criterion may include a movement criterion and a movement quality criterion. In one embodiment, a first criterion may serve as a filter that identifies certain images that may be of interest and the second criterion may further identifies what data within this group fits a more stringent criteria. In yet another embodiment, the first and second criteria may be independent. A first threshold may detect whether a first body portion moved. The selection and/or utilization of the one or more portions of the athlete's body represented within the image data may be based on the predetermined physical activity, user input, historical data, and combinations thereof among others.

One or more image capturing devices may capture images at different or variable frame rates. For example, an image capturing device may capture images at a variable rate between 30-240 frames per second (fps). Therefore, determinations of movement (and/or movement quality) may utilize rate of capture information to accurately determine time intervals between frames of data that may be separated by uneven periods of time.

In certain implementations, landmarks/distance calibrations may be utilized from time-stamped image data to allow for precise measuring of performance. For example, objects represented by image data may be utilized to determine whether movement thresholds are met. For example, markings on a field (such as yard lines) may be used to calibrate distance measurements. In certain embodiments, objects may be identified and upon identification, used in calibration processes. Such calibration techniques are not limited to stationary objects. In certain embodiments, the predetermined physical activity may be used (either in whole or in part) to select which body portion(s) are utilized and/or whether the movement of the portion(s)—as represented within the captured image data—meet a threshold. In certain embodiments, systems and methods may be implemented that utilize a different body portion based upon characteristics of the image data.

The image data utilized for identifying thresholds and determinations relating to whether thresholds are met may be adjusted. For example, different angles or perspectives may allow different metrics to be used. Similarly quality of different images may warrant different approaches to be taken. In one embodiment, at least a portion of the image data may be processed to identify an initiation image, which may be the image in which the athlete first moves and/or the image in which a game or activity is initiated, regardless of whether the user moves.

A performance attribute of the athlete may be determined from the threshold information as well as other image-derived data. As one example, an initiation image (alone or in combination with another image) may be used to determine at least one performance attribute of the athlete. Example attributes may include, but are not limited to: speed, reaction, endurance, and combinations thereof.

A physical activity duration based upon the initiation image and a completion image may be calculated. Such information may be used to determine velocity, acceleration, tempo, pace, or a combination thereof. Determinations of an attribute may utilize data obtained from one or more sensors other that are not used to capture the image data. Further, alterations of the image data responsive to external stimuli may be considered.

Further aspects may be utilized to calculate an athletic rating of the user. In certain embodiments, a rating may be a sport-specific athletic rating. For example, a single athlete may have a different rating for football and running rating score.

These and other aspects of the embodiments are discussed in greater detail throughout this disclosure, including the accompanying drawings.

BRIEF DESCRIPTION OF THE DRAWINGS

The present disclosure is illustrated by way of example and not limited in the accompanying figures in which like reference numerals indicate similar elements and in which:

FIGS. 10A-10I show example user interfaces (UI) that may be used in association with example embodiments. Specifically, FIG. 10A shows an example UI An example UI configured to permit a user to capture image data at one or more frame rates; FIG. 10B shows a UI with a user-selectable element configured to permit the selection of a different frame rate; FIG. 10C shows a UI element being altered based upon an interaction with another element of the UI or a function of the UI being enabled; FIG. 10D shows an example implementation of ceasing the capturing of image data from an example UI in accordance with one embodiment; FIG. 10E shows an example UI in which captured images captured at two or more frame rates may be associated with a timeline; FIG. 10F is an example UI that comprises one or more markers for marking boundaries of sequential images; FIG. 10G shows example timer markers that may be provided on a UI upon activation of a timer element in accordance with one embodiment; FIG. 10H shows example slider elements that may be adjusted to indicate positions of images data in relation to the timing function; and FIG. 10I shows an example output of image data comprising image data obtained at two or more frame rates and further includes an indication of time overlaid on the image data.

DETAILED DESCRIPTION

Aspects of this disclosure relate to determining athletic attributes of an athlete from image data. One or more determinations may be based alterations of image data between different images (or frames), such as alterations in pixels representing objects or portions of objects. Image data may be utilized to determine whether certain thresholds are met. Various threshold levels may be applied to one or more objects represented in the image data. In certain implementations, an athlete's performance of a physical activity, such as for example, a sprint or agility drill, or battery of field-based tests, may be analyzed according to image data. In certain implementations, landmarks/distance calibrations may be utilized from time-stamped image data to allow for precise measuring of performance (including, but not limited to: sprint or agility times, flight time for vertical jump, distance for throws). Data retrieved or derived from the image data may be used in scoring and/or ranking athletes. Such data may be used to provide training advice or regimes to the athletes or other individuals, such as coaches or trainers.

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made without departing from the scope and spirit of the present disclosure. Further, headings within this disclosure should not be considered as limiting aspects of the disclosure. Those skilled in the art with the benefit of this disclosure will appreciate that the example embodiments are not limited to the example headings.

Aspects of this disclosure involve obtaining, storing, and/or processing athletic data relating to the physical movements of an athlete. The athletic data may be actively or passively sensed and/or stored in one or more non-transitory storage mediums. Still further aspects relate to using athletic data to generate an output, such as for example, calculated athletic attributes, feedback signals to provide guidance, and/or other information. These and other aspects will be discussed in the context of the following illustrative examples of a personal training system.

I. Example Personal Training System

A. Illustrative Networks

Figure 1:
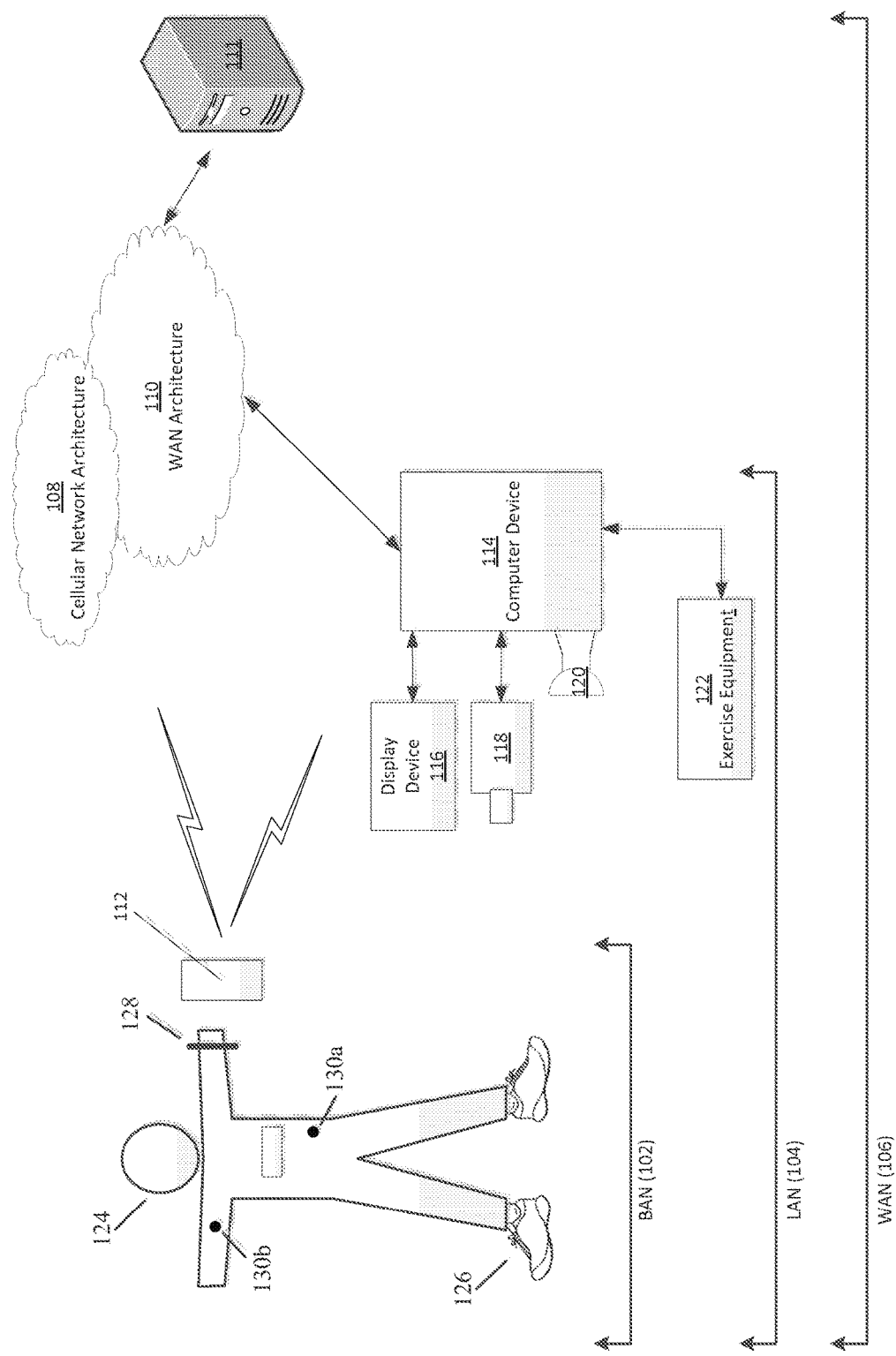
FIG. 1 illustrates an example of a system that may be configured to provide personal training and/or obtain data from the physical movements of a user in accordance with example embodiments.

Aspects of this disclosure relate to systems and methods that may be utilized across a plurality of networks. In this regard, certain embodiments may be configured to adapt to dynamic network environments. Further embodiments may be operable in differing discrete network environments. FIG. 1 illustrates an example of a personal training system 100 in accordance with example embodiments. Example system 100 may include one or more interconnected networks, such as the illustrative body area network (BAN) 102, local area network (LAN) 104, and wide area network (WAN) 106. As shown in FIG. 1 (and described throughout this disclosure), on or more networks (e.g., BAN 102, LAN 104, and/or WAN 106), may overlap or otherwise be inclusive of each other. Those skilled in the art will appreciate that the illustrative networks 102-106 are logical networks that may each comprise one or more different communication protocols and/or network architectures and yet may be configured to have gateways to each other or other networks. For example, each of BAN 102, LAN 104 and/or WAN 106 may be operatively connected to the same physical network architecture, such as cellular network architecture 108 and/or WAN architecture 110. For example, portable electronic device 112, which may be considered a component of both BAN 102 and LAN 104, may comprise a network adapter or network interface card (NIC) configured to translate data and control signals into and from network messages according to one or more communication protocols, such as the Transmission Control Protocol (TCP), the Internet Protocol (IP), and the User Datagram Protocol (UDP) through one or more of architectures 108 and/or 110. These protocols are well known in the art, and thus will not be discussed here in more detail.

Network architectures 108 and 110 may include one or more information distribution network(s), of any type(s) or topology(s), alone or in combination(s), such as for example, cable, fiber, satellite, telephone, cellular, wireless, etc. and as such, may be variously configured such as having one or more wired or wireless communication channels (including but not limited to: WiFi®, Bluetooth®, Near-Field Communication (NFC) and/or ANT technologies). Thus, any device within a network of FIG. 1, (such as portable electronic device 112 or any other device described herein) may be considered inclusive to one or more of the different logical networks 102-106. With the foregoing in mind, example components of an illustrative BAN and LAN (which may be coupled to WAN 106) will be described.

I. Example Local Area Network

LAN 104 may include one or more electronic devices, such as for example, computer device 114. Computer device 114, or any other component of system 100, may comprise a mobile terminal, such as a telephone, music player, tablet, netbook or any portable device. In other embodiments, computer device 114 may comprise a media player or recorder, desktop computer, server(s), a gaming console, such as for example, a Microsoft® XBOX, Sony® Playstation, and/or a Nintendo® Wii gaming consoles. Those skilled in the art will appreciate that these are merely example devices for descriptive purposes and this disclosure is not limited to any console or computing device.

Figure 2:
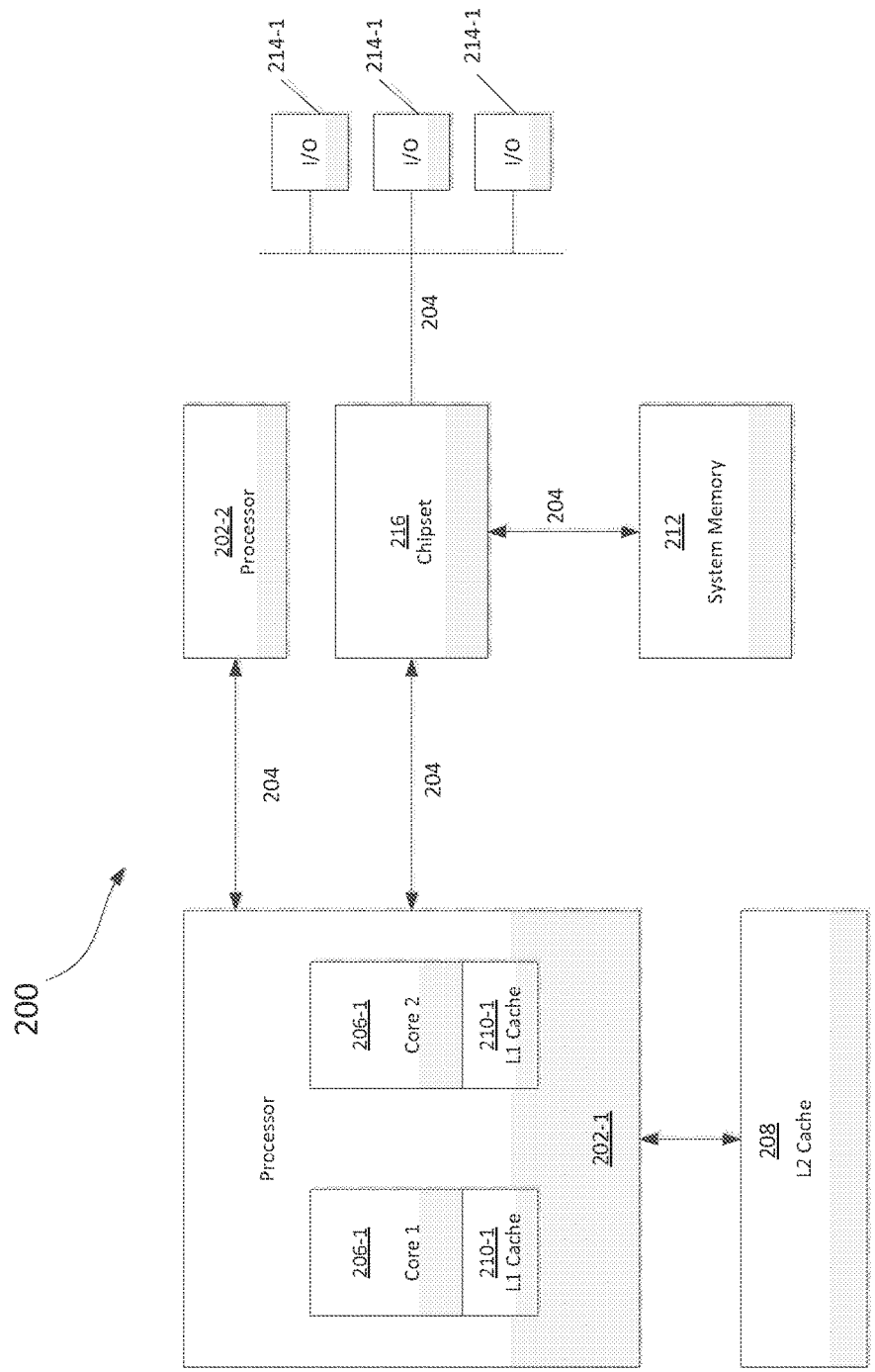
FIG. 2 illustrates an example computer device that may be part of or in communication with the system of FIG. 1.

Those skilled in the art will appreciate that the design and structure of computer device 114 may vary depending on several factors, such as its intended purpose. One example implementation of computer device 114 is provided in FIG. 2, which illustrates a block diagram of computing device 200. Those skilled in the art will appreciate that the disclosure of FIG. 2 may be applicable to any device disclosed herein. Device 200 may include one or more processors, such as processor 202-1 and 202-2 (generally referred to herein as "processors 202" or "processor 202"). Processors 202 may communicate with each other or other components via an interconnection network or bus 204. Processor 202 may include one or more processing cores, such as cores 206-1 and 206-2 (referred to herein as "cores 206" or more generally as "core 206"), which may be implemented on a single integrated circuit (IC) chip.

Cores 206 may comprise a shared cache 208 and/or a private cache (e.g., caches 210-1 and 210-2, respectively). One or more caches 208/210 may locally cache data stored in a system memory, such as memory 212, for faster access by components of the processor 202. Memory 212 may be in communication with the processors 202 via a chipset 216. Cache 208 may be part of system memory 212 in certain embodiments. Memory 212 may include, but is not limited to, random access memory (RAM), read only memory (ROM), and includes one or more of solid-state memory, optical or magnetic storage, and/or any other medium that can be used to store electronic information. Yet other embodiments may omit system memory 212.

System 200 may include one or more I/O devices (e.g., I/O devices 214-1 through 214-3, each generally referred to as I/O device 214). I/O data from one or more I/O devices 214 may be stored at one or more caches 208, 210 and/or system memory 212. Each of I/O devices 214 may be permanently or temporarily configured to be in operative communication with a component of system 100 using any physical or wireless communication protocol.

Returning to FIG. 1, four example I/O devices (shown as elements 116-122) are shown as being in communication with computer device 114. Those skilled in the art will appreciate that one or more of devices 116-122 may be stand-alone devices or may be associated with another device besides computer device 114. For example, one or more I/O devices may be associated with or interact with a component of BAN 102 and/or WAN 106. I/O devices 116-122 may include, but are not limited to athletic data acquisition units, such as for example, sensors. One or more I/O devices may be configured to sense, detect, and/or measure an athletic parameter from a user, such as user 124. Examples include, but are not limited to: an accelerometer, a gyroscope, a location-determining device (e.g., GPS), light (including non-visible light) sensor, temperature sensor (including ambient temperature and/or body temperature), sleep pattern sensors, heart rate monitor, image-capturing sensor, moisture sensor, force sensor, compass, angular rate sensor, and/or combinations thereof among others.

In further embodiments, I/O devices 116-122 may be used to provide an output (e.g., audible, visual, or tactile cue) and/or receive an input, such as a user input from athlete 124. Example uses for these illustrative I/O devices are provided below, however, those skilled in the art will appreciate that such discussions are merely descriptive of some of the many options within the scope of this disclosure. Further, reference to any data acquisition unit, I/O device, or sensor is to be interpreted disclosing an embodiment that may have one or more I/O device, data acquisition unit, and/or sensor disclosed herein or known in the art (either individually or in combination).

Information from one or more devices (across one or more networks) may be used (or be utilized in the formation of) a variety of different parameters, metrics or physiological characteristics including but not limited to: motion parameters, such as speed, acceleration, distance, steps taken, direction, relative movement of certain body portions or objects to others, or other motion parameters which may be expressed as angular rates, rectilinear rates or combinations thereof, physiological parameters, such as calories, heart rate, sweat detection, effort, oxygen consumed, oxygen kinetics, and other metrics which may fall within one or more categories, such as: pressure, impact forces, information regarding the athlete, such as height, weight, age, demographic information and combinations thereof.

System 100 may be configured to transmit and/or receive athletic data, including the parameters, metrics, or physiological characteristics collected within system 100 or otherwise provided to system 100. As one example, WAN 106 may comprise sever 111. Server 111 may have one or more components of system 200 of FIG. 2. In one embodiment, server 111 comprises at least a processor and a memory, such as processor 206 and memory 212. Server 111 may be configured to store computer-executable instructions on a non-transitory computer-readable medium. The instructions may comprise athletic data, such as raw or processed data collected within system 100. System 100 may be configured to transmit data, such as energy expenditure points, to a social networking website or host such a site. Server 111 may be utilized to permit one or more users to access and/or compare athletic data. As such, server 111 may be configured to transmit and/or receive notifications based upon athletic data or other information.

Returning to LAN 104, computer device 114 is shown in operative communication with a display device 116, an image-capturing device 118, sensor 120 and exercise device 122, which are discussed in turn below with reference to example embodiments. In one embodiment, display device 116 may provide audio-visual cues to athlete 124 to perform a specific athletic movement. The audio-visual cues may be provided in response to computer-executable instruction executed on computer device 114 or any other device, including a device of BAN 102 and/or WAN. Display device 116 may be a touchscreen device or otherwise configured to receive a user-input.

In one embodiment, data may be obtained from image-capturing device 118 and/or other sensors, such as sensor 120, which may be used to detect (and/or measure) athletic parameters, either alone or in combination with other devices, or stored information. Image-capturing device 118 and/or sensor 120 may comprise a transceiver device. In one embodiment sensor 128 may comprise an infrared (IR), electromagnetic (EM) or acoustic transceiver. For example, image-capturing device 118, and/or sensor 120 may transmit waveforms into the environment, including towards the direction of athlete 124 and receive a "reflection" or otherwise detect alterations of those released waveforms. Those skilled in the art will readily appreciate that signals corresponding to a multitude of different data spectrums may be utilized in accordance with various embodiments. In this regard, devices 118 and/or 120 may detect waveforms emitted from external sources (e.g., not system 100). For example, devices 118 and/or 120 may detect heat being emitted from user 124 and/or the surrounding environment. Thus, image-capturing device 126 and/or sensor 128 may comprise one or more thermal imaging devices. In one embodiment, image-capturing device 126 and/or sensor 128 may comprise an IR device configured to perform range phenomenology.

In one embodiment, exercise device 122 may be any device configurable to permit or facilitate the athlete 124 performing a physical movement, such as for example a treadmill, step machine, etc. There is no requirement that the device be stationary. In this regard, wireless technologies permit portable devices to be utilized, thus a bicycle or other mobile exercising device may be utilized in accordance with certain embodiments. Those skilled in the art will appreciate that equipment 122 may be or comprise an interface for receiving an electronic device containing athletic data performed remotely from computer device 114. For example, a user may use a sporting device (described below in relation to BAN 102) and upon returning home or the location of equipment 122, download athletic data into element 122 or any other device of system 100. Any I/O device disclosed herein may be configured to receive activity data.

2. Body Area Network

BAN 102 may include two or more devices configured to receive, transmit, or otherwise facilitate the collection of athletic data (including passive devices). Exemplary devices may include one or more data acquisition units, sensors, or devices known in the art or disclosed herein, including but not limited to I/O devices 116-122. Two or more components of BAN 102 may communicate directly, yet in other embodiments, communication may be conducted via a third device, which may be part of BAN 102, LAN 104, and/or WAN 106. One or more components of LAN 104 or WAN 106 may form part of BAN 102. In certain implementations, whether a device, such as portable device 112, is part of BAN 102, LAN 104, and/or WAN 106, may depend on the athlete's proximity to an access points permit communication with mobile cellular network architecture 108 and/or WAN architecture 110. User activity and/or preference may also influence whether one or more components are utilized as part of BAN 102. Example embodiments are provided below.

User 124 may be associated with (e.g., possess, carry, wear, and/or interact with) any number of devices, such as portable device 112, shoe-mounted device 126, wrist-worn device 128 and/or a sensing location, such as sensing location 130, which may comprise a physical device or a location that is used to collect information. One or more devices 112, 126, 128, and/or 130 may not be specially designed for fitness or athletic purposes. Indeed, aspects of this disclosure relate to utilizing data from a plurality of devices, some of which are not fitness devices, to collect, detect, and/or measure athletic data. In certain embodiments, one or more devices of BAN 102 (or any other network) may comprise a fitness or sporting device that is specifically designed for a particular sporting use. As used herein, the term "sporting device" includes any physical object that may be used or implicated during a specific sport or fitness activity. Exemplary sporting devices may include, but are not limited to: golf balls, basketballs, baseballs, soccer balls, footballs, powerballs, hockey pucks, weights, bats, clubs, sticks, paddles, mats, and combinations thereof. In further embodiments, exemplary fitness devices may include objects within a sporting environment where a specific sport occurs, including the environment itself, such as a goal net, hoop, backboard, portions of a field, such as a midline, outer boundary marker, base, and combinations thereof.

In this regard, those skilled in the art will appreciate that one or more sporting devices may also be part of (or form) a structure and vice-versa, a structure may comprise one or more sporting devices or be configured to interact with a sporting device. For example, a first structure may comprise a basketball hoop and a backboard, which may be removable and replaced with a goal post. In this regard, one or more sporting devices may comprise one or more sensors, such one or more of the sensors discussed above in relation to FIGS. 1-3, that may provide information utilized, either independently or in conjunction with other sensors, such as one or more sensors associated with one or more structures. For example, a backboard may comprise a first sensors configured to measure a force and a direction of the force by a basketball upon the backboard and the hoop may comprise a second sensor to detect a force. Similarly, a golf club may comprise a first sensor configured to detect grip attributes on the shaft and a second sensor configured to measure impact with a golf ball.

Looking to the illustrative portable device 112, it may be a multi-purpose electronic device, that for example, includes a telephone or digital music player, including an IPOD®, IPAD®, or iPhone®, brand devices available from Apple, Inc. of Cupertino, Calif. or Zune® or Microsoft® Windows devices available from Microsoft of Redmond, Wash. As known in the art, digital media players can serve as an output device, input device, and/or storage device for a computer.

Device 112 may be configured as an input device for receiving raw or processed data collected from one or more devices in BAN 102, LAN 104, or WAN 106. In one or more embodiments, portable device 112 may comprise one or more components of computer device 114. For example, portable device 112 may be include a display 116, image-capturing device 118, and/or one or more data acquisition devices, such as any of the I/O devices 116-122 discussed above, with or without additional components, so as to comprise a mobile terminal.

B. Illustrative Apparel/Accessory Sensors

In certain embodiments, I/O devices may be formed within or otherwise associated with user's 124 clothing or accessories, including a watch, armband, wristband, necklace, shirt, shoe, or the like. These devices may be configured to monitor athletic movements of a user. It is to be understood that they may detect athletic movement during user's 124 interactions with computer device 102 and/or operate independently of computer device 102 (or any other device disclosed herein). For example, one or more devices in BAN 102 may be configured to function as an-all day activity monitor that measures activity regardless of the user's proximity or interactions with computer device 102. It is to be further understood that the sensory system 302 shown in FIG. 3 and the device assembly 400 shown in FIG. 4, each of which are described in the following paragraphs, are merely illustrative examples.

i. Shoe-Mounted Device

Figure 3:
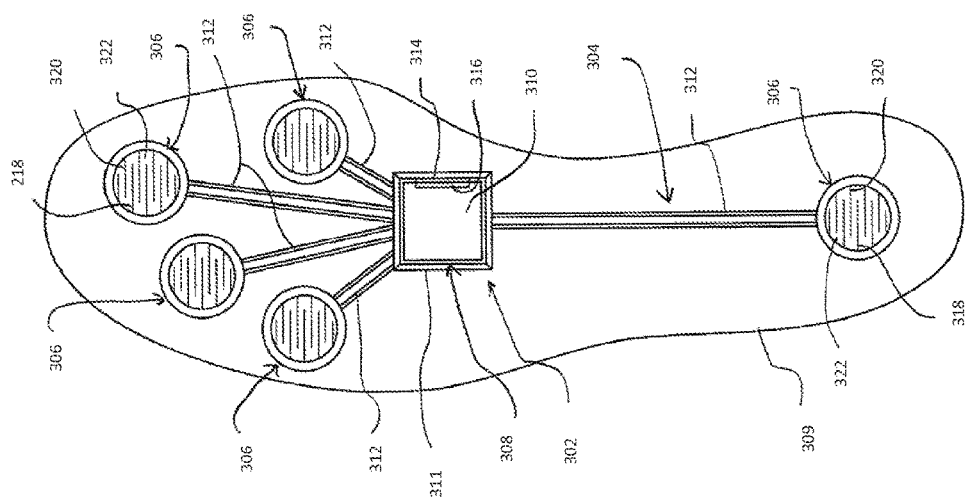
FIG. 3 shows an illustrative sensor assembly that may be worn by a user in accordance with example embodiments.

In certain embodiments, device 126 shown in FIG. 1 may comprise footwear which may include one or more sensors, including but not limited to those disclosed herein and/or known in the art. FIG. 3 illustrates one example embodiment of a sensor system 302 providing one or more sensor assemblies 304. Assembly 304 may comprise one or more sensors, such as for example, an accelerometer, gyroscope, location-determining components, force sensors and/or or any other sensor disclosed herein or known in the art. In the illustrated embodiment, assembly 304 incorporates a plurality of sensors, which may include force-sensitive resistor (FSR) sensors 306; however, other sensor(s) may be utilized. Port 308 may be positioned within a sole structure 309 of a shoe, and is generally configured for communication with one or more electronic devices. Port 308 may optionally be provided to be in communication with an electronic module 310, and the sole structure 309 may optionally include a housing 311 or other structure to receive the module 310. The sensor system 302 may also include a plurality of leads 312 connecting the FSR sensors 306 to the port 308, to enable communication with the module 310 and/or another electronic device through the port 308. Module 310 may be contained within a well or cavity in a sole structure of a shoe, and the housing 311 may be positioned within the well or cavity. In one embodiment, at least one gyroscope and at least one accelerometer are provided within a single housing, such as module 310 and/or housing 311. In at least a further embodiment, one or more sensors are provided that, when operational, are configured to provide directional information and angular rate data. The port 308 and the module 310 include complementary interfaces 314, 316 for connection and communication.

In certain embodiments, at least one force-sensitive resistor 306 shown in FIG. 3 may contain first and second electrodes or electrical contacts 318, 320 and a force-sensitive resistive material 322 disposed between the electrodes 318, 320 to electrically connect the electrodes 318, 320 together. When pressure is applied to the force-sensitive material 322, the resistivity and/or conductivity of the force-sensitive material 322 changes, which changes the electrical potential between the electrodes 318, 320. The change in resistance can be detected by the sensor system 302 to detect the force applied on the sensor 316. The force-sensitive resistive material 322 may change its resistance under pressure in a variety of ways. For example, the force-sensitive material 322 may have an internal resistance that decreases when the material is compressed. Further embodiments may utilize "volume-based resistance" may be measured, which may be implemented through "smart materials." As another example, the material 322 may change the resistance by changing the degree of surface-to-surface contact, such as between two pieces of the force sensitive material 322 or between the force sensitive material 322 and one or both electrodes 318, 320. In some circumstances, this type of force-sensitive resistive behavior may be described as "contact-based resistance."

ii. Wrist-Worn Device

Figure 4:
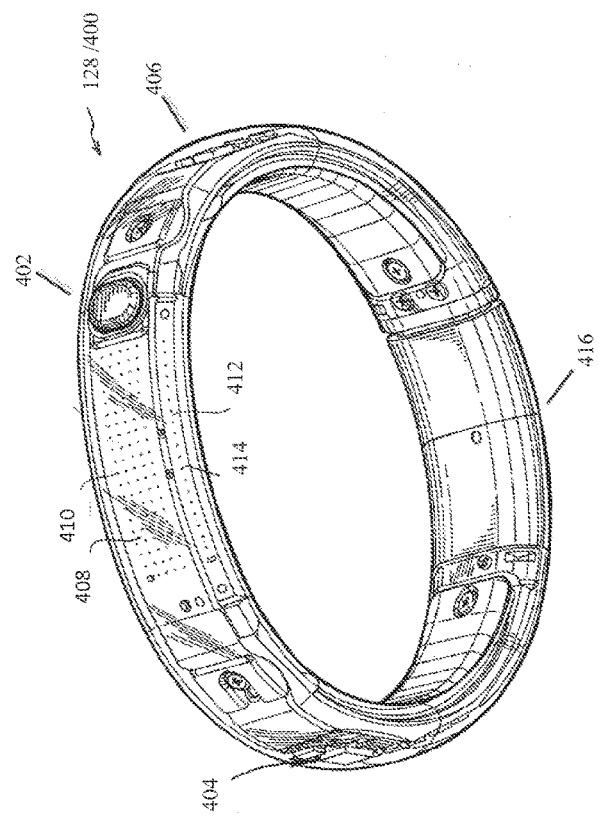
FIG. 4 shows another example sensor assembly that may be worn by a user in accordance with example embodiments.

As shown in FIG. 4, device 400 (which may resemble or comprise sensory device 128 shown in FIG. 1, may be configured to be worn by user 124, such as around a wrist, arm, ankle, neck or the like. Device 400 may include an input mechanism, such as a depressible input button 402 configured to be used during operation of the device 400. The input button 402 may be operably connected to a controller 404 and/or any other electronic components, such as one or more of the elements discussed in relation to computer device 114 shown in FIG. 1. Controller 404 may be embedded or otherwise part of housing 406. Housing 406 may be formed of one or more materials, including elastomeric components and comprise one or more displays, such as display 408. The display may be considered an illuminable portion of the device 400. The display 408 may include a series of individual lighting elements or light members such as LED lights 410. The lights may be formed in an array and operably connected to the controller 404. Device 400 may include an indicator system 412, which may also be considered a portion or component of the overall display 408. Indicator system 412 can operate and illuminate in conjunction with the display 408 (which may have pixel member 414) or completely separate from the display 4084. The indicator system 412 may also include a plurality of additional lighting elements or light members, which may also take the form of LED lights in an exemplary embodiment. In certain embodiments, indicator system may provide a visual indication of goals, such as by illuminating a portion of lighting members of indicator system 412 to represent accomplishment towards one or more goals. Device 400 may be configured to display data expressed in terms of activity points or currency earned by the user based on the activity of the user, either through display 408 and/or indicator system 412.

A fastening mechanism 416 can be disengaged wherein the device 400 can be positioned around a wrist or portion of the user 124 and the fastening mechanism 416 can be subsequently placed in an engaged position. In one embodiment, fastening mechanism 416 may comprise an interface, including but not limited to a USB port, for operative interaction with computer device 114 and/or devices, such as devices 120 and/or 112. In certain embodiments, fastening member may comprise one or more magnets. In one embodiment, fastening member may be devoid of moving parts and rely entirely on magnetic forces.

In certain embodiments, device 400 may comprise a sensor assembly (not shown in FIG. 4). The sensor assembly may comprise a plurality of different sensors, including those disclosed herein and/or known in the art. In an example embodiment, the sensor assembly may comprise or permit operative connection to any sensor disclosed herein or known in the art. Device 400 and or its sensor assembly may be configured to receive data obtained from one or more external sensors.

iii. Apparel and/or Body Location Sensing

Element 130 of FIG. 1 shows an example sensory location which may be associated with a physical apparatus, such as a sensor, data acquisition unit, or other device. Yet in other embodiments, it may be a specific location of a body portion or region that is monitored, such as via an image capturing device (e.g., image capturing device 118). In certain embodiments, element 130 may comprise a sensor, such that elements 130a and 130b may be sensors integrated into apparel, such as athletic clothing. Such sensors may be placed at any desired location of the body of user 124. Sensors 130a/b may communicate (e.g., wirelessly) with one or more devices (including other sensors) of BAN 102, LAN 104, and/or WAN 106. In certain embodiments, passive sensing surfaces may reflect waveforms, such as infrared light, emitted by image-capturing device 118 and/or sensor 120. In one embodiment, passive sensors located on user's 124 apparel may comprise generally spherical structures made of glass or other transparent or translucent surfaces which may reflect waveforms. Different classes of apparel may be utilized in which a given class of apparel has specific sensors configured to be located proximate to a specific portion of the user's 124 body when properly worn. For example, golf apparel may include one or more sensors positioned on the apparel in a first configuration and yet soccer apparel may include one or more sensors positioned on apparel in a second configuration.

Figure 5:
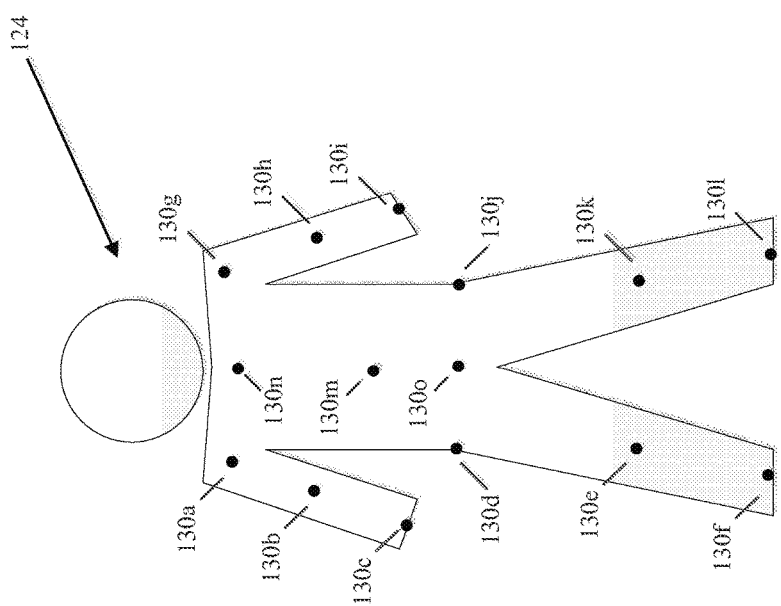
FIG. 5 shows illustrative locations for sensory input which may include physical sensors associated with a user's clothing and/or be based upon identification of relationships between two moving body parts of the user.

FIG. 5 shows illustrative locations for sensory input (see, e.g., sensory locations 130a-130o). In this regard, sensors may be physical sensors located on/in a user's clothing, yet in other embodiments, sensor locations 130a-130o may be based upon identification of relationships between two moving body parts. For example, sensor location 130a may be determined by identifying motions of user 124 with an image-capturing device, such as image-capturing device 118. Thus, in certain embodiments, a sensor may not physically be located at a specific location (such as one or more of sensor locations 130a-1306o), but is configured to sense properties of that location, such as with image-capturing device 118 or other sensor data gathered from other locations. In this regard, the overall shape or portion of a user's body may permit identification of certain body parts. Regardless of whether an image-capturing device is utilized and/or a physical sensor located on the user 124, and/or using data from other devices, (such as sensory system 302), device assembly 400 and/or any other device or sensor disclosed herein or known in the art is utilized, the sensors may sense a current location of a body part and/or track movement of the body part. In one embodiment, sensory data relating to location 130m may be utilized in a determination of the user's center of gravity (a.k.a, center of mass). For example, relationships between location 130a and location(s) 1306f/130l with respect to one or more of location(s) 1306m-1306o may be utilized to determine if a user's center of gravity has been elevated along the vertical axis (such as during a jump) or if a user is attempting to "fake" a jump by bending and flexing their knees. In one embodiment, sensor location 1306n may be located at about the sternum of user 124. Likewise, sensor location 146o may be located approximate to the naval of user 124. In certain embodiments, data from sensor locations 130m-130o may be utilized (alone or in combination with other data) to determine the center of gravity for user 124. In further embodiments, relationships between multiple several sensor locations, such as sensors 130m-130o, may be utilized in determining orientation of the user 124 and/or rotational forces, such as twisting of user's 124 torso. Further, one or more locations, such as location(s), may be utilized to as a center of moment location. For example, in one embodiment, one or more of location(s) 130m-130o may serve as a point for a center of moment location of user 124. In another embodiment, one or more locations may serve as a center of moment of specific body parts or regions.

II. Systems and Methods for Determining Athletic Attributes from Image Data

Figure 6:
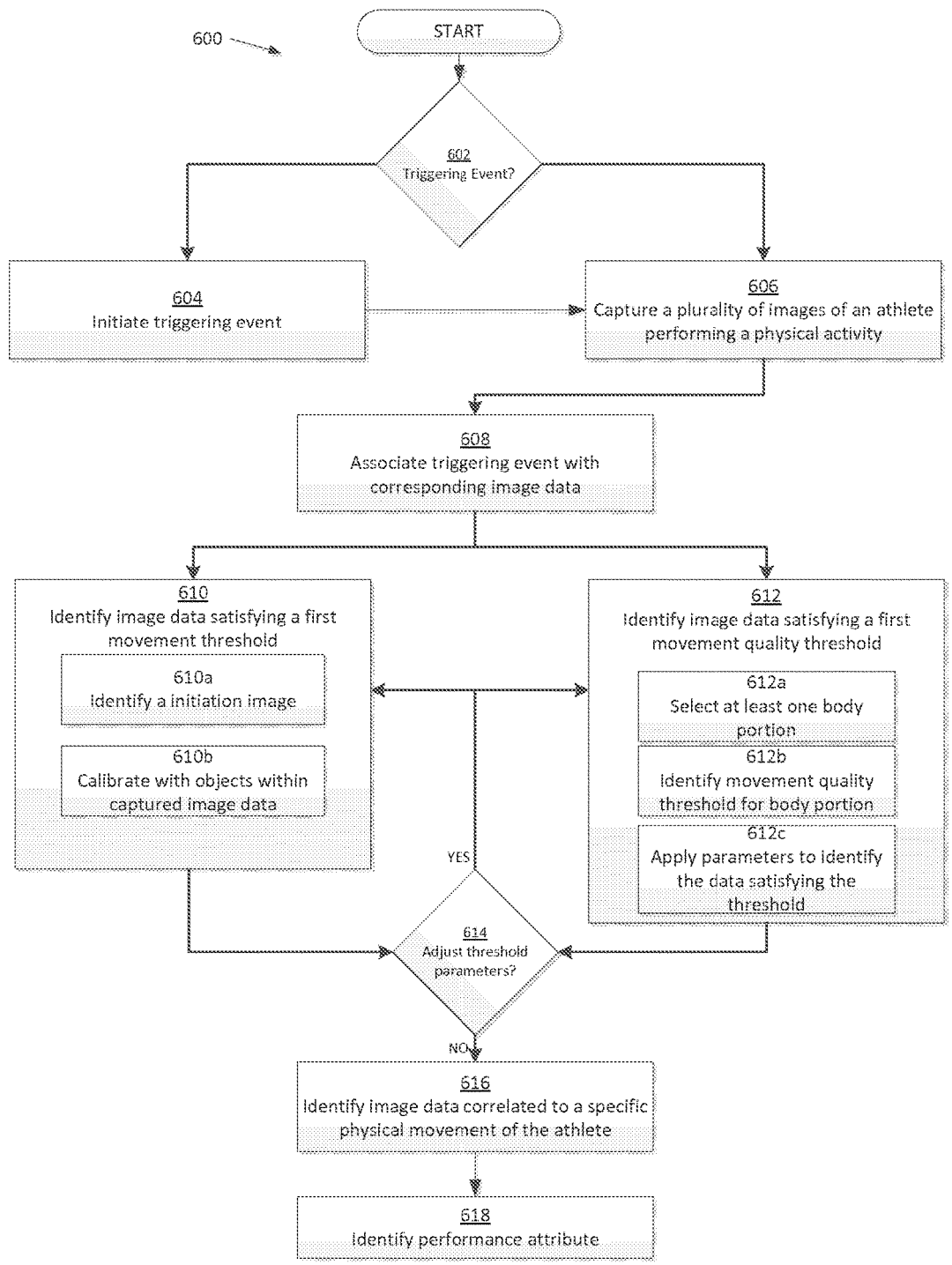
FIG. 6 is a flowchart of an example method that may be utilized to determine athletic attributes from image data in accordance with one exemplary embodiment.

FIG. 6 shows flowchart 600 of exemplary methods that may be implemented in accordance with certain embodiments of this disclosure. One or more aspects of the methodologies provided as part of FIG. 6 or any other portion of this disclosure may be utilized to determine an athletic attribute of an individual. Other aspects may be utilized to calculate an athletic rating of the user. In certain embodiments, a rating may be a sport-specific athletic rating. For example, a single athlete may have a different rating for football and running. In further embodiments, the rating may be specific to a position or type of activity within the sport. For example, for a soccer rating, a first rating may be related to a forward position and a second rating may be related to a goalie position. For an American football rating, a first rating may relate to a quarterback position and the second rating may be for a running back position. Similarly, in the running sports, a first rating may be a sprint rating while another rating is related to longer distances. Further methods and example embodiments that may utilize one or more aspects Triggering events may be utilized in one or more processes for determining ratings and/or athletic attributes. Triggering events, which are described below, including in relation to block 604, may be utilized to elicit an action from a user, such as to instruct an athlete to perform a physical action. Triggering events may be utilized in triggering the capture of image data of an athlete performing the physical action. Decision 602 may be implemented to determine whether to initiate a triggering event. The inputs to decision 602 or any other decision herein may be based on, inter alia, a user input, a sensor value, and combinations thereof. For example, in one embodiment, a triggering event may be configured to instruct or indicate to the athlete to initiate performance of a physical activity (see, e.g., block 604). Thus, whether to implement a triggering event and/or what trigger(s) may be utilized as part of the triggering event may depend on the physical activity, location of the trigger and/or user, a user input, predefined computer-executable instructions located on a non-transitory computer-readable medium, or combinations thereof. Although flowchart 600 is shown as beginning with decision 602, those skilled in the art will appreciate that flowchart 600 is not required to be initiated with decision 602 or any other decision. Further, decision 602 or any other decision or block disclosed herein may be implemented, either partially or in whole, before, after or during any other processes disclosed herein unless prohibited by the laws of nature.

A trigger (whether utilized in block 604 or any other process or system disclosed herein) may be audio, video, tactile, or combinations thereof. Indeed, those skilled in the art will appreciate that any human-sensible trigger may be utilized in accordance this disclosure. The trigger may indicate or instruct the user to perform a predefined physical activity. For example, a user may be instructed to initiate a 200 meter dash upon seeing a flash from an electronic device. In yet another embodiment, a user may be instructed to perform a drill specific to a certain sport upon hearing an audible cue. The trigger itself may provide instructions, yet in other embodiments; the user may be informed of what activity to conduct prior to receiving the trigger. In this regard, a simple flashing light or an audible noise may suffice in certain embodiments. In one embodiment, the human-sensible trigger is transmitted from a device operatively connected to a first camera that is configured to capture at least one image of the user performing the physical activity. Exemplary methods of capturing the athlete's activity will be discussed below (see, e.g., blocks 606). In one embodiment, computer device 114 image-capturing device 118, and/or portable device 112 may be utilized as an image capturing device and the trigger may be transmitted from at least one of a speaker, display, or light emitting device (e.g., display device 116 shown in FIG. 1, display 408 of device 400 in FIG. 4, and/or any other display device), which may be directly connected to the device itself (such as being integral with the device or connected locally or via various network architecture, such as cellular network architecture 108 and/or WAN architecture 110). Yet other embodiments may comprise an electronic device, such as portable device 112 or computer device 114, configured to receive and/or decipher a trigger transmitted from a separate and distinct device, object or thing (including human-generated inputs, e.g., a human voice), such as via one or more sensing devices. In this regard, it is envisioned that the trigger of block 604 (and other triggers disclosed herein) may be machine-sensible with respect to at least one sensory input of one device in accordance with many different embodiments.

Those skilled in the art will further realize that multiple triggers may be utilized within a single process. At least one of a plurality of triggers may be of a different type than another trigger. For example, a first trigger may be an audible trigger and a second trigger may be a tactile trigger. As another example, a first trigger may be a first audible trigger and the second trigger may be a different audible trigger, such as by a different sound, pitch, volume, duration and/or combinations thereof. Further, different triggers may be implemented at different times and/or utilized to solicit different actions from the athlete. For example, a first trigger (such as implemented at block 602) may be configured to prompt the athlete to initiate performance of a first predetermined physical activity. In yet another embodiment, a second trigger may be implemented to instruct or cue the athlete to perform a second physical activity. A process similar or identical to block 604 may be implemented to implement the second trigger, including being based upon a decision (such as decision 602). In one example, to indicate to the athlete to perform a predefined movement during performance of the physical activity, a second trigger (which may resemble or be identical to the first trigger being implemented for a second instance) may be implemented to cue or instruct the athlete to perform a predefined movement during performance of the physical activity. Similarly, a trigger flag may be associated with a second image (or plurality of images). In one embodiment, second trigger flag may be with an image within the plurality of images that correlates to the timing of the second triggering event. One or more flags may be associated with the athlete's performance of activities responsive to the trigger(s). Such flags may be associated with images based upon perceived motions or actions determined from the pixel data. Exemplary methods of processing images are described herein, including but not limited to blocks 610 and 612. Those skilled in the art will appreciate other implementations are within the scope of this disclosure.

One or more embodiments may encompass the reception of a plurality of sequential images comprising image data. The image data may have been captured from an image capturing device, including any one or more of: a portable entertainment device, a stereoscopic camera, an infrared camera, a game console camera, and combinations thereof or other device known in the art, including image capturing device(s) 126 and/or 128 described in relation to FIG. 1. In accordance with certain embodiments, block 606 may be implemented to capture a plurality of images. In one embodiment, block 606 captures a plurality images wherein at least a first image comprises image data of an athlete before initiating performance of a predetermined physical activity and a plurality of subsequent images comprise image data of the athlete performing the predetermined physical activity. The image data may comprise pixel data.

In certain embodiments, the capturing of image data (such as part of block 606 or any other process) may be responsive to a trigger (such as a trigger implemented as part of block 604). For example, the trigger may be received or otherwise sensed by an electronic device. In one embodiment, an image-capturing device configured to capture image data of the athlete may detect, sense, and/or measure a trigger and, in response automatically initiate capturing images. In certain embodiments, initiating capturing image data may be based, at least in part, on sensor data, such as from any one or more of the sensors disclosed herein. Initiating capturing images may be based upon a user input. For example, in certain implementations, such as those explained in relation to FIGS. 10A-10I later in this disclosure, a graphical user interface (UI) may be provided on an electronic device. The UI may include a UI element that, responsive to a user input, initiates capturing the image data. As one example, the UI may be implemented on a mobile device that allows a coach, trainer, friend, or other individual to selectively capture images of the athlete.

In yet other embodiments, at least one image is captured before at least one triggering event. This may be useful, for example, to determine if a user "jumped" the trigger, such as in anticipation of a trigger. Regardless of whether image data is captured before or after the triggering event (e.g., block 604), a trigger flag may be associated with an image within the plurality of images (e.g. block 608). For example, a non-transitory computer-readable medium may comprise computer-executable instructions, that when executed by a processor, are configured to associate a trigger flag correlating with the timing of the triggering event with corresponding image data. Those skilled in the art will appreciate that there are many ways to flag or otherwise mark electronically stored image data; therefore, they are not explained in further detail here. As explained in more detail below, one or more trigger flags may be utilized in the determination of one or more athletic attributes.

Further aspects of this disclosure relate to processing image data, such as the image data captured as part of block 606. In accordance with certain embodiments, image data may be processed to determine whether one or more movements of objects represented by image data meet a threshold criterion. Exemplary criterion may include a movement criterion and a movement quality criterion. For example, block 610 may be implemented to process image data to identify data meeting a movement threshold. In one embodiment, at least a portion of a plurality of captured sequential images may be utilized to identify a first range of images satisfying at least a first movement threshold. Image data (which may comprise whole or portions of images) may be analyzed to identify a first threshold level of movement of an object represented within the image data. In certain embodiments, pixel data may be analyzed to identify a quantity of pixels in a portion of the captured images satisfying a first threshold level. In one embodiment, a first criterion, such as a first movement threshold criterion, may serve as a filter that identifies certain images that may be of interest and the second criteria further identifies what data (which may be within the same group) fits a more stringent criteria. The second criterion may be a movement quality threshold (See, e.g., block 612). In yet another embodiment, the first and second criteria may be conducted independently and in yet further embodiments, only one of a plurality of criteria may be utilized. In certain embodiments, criteria may include one or more movement threshold criterion, one or more threshold quality threshold criterion, and/or other criteria.

The threshold level may be configured to be indicative of a movement of an object. As non-limiting examples, one or more thresholds utilized as part of block 610 or any other process described herein may be tied to horizontal movement (e.g., running) or vertical movement (e.g., dunking a ball), or both. This threshold level can be entirely different than one or more additional threshold levels disclosed herein. For example, a first movement threshold may be triggered by the athlete's arm movement and a second threshold may pick specific movements tied to another body part or region, such as the other arm, a leg, etc. In one embodiment, the first threshold may detect whether a first body portion moved and/or whether a body portion moved along a specific axis. As used herein, a "body portion" may be any one or more sections, areas, systems, or portions of the user's body represented within image (e.g., pixel) data. In one embodiment, the image data may correlate to a single appendage (e.g., a leg or arm), group of appendages (e.g., an arm and leg or two arms), or portions thereof. In certain embodiments, the body portion may correspond to a portion of multiple appendages, such as the upper leg and/or inner arm areas, yet in other embodiments, the portion is devoid of appendages. In other embodiments, a first region (e.g., an upper region) may be distinguished from another region (e.g., a lower region). Those skilled in the art with the benefit of this disclosure will appreciate that any portion of the body represented by image data (such as at least one pixel) may serve as a "body portion" in accordance with certain embodiments. Further discussions of threshold levels will be discussed below, including with reference to movement quality thresholds in relation to block 612. Those discussions are incorporated herein and throughout this disclosure.

In one embodiment, at least a portion of the image data, such as a plurality of sequential images or portions thereof, may be processed to identify an initiation image (see, e.g., block 610a). In one embodiment, the initiation image may be the frame or image in which the athlete first moves. In yet another embodiment, the initiation image may be the image in which a game or activity is initiated, regardless of whether the user moves. For example, in one embodiment, movement of another sprinter may signal the beginning of an event. In another embodiment, seeing a waving flag indicating an event has been initiated, or a gun emit smoke from being fired as well as other actions capturable by an image may be used to indicate an initiation image in accordance with various embodiments. In one embodiment, the first criterion may be directed towards movements associated with the specific athlete. In certain implementations, the initiation image is determined based upon a user input, such as a user selecting a UI element indicating the initiation image. For example, a user recording the athlete may want to flag an initiation image in real-time as the athlete is performing a specific action. For example, an image just prior to a basketball player attempting to dunk the ball may be identified as an initiation image. In certain embodiments, identification of the initiation image may result in capturing the image data at a different frame rate. Those skilled in the art will appreciate that other non-movement events may also be used in conjunction with certain embodiments. For example, one or more sounds, tactile inputs, or other information (including but not limited to those described above in relation to block 604) may be utilized in conjunction with one or more embodiments. A second movement threshold may be implemented to detect whether the movement met a threshold criterion.

In certain implementations, landmarks/distance calibrations may be utilized from time-stamped image data to allow for precise measuring of performance. For example, objects represented by image data may be utilized to determine whether movement thresholds are met (e.g., block 610b). For example, markings on a field (such as yard lines) may be used to calibrate distance measurements. In certain embodiments, objects may be identified and upon identification, used in calibration processes. For example, many sporting fields, tracks, courts, and the like have fixed dimensions. Likewise, basketball hoops, goalposts, goal nets, and other objects are often sized to specific known dimensions. These dimensions may be used to identify thresholds and/or determine whether certain thresholds have been met, including but not limited to: flight time for vertical jump, distance for throws, kick distance and power, among others, sprint times between two distances. Such calibration techniques are not limited to stationary objects. For example, balls, pucks, and other sporting devices may be used to calibrate distances. In this regard, a basketball has a known shape and size. Such dimensions may be used to calibrate measurements. Although these calibration techniques have been described in relation to block 610, those skilled in the art will appreciate that such techniques are not limited thereto, but instead may apply to any system and method described herein. Further aspects of thresholds are described immediately below.

Block 612 of flowchart 600 may be implemented to determine whether image data (e.g., pixel data) satisfies another threshold, which may be unrelated to the movement threshold(s) of block 610. Thus, block 612 may be executed independently of block 610. In certain embodiments, block 612 may be implemented in a parallel or serial fashion with respect to block 610. In one implementation, block 612 may identify a first body portion of the athlete that satisfies a first movement quality threshold. Further, it will be appreciated by those of skilled in the art that portions of various blocks, such as 610 and 612 may be implemented independently of other components. For example, sub-block 610a may be performed entirely separate from block 610. Further, it is to be understood that in alternative embodiments, one or more portions of blocks 610 and 612 (or any other block of FIG. 6) may be combined. For example, sub-block 610a may be utilized as part of block 612 and one or more of sub-blocks 612a-c may be utilized within block 610.

The selection and/or utilization of the one or more portions of the athlete's body represented within the image data may be based on the predetermined physical activity, user input, historical data, and combinations thereof among others. In one embodiment, block 612 may comprise one or more sub-parts that may be conducted independently of each other, yet in other embodiments may be at least partially dependent on another subpart of block 612 or another mechanism. For example, the predetermined physical activity may be used (either in whole or in part) to select which body portion(s) are utilized and/or whether the movement of the portion(s)—as represented within the captured image data—meet a quality threshold (see, e.g., blocks 612a and 612b). As one example of identifying a body portion in block 612a, a first embodiment may utilize the image data associated with the athlete's legs, such as if the predetermined physical activity comprises or consists of a 200-meter sprinting event. Yet another embodiment may utilize image data associated with at least a portion of the athlete's legs as well as their arms. In yet further embodiments, a user input may be optionally provided to select which image data is utilized. A user input may be configured to select an option from a plurality of options, yet in other implementations a user may select any portion or part of the represented image data.

In certain embodiments, systems and methods may be implemented that utilize a different body portion based upon characteristics of the image data. For example, pixel data for an athlete located at a first distance may be more accurate and/or precise than pixel data for an athlete located at a second distance that is further than the first distance with respect to a camera that captured the image data. Further, zooming, lighting conditions or other parameters may alter the quality of the captured image data. Therefore, selecting a portion (e.g., 612a) and/or a quality threshold (e.g., 612b) may be based on several factors, some of which may be weighted more than others.

As another example, the athlete may travel throughout a 4-dimensional space during performance of the activity. Therefore, the camera(s) perspective of the athlete may be altered during the capture of the image data. In other embodiments, multiple cameras (which may have differing capabilities) may provide image data. These and other variables may result in different portions to be utilized or quality thresholds to be determined. For example, in one embodiment, image data comprising a sprinter running at a first distance may utilize, at the very least, image data comprising pixels representing the athlete's legs (or a portion thereof). However, as the user travels further away from the image capturing device, the number of pixels representing the athlete's legs (or portion thereof) may decline, therefore, in one embodiment, another body portion may be utilized to compensate for this reduction of pixel data. As one example, decision 614 may be implemented to determine whether to alter, update, switch or otherwise adjust the portion(s) of the athlete represented by pixel data utilized (e.g., block 612a) and/or how they are utilized (e.g., block 612b). In certain embodiments, block 614 may be implemented to determine whether to adjust parameters associated with a movement threshold of block 612 and/or block 610.

As a non-limiting example of adjusting one or more parameters of block 612, pixel data from an athlete's legs may be initially utilized to identify image data for a first movement quality threshold; however, pixel data from the athlete's arms may supplement or replace the utilization of the pixel data representing the legs. Further, the threshold levels for one or more of these body "portions" may be altered based upon the quality of the image data for different images. In certain embodiments, a movement quality threshold may compare movement of multiple portions of the athlete's body and determine whether two or more portions move in relation to each other. For example, arm swing data may be compared with leg movement data to determine which most accurately reflects the predetermined physical activity.

Using the identified parameters, image data (e.g. pixel data) is utilized to determine that a first body portion movement quality threshold is met (see, e.g., block 612c). In one embodiment, image data representing the human form may be utilized to identify pixels or other image data representing the athlete. If multiple athletes are present within the frames, the specific athlete of interest may be isolated. In one embodiment, the athlete may be isolated based upon known parameters of the athlete (e.g., height, weight, color of clothing). In another embodiment, a user input may indicate which pixel data represents the athlete. In yet further embodiments, the athlete may wear a detectable marker configured to be detectable by at least one electronic device. Those skilled in the art will readily understand that these are merely examples.

In accordance with one embodiment, image data representing the relevant body portions (such as from block 612a) may be identified. Image data representing the relevant body portions may be isolated. In certain embodiments, surrounding pixel data may be utilized. Yet in other implementations, entire frames of image data may be utilized to determine if one or more threshold limits have been met. In certain implementations, an optical flow algorithm may be utilized to analyze the image data (e.g., pixel data) and determine movements of the body portions. In this regard, one or more image capturing devices may capture images at different or variable frame rates. For example, an image capturing device may capture images at a variable rate between 30 to 240 frames per second (fps). Therefore, determinations of movement may utilize rate of capture information to accurately determine time intervals between frames of data that may be separated by uneven periods of time. As another example, a first image capturing device may capture images at a rate of 100 fps and a second image capturing device may capture image data at a rate of 70 fps. Thus, data from these two image capturing devices may be calibrated to account for variations in time between pixel movements. In one embodiment, at least a portion of the plurality of sequential images each represent about $\frac{1}{60}$th of a second, yet in another embodiment, at least a portion of the plurality of sequential images each represent no more than $\frac{1}{60}$th of a second. In certain implementations, accurate time between an image having the first frame rate an image having the second time frame may be determined. This accurate time may be utilized in one or more processes. In certain embodiments, data from two images may be processed to determine movement between two frames of data. In one embodiment, pixel movement may be interpolated from two subsequent images. In certain embodiments, multiple cameras may be utilized. As one example, two cameras having the same frame rate may be configured to have a synchronized offset. Using a synchronized offset may allow a higher effective frame rate to be obtained. For example, if a first camera is set to 50 fps and captures images starting $\frac{1}{100}$th of a second before a second camera also set to 50 fps, then collectively, these images from these two cameras may be utilized to obtain an effective frame rate of 100 fps. Using multiple cameras may also be utilized to correct any incorrect data in accordance with certain embodiments. For example, a first camera configured to capture 50 fps may only capture 48 or 49 fps and thus data from a second camera may be used to provide accurate image data during the relevant time period.

In one embodiment, large-scale motion may first be identified and more detailed motions may then be identified.

As an example, a first process may determine that an athlete is running and, in response, one or more processes may then be used to specifically detect hand motion and characterize that. Other motions that may be identified or derived include: initiation of the activity, acceleration, velocity, reaction, tempo, distance travelled by an object, or completion of the activity. Further embodiments may utilize one or more processes to determine which of segmentation, scaling, or other features may be implemented, or the extent they are utilized. Certain implementations may weigh one or more parameters resulting from the optical flow algorithm or other processes utilized to determine image data movement, such as movement of pixels. In certain embodiments, data from pixel movements between a plurality of images may be utilized to identify types of motion. As one example, data provided or derived from an optical flow process may be used. Example data may include the pixel-distance change of an identified object from one frame or image to another frame or image (sometimes referred to in the art as the "flow field"). These may be utilized in parameters that identify specific types of motion. In certain embodiments, these outputs may be used for segmentation and motion identification.

These or other processes may be used to provide an output concluding that a particular motion was occurring at the respective frame(s). In this regard, aspects of this disclosure relate to identifying image data (such as but not limited to specific images) that correlate to a specific physical movement or activity of the athlete (e.g., block 616). As non-limiting examples, image data may be used to identify one or more actions, including: initiation of the activity, threshold levels of acceleration, velocity, reaction, and/or tempo, distance travelled by an object, completion of the activity, among others. As discussed above in relation to block 610b, objects (either stationary or in motion) may be utilized to calibrate measurements, including those relating to movement quality thresholds.

Thus, block 616 may be implemented to identify image data (including specific frames or images) such as including, but not limited to: an initiation image, a termination image, or any other image comprising motion data that can be identified based upon the systems or methods disclosed herein. For example, block 612 may be utilized to determine whether pixel data is altered between two subsequent images such that the alteration satisfies a specific first body portion (e.g., upper arm) movement quality threshold. As described above, image data between two successive images may be interpolated or otherwise derived from existing image data. Thus, based upon the first body portion quality threshold being met, the respective image in which it first occurred may be identified or flagged as an initiation image. In one embodiment, subsequent images following what may be deemed an initiation image may be utilized in the determination. For example, if analysis of a plurality of subsequent frames further reveals that the athlete is engaged in a specific activity, then one embodiment may analyze past frames (or portions thereof) to identify where the specific action began. Yet in other embodiments, systems and methods may identify the initiation image (or other image) based solely on that image and/or images preceding that image. Similarly, a termination image may be identified based upon a certain threshold not being met. In other embodiments, a termination image may be identified based on a second threshold being met, such as for example a different body portion movement quality threshold. In accordance with one embodiment, movement of an athlete's torso may be used as identification of an initiation image (e.g., block 610a) of a baseball player pitching a ball, while a movement quality threshold relating to the quality of movement of the athlete's throwing arm may be used to determine that the athlete is pitching the ball and/or released the ball (e.g., block 612). In certain embodiments, image data indicating that the ball struck a catcher's mitt or a bat may signify the termination image of the pitch. Other thresholds, however, such as, but not limited to, one described in blocks 610 and/or 612 may also be utilized, either alone or in combination, with other thresholds.

Block 618 may be implemented to identify a performance attribute of the athlete. As one example, an initiation image (alone or in combination with another image) may be used to determine at least one performance attribute of the athlete. Example attributes may include, but are not limited to: speed, reaction, endurance, and combinations thereof. In another embodiment, a completion image comprising image data of the athlete completing the predetermined physical activity (which may be identified at block 616 from data obtained at block 610 and/or 612) may be utilized. In one implementation, a physical activity duration based upon the initiation image and the completion image may be calculated. Such information may be used to determine velocity, acceleration, tempo, pace, or a combination thereof. As will be explained below, such information may also be used in one or more calculations relating to a performance rating.

Determinations of an attribute, such as at block 618, may utilize data obtained from one or more other sensors that are not used to capture the image data. In accordance with certain embodiments, alterations of the image data responsive to external stimuli may be considered. In one embodiment, flagged images associated with triggering events may be utilized. As one example, a reaction value for the athlete may be determined based upon the duration of time between the image associated with a trigger flag and the initiation image. For example, an external stimulus, such as an audible or visual cue, may indicate the start of a race and accordingly, the associated image(s) may be flagged as being correlated to a first triggering event (e.g., block 608). Based upon one or more thresholds being met, such as described herein (e.g., blocks 610 and 612), it may be determined that a user has initiated a predetermined activity. In certain embodiments, the activity may be a sport-specific activity. Thus, the user's reaction time may be determined from the flagged image of the triggering event and the initiation image.

As discussed above in relation to block 604, one or more triggering events may occur before, during or after the athlete's performance of the physical activity. In one embodiment, a second triggering event may be utilized to indicate to the athlete to perform a predefined movement during performance of the physical activity. A second trigger flag may be associated with an image that correlates to the timing of the second triggering event (such as block 608 or another process). Another flag may be associated with an image correlated to the athlete performing the predefined movement. In one such embodiment, a second reaction value for the athlete based upon the duration between an image associated with the second trigger flag and an image correlated with the athlete performing the movement may be calculated.

In further embodiments, sensor data (inclusive of non-image sensor data) may be utilized in any determinations, derivations or calculations described herein. Sensor data may be captured from sensors including, but not limited to: a wrist-worn sensor, a footwear-worn sensor, a portable entertainment electronic device, and combinations thereof.

In accordance with one embodiment, sensor data may be utilized to conduct image stabilization upon at least a portion of the plurality of images. In one implementation, sensor data may be received from a sensor operatively attached to the athlete and used for image stabilization, identification of the athlete from an plurality of objects within the captured image data, determinations of when to capture images, determinations of what image data to process, and/or other utilizations.

In addition to the drawings, FIGS. 10A-10I provide illustrative examples of a graphical user interface (UI) that may be implemented in accordance with various aspects of the innovation disclosed herein. For example, FIG. 10A-10I provides example UIs that, at least in one embodiment, may permit a user to capture images of an athlete performing athletic activity. The UI may also provide a summary of the user's statistics, such as their speed, force, acceleration, agility, reaction and/or other statistics. In this regard, the statistics may be determined, at least in part, from image data collected from the UI.

In certain embodiments, upon selecting a UI element to create a new event, the user interface may present a record option to the user configured to capture images at a first frame rate. During the image capture, a UI element may permit the user to select a timing mechanism that is independent of the total duration of the captured video. For example, images may have been captured for several seconds prior to receiving a user input initiating a timing mechanism through the UI element. In certain embodiments, selection or activation of the timing mechanism element or another element may cause the images to be captured at a second frame rate that is different that the frame rate utilized. The timing mechanism or function may be deactivated, for example, either by a user selection and/or a default value.

Looking to FIG. 10A-10I, an example UI which may be configured to enable a user to capture image data, such as images of an athlete performing an athletic activity. The UI may further permit the playback ("preview") of the captured images. During playback, a user may choose to edit and/or discard the images or a portion thereof. The images may be associated with markers, such as those discussed in reference to the example UI embodiments disclosed herein.

Figure 10B:
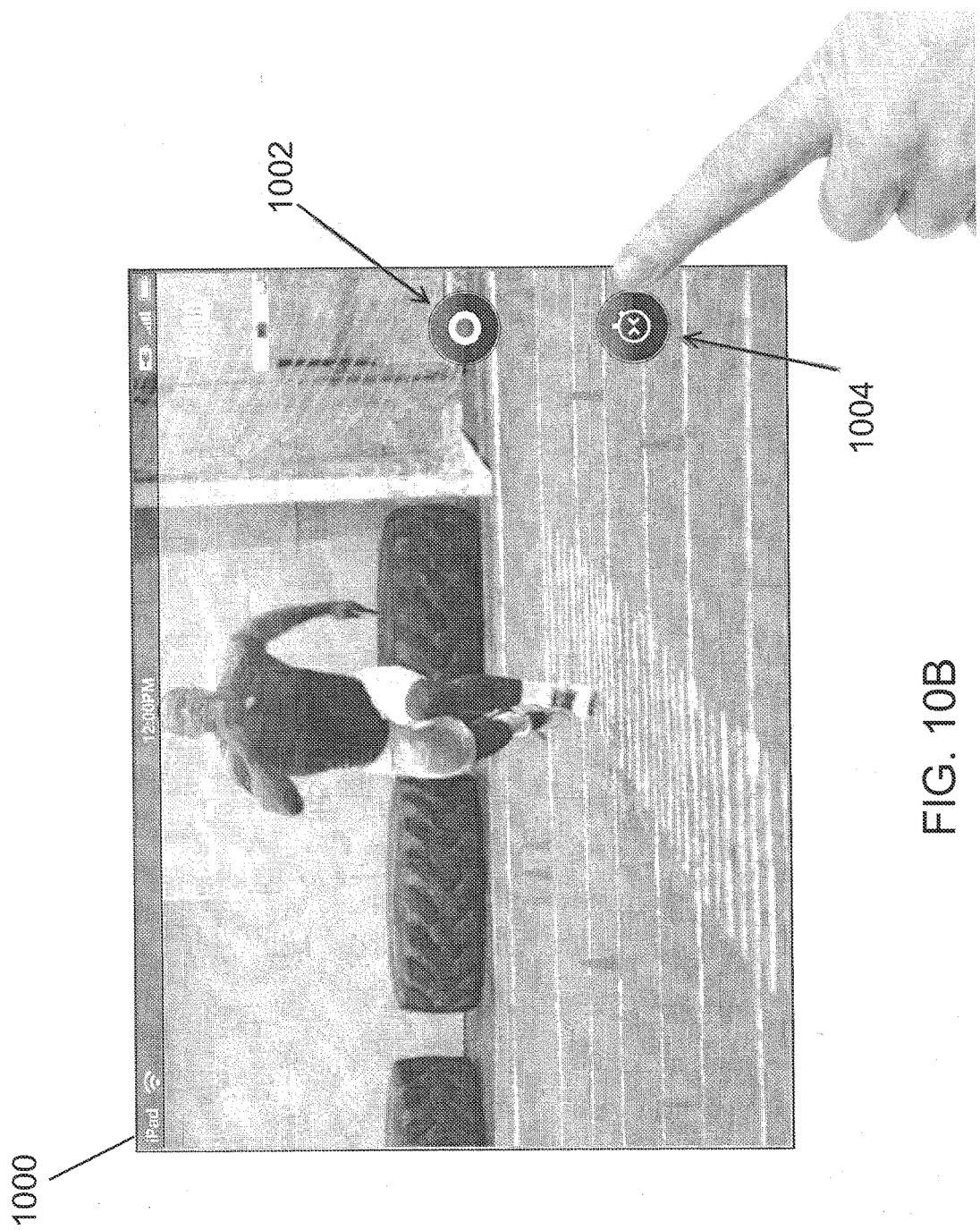

FIG. 10A shows an example UI that is configured to permit a user to capture image data. One or more features, concepts and/or elements described in relation to FIGS. 10A-10I may be considered, in certain embodiments, as an extension of one or more features described in relation to one or more UIs described herein. In yet other embodiments, one or more features, elements, or concepts disclosed in relation to FIG. 10 may be implemented in combination, including simultaneously or in a sequence, with one or more features described herein, including any other embodiments disclosed herein and/or known in the art. Example UIs may include a UI element configured to permit a user to capture image data at a first frame rate ("normal speed"). For example, FIG. 10A shows a UI 1000 configured to permit a user input from a user, such as selecting a UI input element, (shown as soft button 1002, which located on the right middle side of UI 1000). The UI 1000 may provide image data, such as live action image data. This may occur even prior to the user using UI 1000 to capture image data (e.g., activating soft button 1002). In certain embodiments, analysis may be performed on the image data shown within UI, such as to perform or assist with autofocus, measure distances, adjust lighting, and/or other actions. In one embodiment, a user input via an input element (e.g., soft button 1002) and a distinct and separate triggering event must be detected or confirmed, before image capturing at the first rate may commence. In another embodiment, a user input, such as via a user input element, is not required, but rather the commencement of image capture at the first rate may be based on a triggering event that is other than a user input directly instructing the initiation of the frame rate at the first rate.

A UI, such as UI 1000, may provide indicia (visible, audible, and/or tactile) that image capturing (such as responsive to the user activating the UI input element—soft button 1002) has commenced. In one embodiment, the same user-selectable UI input element, e.g., soft button 1002, may be configured to provide indicia. For example, soft button 1002 may be configured to flash, blink or otherwise alter its visual appearance to the user based on the capturing of data at the first frame rate being activated.

Another UI element may permit the user to select a different frame rate to capture at least a portion of images. For example, at shown at FIG. 10B, UI 1000 may have a "slow motion" element that may be activated or otherwise selected during capture of the images at the first time rate (e.g., normal speed or frame rate). As one example, user-selectable UI input element 1004, may be a soft button, which may be activated by a user touching the corresponding location on a touch screen. Element 1004 may be configured to only appear when element 1002 is active and/or when the images are currently being captured at a specific frame rate (such as the first frame rate). The input mechanism to select or activate a second frame rate may be the same input mechanism to select the first frame rate, or alternatively, a different separate user input mechanism. For clarity with this disclosure, however, the mechanism to select the second frame rate will be referred to as the second UI input element. In some instances, the second UI input element may be referred to as a slow motion element; however, those skilled in the art reading this disclosure will understand that this is not a requirement but rather an example embodiment.

Activating the second UI input element, which may be a "slow motion" element (which may be implemented via element 1004 in certain embodiments), may be configured to capture images at a second frame rate that is higher frame rate. For example at one embodiment, the first frame rate may be 30 fps and the second frame rate may be 60 fps. The images may be collected such that a single file contains images captured at multiple frame rates, such as at the first and the second frame rates. As will be explained later, the files of image data may be configured such that subsequent playback, such as playback via UI 1000 or any other interface, is configured to provide an appearance that the images captured at the second frame rate to be at a slower motion than the images captured at the first frame rate. For example, in one embodiment playback may occur at a constant frame rate, which may or may not be the first frame rate. Thus, if a first series of images were captured at 30 frames per second and a second series of images were captured at 90 frames per second, playing the images back at 30 fps second would take 1 second to show the 30 frames of the images captured at the first frame rate, however, the every second of capturing the images at 90 fps would take 3 seconds of playback at 30 fps, thus providing the appearance of slow motion.

Figure 10C:
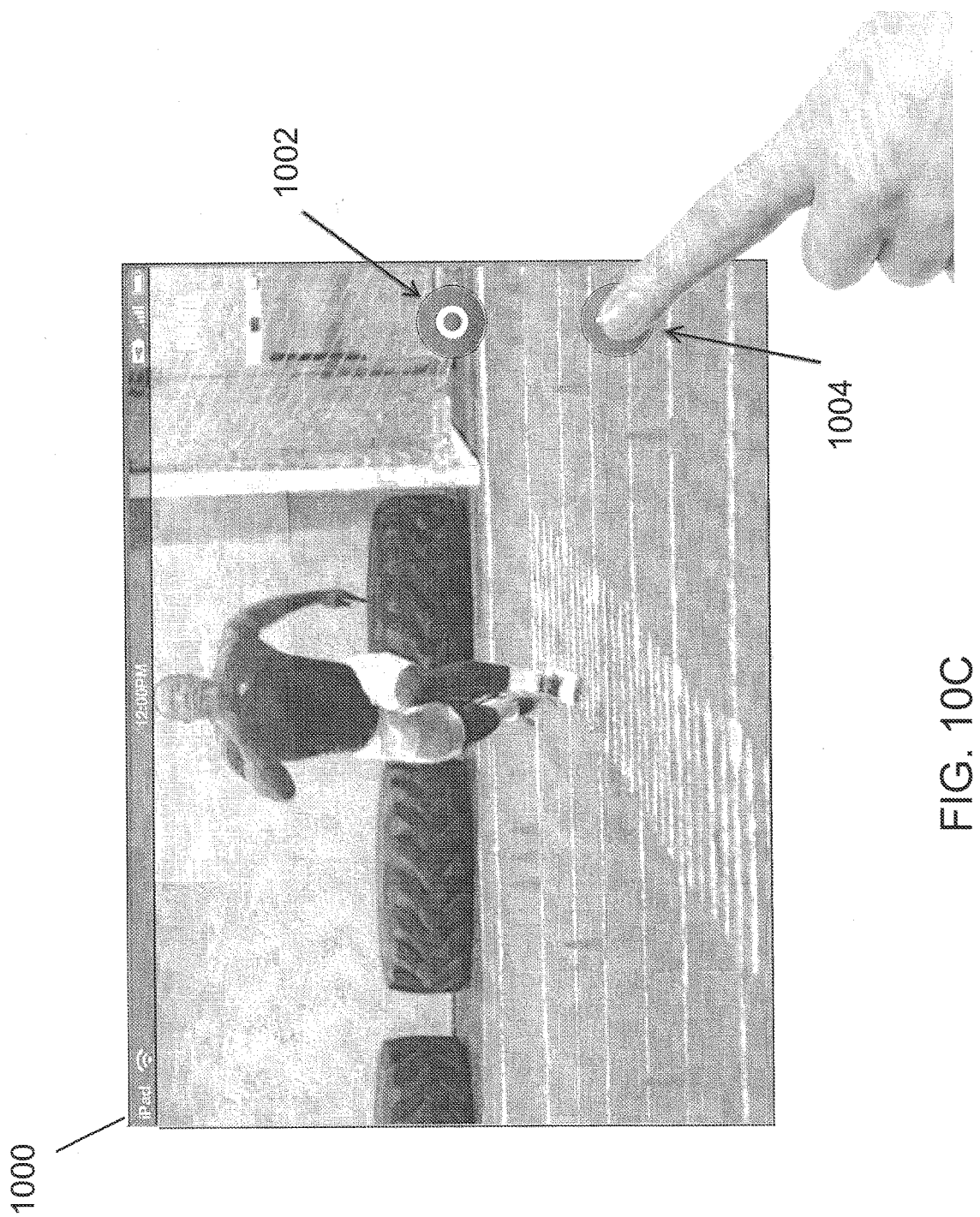

In one embodiment, a slow motion element (e.g., element 1004) may be associated with a timing mechanism or function configured to cause a timer to be displayed on UI 1000, either during the capture and/or after during editing or playback. The timer may be independent of the total duration of the captured video. For example, images may have been captured for several seconds prior to receiving a user input initiating a timing mechanism through the respective UI element. The "slow motion" capture may be deactivated, for example, either by a user selection and/or a default value. In one embodiment, the feature is automatically deactivated once a user no longer presses or otherwise selects the element 1004. For example, as shown in FIG. 10B, a user selection of a "slow motion" element 1004 (illustrated as a soft button on UI 1000) causes the capturing of images at the "slow motion" frame rate, however, once the user no longer presses the soft button, then the capture of images may occur at a different rate. In one embodiment, the frame rate may return to the first frame rate (e.g., the default "normal speed" frame rate). The UI 1000 may permit the user to stop the capture of images by a user input. Further, as shown in FIG. 10C, an element may be altered based on the interaction with a second element and/or the function enabled. For example, the alteration of the first UI element 1002 (such as size, color, etc.) may be altered during the capture of the images at the second frame rate (e.g., when the user presses and/or holds the second element 1004).

Figure 10D:
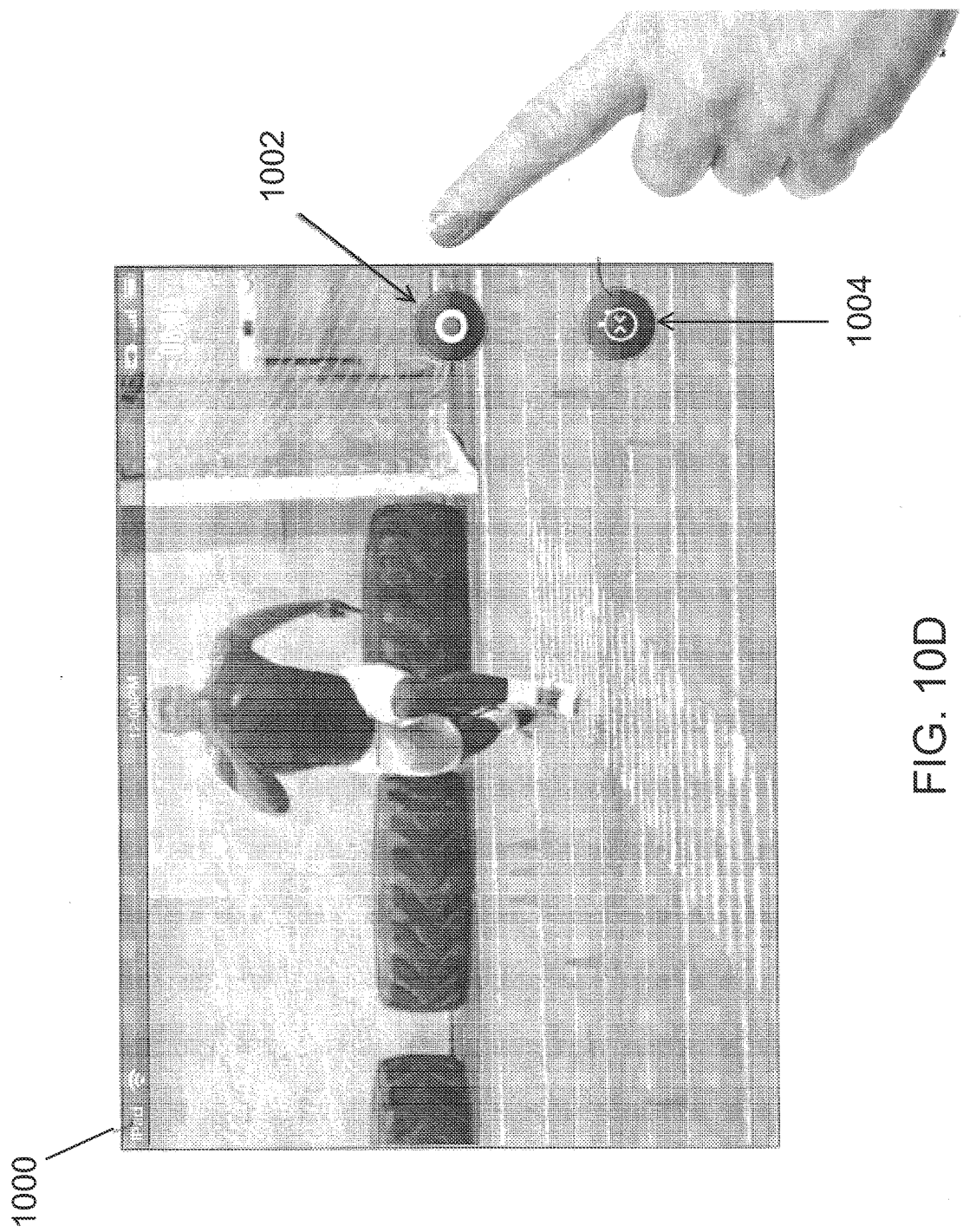
Figure 10E:
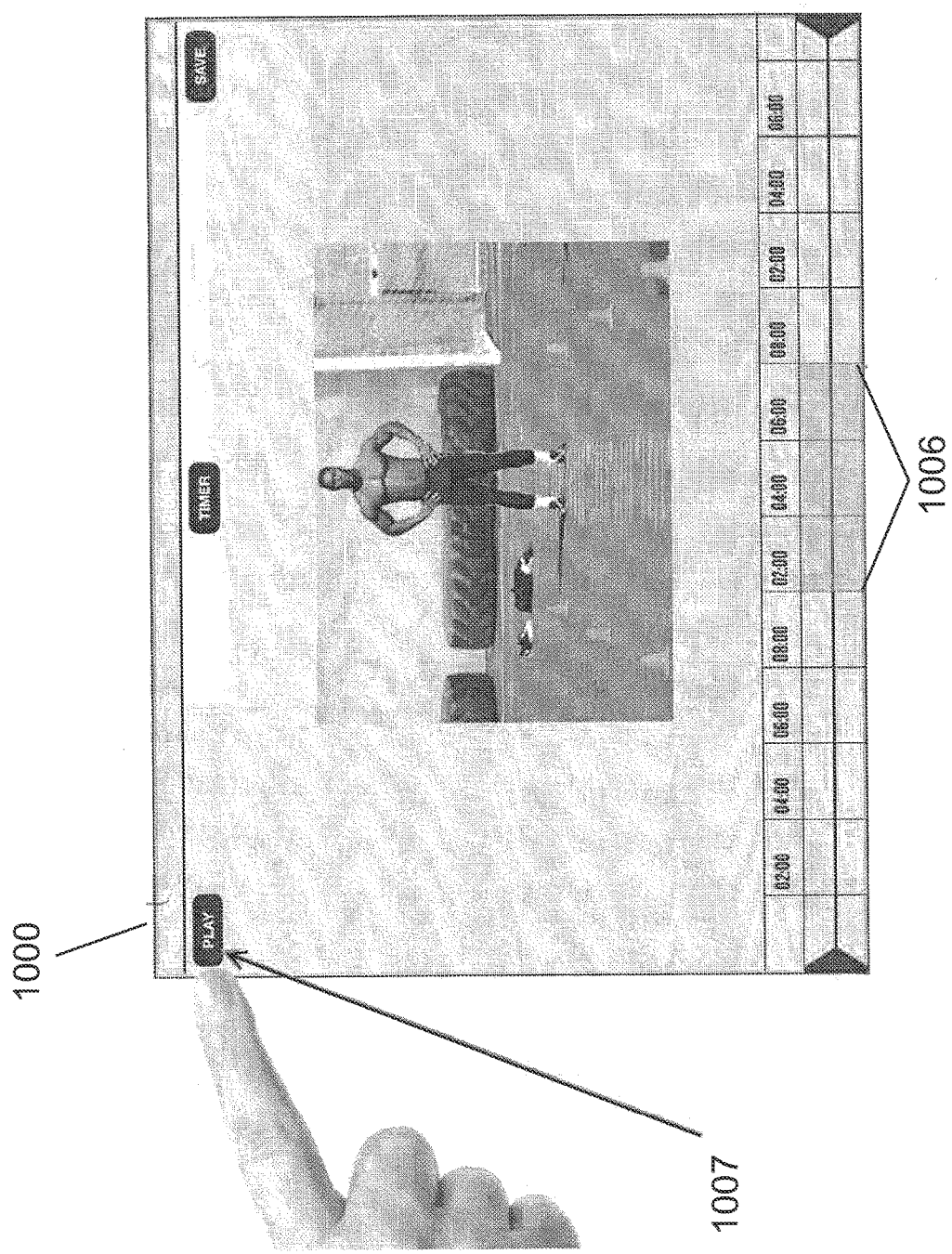
Figure 10F:
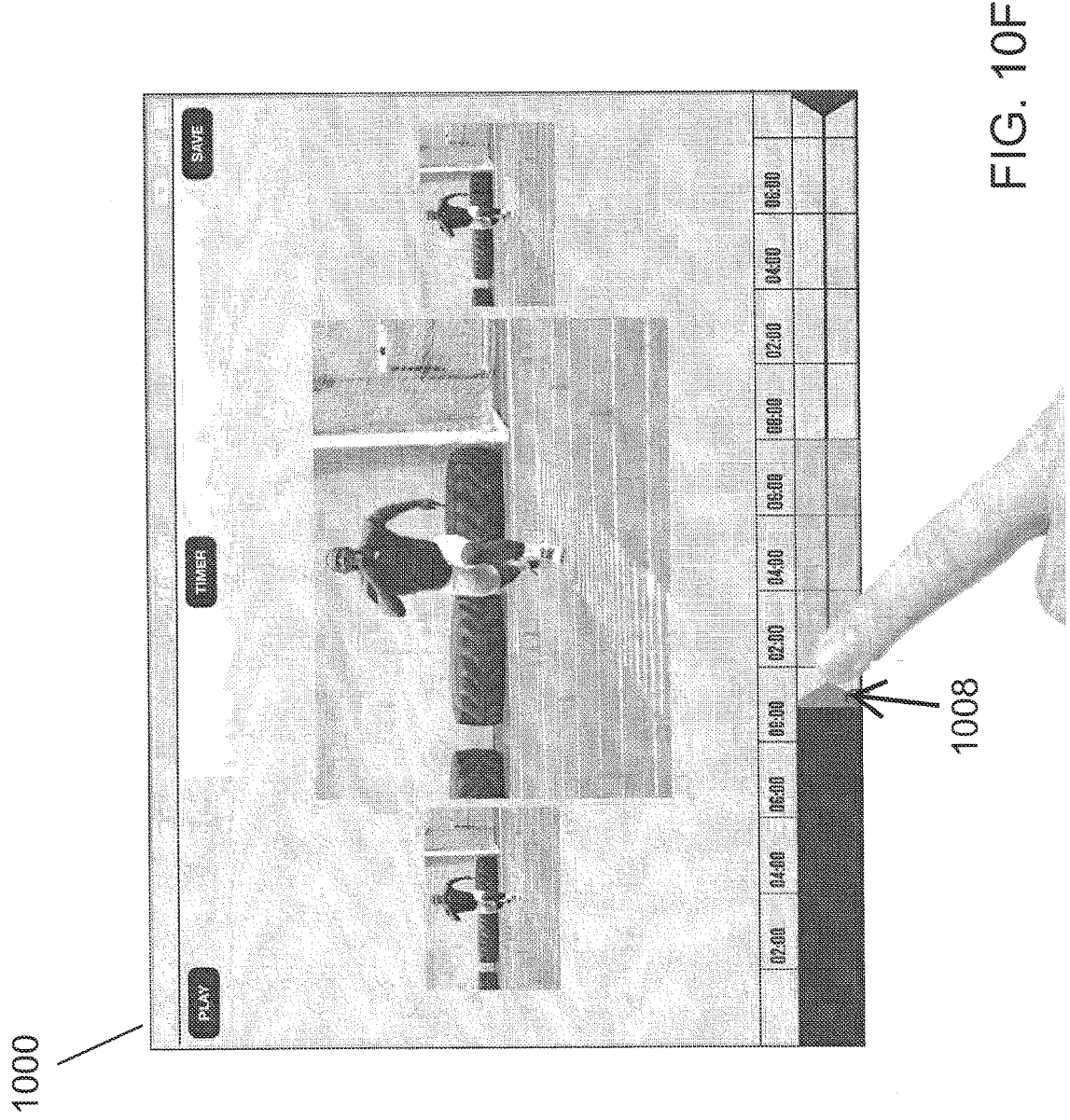

In one embodiment, selection of one or more input mechanism may cause the cessation of capturing any images, at any frame rate. For example, as seen in FIG. 10D, subsequent selection of the UI element 1002 (or another element) may cease capturing of images within the file comprising the image data captured at both the first and the second frame rate. After capturing images, the entire collection of captured images, which may be captured at multiple frame rates, may be observed within a UI, such as UI 1000.

In one embodiment, the captured images may be associated with a time line. (see, e.g., FIG. 10E). The portion of the timeline representing images captured at one of the frame rates (e.g. the "slow motion" frame rate) may be highlighted or otherwise displayed in a manner that distinguishes them from the images captured at another frame rate (e.g., the "normal speed" frame rate). One example of this is shown by timeline portion 1006. In certain embodiments, the UI may permit editing of the captured images. UI Element 1007 may permit the playback of at least a portion of the images.

The UI may further permit the user to view each of the images, including in a sequential manner. The user may scroll through subsequent images, either in a forward or backwards direction, through interactions with the UI (e.g., UI 1000 or another interface or device). For example, looking to the example shown in FIG. 10F, a user may be able to swipe in a first direction (e.g., to the right) on a touchscreen to view prior sequential images (shown to the left) and swipe in a second direction (e.g., to the left) to see subsequent images (which may appear to the right of the main image currently being displayed). The UI may permit the user to use markers to indicate the boundaries of a cropping function. See, e.g., marker 1008 shown in FIG. 10F.

The UI may further include a selectable timer display element, e.g., timer element 1009. A UI may provide markers, such as along a timeline, configured to designate the location of the images associated with the activation and/or termination of the timing function or mechanism. Other images may also be designated by one or more markers. For example, a user may select the first and last frames for a cropping function to remove unwanted images. In certain embodiments, activating the timer display element may cause the presentation of timer markers ("sliders") on the UI 1000. See, e.g., marker 1010A/1010B shown by FIG. 10G. The user may adjust the location of the sliders to mark the beginning and end of the timing function. (See e.g., FIG. 10H). For example, a user may want to show the respective time of a portion of the cropped images.

Figure 10I:
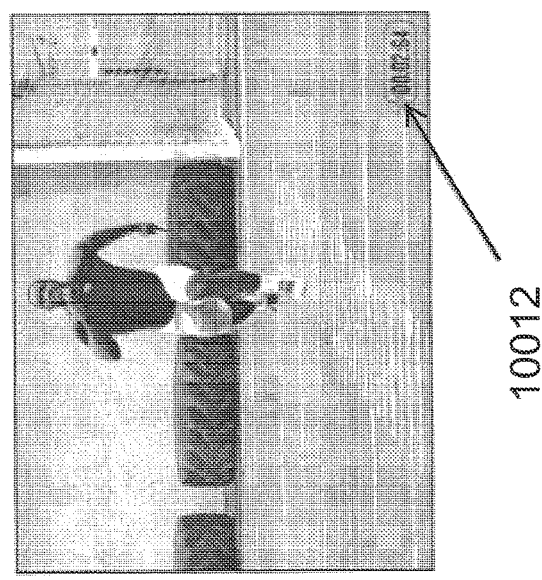

The UI may allow the user to identify the athlete and/or specify an activity being performed in the images. The UI may permit the user to save the cropped footage. The footage may be saved with the timer configured to be displayed during the selected portions or without the time (see, e.g., FIG. 10I, showing time being displayed as element 1012). In certain embodiments, the user may be able to upload a specific portion of the images, such as a portion indicated by markers, or a cropped portion of images, to a website or social network. In another implementation, an exported video may be saved locally. Regardless of the video being stored locally or remotely, it may be saved with the timer configured to be displayed during the selected portions. A cover image may be selected to represent the exported image data. In one embodiment, the cover image may be an image within the exported video. In one embodiment, the final frame of the video may be utilized. Yet in other embodiments, sensor data may be used to determine the cover image.

In one embodiment, the output of systems and methods described herein includes a single electronic file containing image data (which may be or include pixel data) representing a first series of sequential images captured at a first rate and a second series of sequential images captured at a second frame rate. The single file may be stored and/or configured to be played such that images captured at a second frame rate are displayed such that they appear to represent slow motion. It can be appreciated that one aspect of this disclosure is directed towards a single UI that allows a user to capture a first group of sequential images. The UI may be configured to capture the image data such that at least a portion of the first group of images includes a first series of sequential images captured at a first rate and a second series of sequential images captured at a second frame rate, wherein the capturing is user selectable. The user selection may occur as the images are captured, such by activating a UI input element to acquire images at a second frame rate. In other embodiments, images may be captured at a first rate that is faster than a second rate. Then after capture, the user may provide a user input to adjust the frame rate of images captured at the faster rate, such that they are flagged or even permanently changed to be displayed at a slower frame rate during playback. For example, images may be captured at a first frame rate of 120 frames per second, and a user may provide a user input (or an automated process may conduct actions to achieve the same results) to flag certain images as being 30 fps. For example, every 4$^{th}$ image of the images captured at 120 fps may be utilized. Thus, during payback the flagged or altered images may be played such as to create an appearance of normal speed, while the unaltered images (captured at 120 fps) at a constant 30 fps rate, thus creating an appearance of slow motion.

In various testing scenarios, which may be independent of, or alternatively incorporate at least a portion of the teachings herein, an athlete's athletic performance may tend to have a direct relationship with the athlete's athleticism. Moreover, an athlete's potential for athletic performance in a specific sport may tend to have relationship with the athlete's athleticism in respect of such sport. In turn, athleticism could be determined by various performance characteristics, including, as examples, speed, agility, reaction time, quickness, and power. Accordingly, to identify athleticism and potential for athletic performance, coaches and recruiters tend to seek those athletes that demonstrate superior performance attributes as to one or more of these performance characteristics and, in particular, as to sport-specific set(s) of these performance characteristics. Moreover, athletes seek to demonstrate such superior performance attributes for such coaches and recruiters.

One method for evaluating and comparing athleticism among athletes for a particular sport involves the athletes performing a defined set of sport-specific exercises and/or drills. Athletes who perform the defined set with superior performance attributes (e.g., less time and/or greater precision) may be anticipated to have greater potential in that sport. For example, "cone drills" are routinely used in training and evaluating athletes who play basketball. In a typical "cone drill" the athlete must follow a predetermined course between several marker cones and, in the process, execute a number of rapid direction changes, and/or switch from among forward, backward, lateral or other directional movements. The athlete is challenged to complete the drill quickly and properly. Athletes demonstrating shorter times and higher precision in a "cone drill" may be prized over those with either/both slower times or lower accuracy.

Such methods for evaluating and comparing athleticism tends to be employed in a variety of institutions (e.g., high schools, colleges, training camps, conditioning or performance gyms, and amateur and professional teams). So employed, the method tends to be implemented in reliance on the subjective evaluation of the coach or the coach's agent, or on timing and other measuring devices which are manually operated by a human operator, or both. Given this human element, such methods so implemented may be subject to variance and error, any of which variance and error may tend to undermine the method's results and, thus, legitimacy, thereby confounding reliable interpretation of results. Among other things, subject to any such variance or error, the method may result in, variously, some athletes being linked to a lower athleticism than merited, some athletes being linked to a higher athleticism than merited, some athletes being incorrectly linked to athleticism well suited to one sport (i.e., their athleticism is actually well suited to another sport), etc.

Moreover, even though such methods may be employed in a variety of institutions, the availability of the methods may tend to be relatively constrained. For example, at institutions where certain equipment and staff time are deemed precious resources, coaches may determine which athletes are given access to these methods of performance evaluation. In other cases, the methods may be perceived by coaches and institutional operators as too technical or as imposing a sufficient operational burden as to be eschewed altogether in favor of a more qualitative and subjective assessment. As such, an individual athlete will tend not to have independent access to the method, including so as to self-evaluate via use of the method and/or to provide the method's results—i.e., as an objective measure of athleticism and athletic potential—in seeking the attention of a prospective coach or recruiter.

In accordance with various systems and methods provided herein relate to assessing an athlete's athleticism, while addressing measurement issues associated with the human element and also while relieving an operational burden of standardized assessment, thereby fostering the athlete's independence to employ the systems and methods. In example embodiments, the systems and methods are directed toward enabling an athleticism rating and/or scoring method for normalizing as well as reliably and precisely comparing overall athletic performance among athletes (herein, such scoring and/or rating method(s) are sometimes collectively referred to by either one of these two terms alone). In example embodiments, athleticism rating systems and methods may be employed independently by the athlete. That is, the athlete may be enabled to so employ the systems and methods without oversight by, or participation of, and otherwise separate from, any institution, coach, trainer, or recruiter, or an agent of any of these. As well, the athlete may be enabled not only to employ the systems and methods independently, but also to do so properly, i.e., so as to obtain reliable, independently verifiable results, rating(s) and/or score(s).

Via example systems and methods, the athlete is enabled to obtain their respective rating(s) responsive to their personal interests, desires or motivations. As an example, the athlete may elect to obtain self-selected athleticism ratings, wherein each such individual rating is associated with a respective sport selected by the athlete. As well, the athlete may elect to obtain one or more athleticism rating(s) for any or no reason, including, e.g., in order to: (i) satisfy the athlete's curiosity (e.g., whether the athlete is a "weekend warrior", a fitness enthusiast, or any other person who pursues a sport or any other activity, that athlete may seek insight into their capabilities, including strengths and weaknesses among performance characteristics, relative to peers); (ii) identify and focus on the sport or sports in which the so-obtained rating(s) indicate potential for greatest or superior performance; (iii) identify and emphasize improvement as to any one or more performance characteristic(s) that may lag other characteristics of athletic development, that may separate (positively or negatively) the athlete from other athletes, particularly athletes of similar age, competitive level or other selection criteria, or that otherwise may bear improvement; (iv) identify and de-emphasize improvement as to any one or more performance characteristic(s); and/or (iv) obtain objective support for the athlete's ambitions, e.g., for submission of the ratings to a particular coach, qualified talent evaluator, team, institution or competition with whom or which the athlete seeks to align.

In such athleticism rating and scoring systems and methods, an athlete performs one or more physical activities, exercises, drills or other performance tests (herein, such exercises, drills and other performance tests are sometimes referred to by the term "performance tests"). In example embodiments, a performance test may contemplate test component(s) and an activity space. An activity space (aka testing 'footprint') manifests physical context elements and/or parametric elements (such physical context and parametric elements sometimes referred to herein by the term "test elements"). An activity space may be variously implemented, including, e.g., one or more context elements (such as, boundaries, area(s), equipment, and the like) and/or one or more parametric elements (such as, ambient conditions, rules, procedures, drill protocols, and the like). A test component may contemplate any of, e.g., an athlete's body position, an athlete's body orientation, movement, or action, or an absence or substantial absence of any of same; or a change as to any of same; or a change of state of a test element (e.g., equipment changing state, such as being released and/or landing) as relates to the athlete's performance of a test. A test component contemplating an athlete's body position or orientation may comprise, as to the athlete's body or body parts, relative positioning or orientation among two or more body parts, or positioning or orientation of the body or body part(s) relative to one or more test elements, or combinations of same.

Figure 7A:
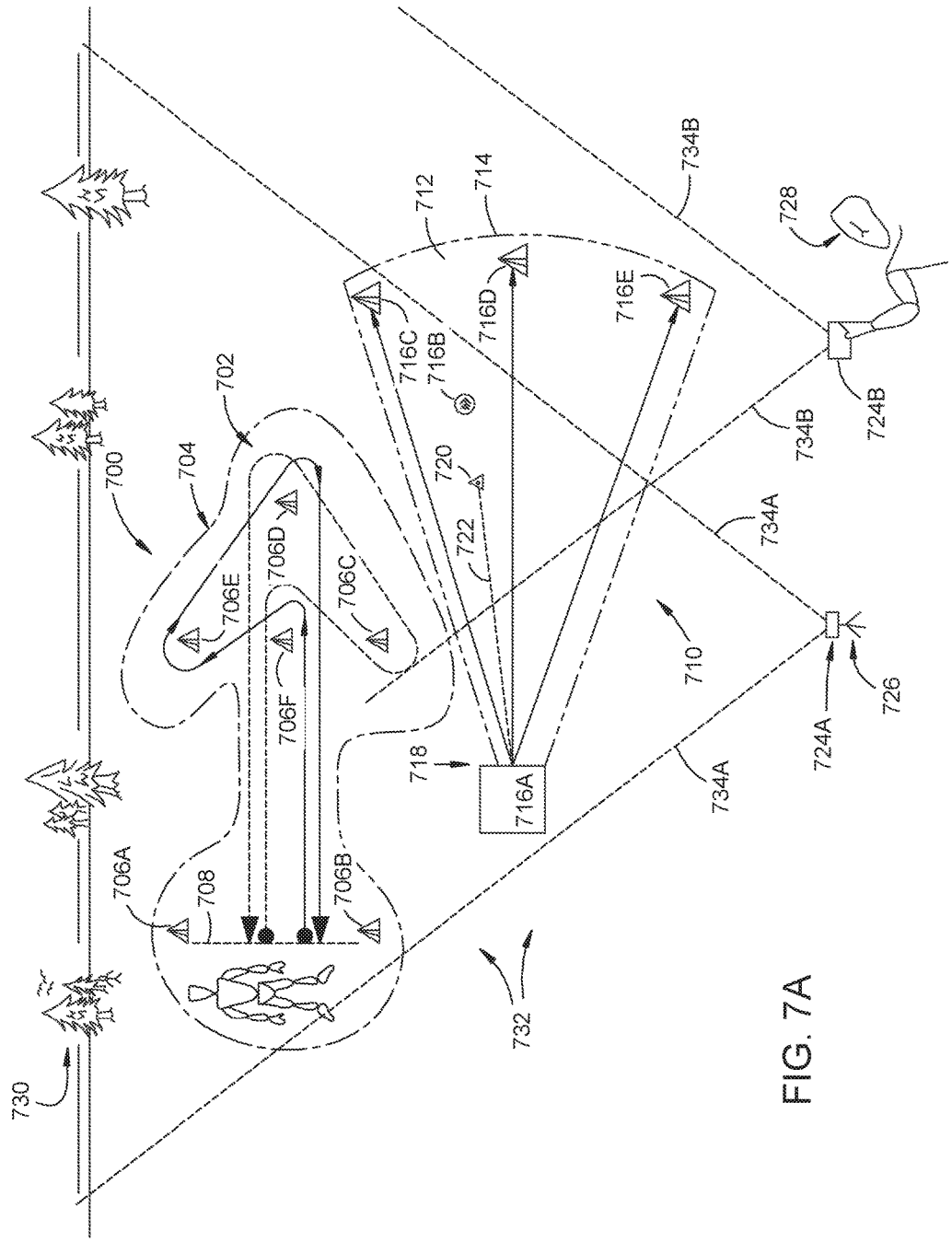
FIGS. 7A and 7B show an example activity space comprising illustrative test elements.
Figure 7B:
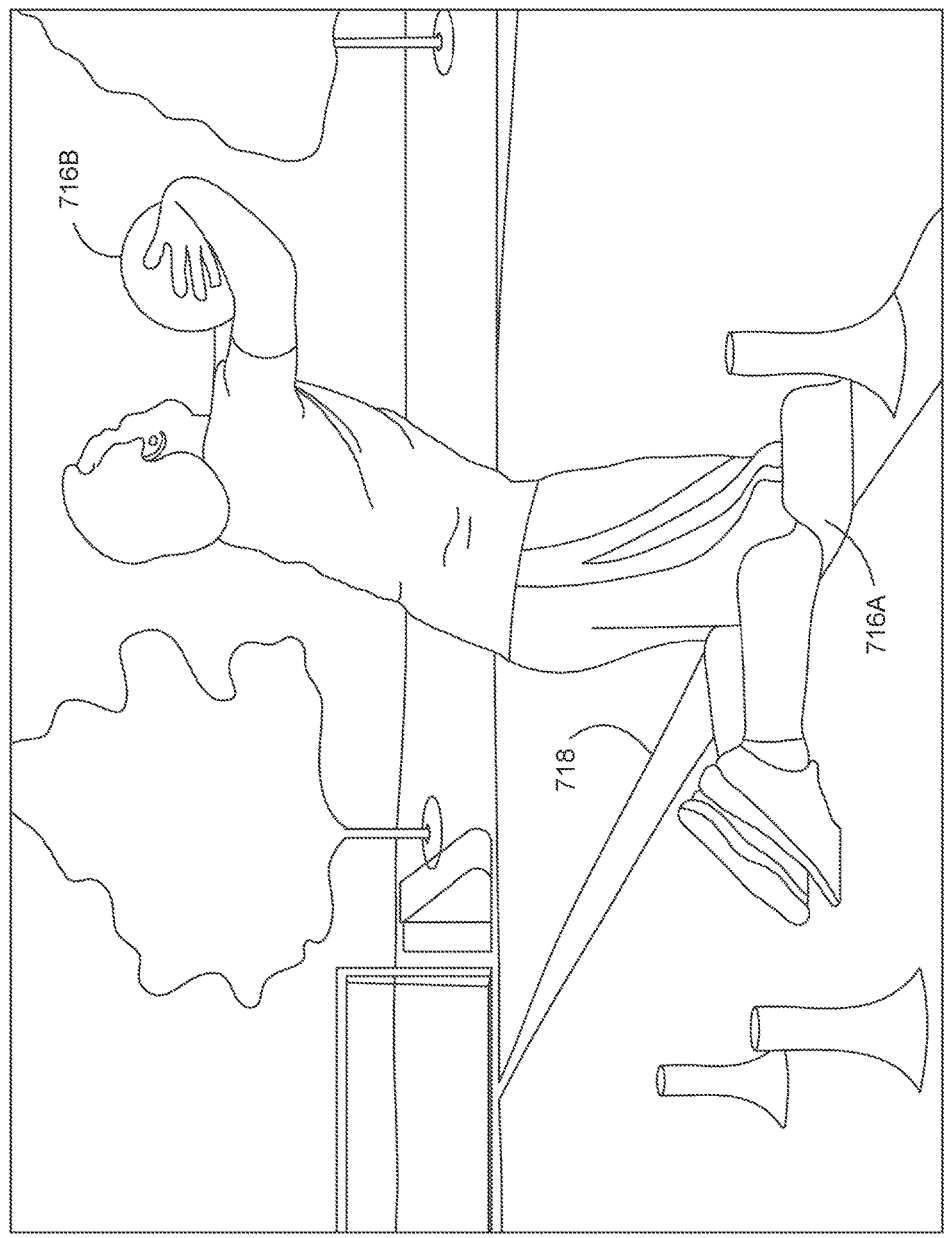

FIGS. 7A and 7B show an example activity space comprising illustrative test elements. With reference to FIG. 7A, activity space 700 illustrates example test elements. Activity space 700 is associated with an Arrowhead Agility performance test, which test may be various configured with respect to test elements. As to test elements, activity space 700 may include area 702, equipment 706A-F, and a start-finish line 708 (referred to sometimes herein by the term "start-stop line"). The area 702 may have a boundary 704, which boundary may or may not be defined, demarcated or otherwise observable/known by the athlete. Within area 702, the equipment 706A-F may be positioned at prescribed locations, which equipment may thereby indicate to the athlete various locations for changes in direction or activities in performing the test. The equipment 706A-F may indicate to the athlete the start-stop line 708. In an example, the equipment 706A-F includes markers, such as cones, arranged in a predetermined formation: (i) four cones 706A, B, C, E are positioned to form a square with ten-meter sides; (ii) a cone 706F is centered on the line between cones 706C and 706E; and (iii) cone 706D is positioned on a line perpendicular to the line formed by cones 706C, 706F and 706E, at a distance, e.g., five meters, from 706F, distally from cones 706A, B. The area 702 may be established in, e.g., a portion of a yard, a field, a park, a sporting field, a parking lot, or any other area that adequately supports the athlete's proper performance of the performance test. In this example, area 702 is anticipated to be a level, firm, non-slippery surface, etc. or at least substantially so (e.g., absent ridges, raised obstacles, holes, bog, mud, slick areas, etc.). In example embodiments, activity space 700 may exclude any one or more of the foregoing, including all of the foregoing, or may include any one or more of the foregoing in combination with one or more alternative or additional test elements.

With further reference to FIG. 1D, the activity space 700 may include various test elements other than those described above. In example embodiments, test elements may include one or more of the following, e.g.: (i) the athlete starts on or behind the start-stop line 708 (e.g., all points of the stance are on or behind, but not over, the start-stop line 708); (ii) no cone may be touched or otherwise disturbed at any time; (iii) on the respective run from the start-stop line 708, cones 706F, 706E, and 706D are to be rounded, in that order, in the directions shown in FIG. 1D, with each cone not being stepped over; (iv) on the respective run from the start-stop line 708, cones 706F, 706D, and 706D are to be rounded, in that order, in the directions shown, with each cone not being stepped over; (v) on the respective runs from cone 706D toward the start-finish line 708, the run is between either cones 706F and 706E, or cones 706F and 706C, as shown in FIG. 1D; (vi) a predetermined number of repetitions are performed (e.g., four repetitions, with 2 in each direction); and/or (vii) between each repetition, a predetermined latency ('recovery interval') is employed (e.g., a max of 5 minutes between each repetition, with or without a minimum recovery period). In example embodiments, test elements may exclude any one or more of the foregoing, including all of the foregoing, or may include any one or more of the foregoing in combination with one or more alternative or additional test elements.

In various implementations, tests, such as an Arrowhead Agility performance test, may contemplate various test components performed in activity space 700. In example embodiments, test components may include one or more of the following, e.g.: (i) the athlete assumes a prescribed, initial position (e.g., four-point sprinter's stance, three-point football stance, two-point runner's stance); (ii) the athlete, in stance, remains motionlessness or substantially motionlessness (e.g., no rocking, forward lean or counter-movement) for a prescribed time prior to test start (e.g., 1 or more seconds, or such other time, and in any case so as to support the purposes of standardized test conditions in athleticism rating and, in some examples described herein, in image processing); (iii) the athlete's first movement or substantial movement defines test start (e.g., movement of a particular body part, or movement of plural body parts, or relative movement among plural body parts, or aggregate body movement); (iv) the athlete's time from the start-stop line 708 to initiation of rounding of cone 706F; (v) while rounding cone 706F, relative positioning or orientation among two or more body parts, or positioning or orientation of the body or body part(s) relative to cone 706F and/or the ground, or combinations of same (e.g., seeking maxima or minima, or other statistical indicia respecting the component); (vi) athlete's time from cone 706F to cone 706E (e.g., the time from completing the rounding of cone 706F to initiation of rounding of cone 706E); (vii) while rounding cone 706E, relative positioning or orientation among two or more body parts, or positioning or orientation of the body or body part(s) relative to cone 706E and/or the ground, or combinations of same (e.g., seeking maxima or minima, or other statistical indicia respecting the component); (viii) athlete's time from cone 706E to cone 706D (e.g., the time from completing the rounding of cone 706E to initiation of rounding of cone 706D); (ix) while rounding cone 706D, relative positioning or orientation among two or more body parts, or positioning or orientation of the body or body part(s) relative to cone 706D and/or the ground, or combinations of same (e.g., prescribing maxima or minima, or other statistical indicia respecting the component); (x) athlete's time from cone 706D to start-stop line 708 (e.g., the time from completing the rounding of cone 706D to reaching start-stop line 708); and/or (xi) test completion being when the athlete has crossed the start-stop line 708 (e.g., such crossing may be when any body part, specific body part(s) or the entire body has intersected such line, or has wholly passed beyond such line in the direction distal from cone 706D). (As per the above list of test components, or any other list of test components of a performance test, a test component between test start and test completion are sometimes referred to herein as "test milestone".) In example embodiments, test components may exclude any one or more of the foregoing, including all of the foregoing, or may include any one or more of the foregoing in combination with one or more alternative or additional test components.

As to the example Arrowhead Agility performance test, test results (as described below) may be assessed from the total elapsed time from test start (see above re: first movement associated with the athlete's initiation of the performance test) to test completion (see above re: crossing the start-stop line 708). Other test results may or may not be assessed from one or more of the other listed, or of alternative or additional, test components, alone or in any combination.

Further referencing FIGS. 7A and 7B, activity space 710 illustrates example test elements. Activity space 710 is associated with a kneeling power ball chest launch performance test, which test may be variously configured with respect to test elements. As to test elements, activity space 710 may include an area 712, equipment 716A-E, and a launch line 718. The equipment 716B may be a power ball (e.g., a fitness ball, such as a medicine ball, of prescribed weight). The equipment 716A may indicate to the athlete the launch line 718. Moreover, in example embodiments, the equipment 716A may include a pad, rug, or other surface, which may be planar or flex to the surface beneath, on which the athlete may kneel (e.g., comfortably) to perform the test, i.e. to launch the power ball 716B. The area 712 may have a boundary 714, which boundary is shown in the example embodiment of FIG. 7A as generally demarcated, but which boundary in other example embodiments may or may not be defined, demarcated or otherwise observable/known by the athlete. As shown, within the area 712, the boundary is generally demarcated by equipment 716A and 716C-E positioned at prescribed locations, whereby the equipment indicates the boundary 714 wherein the ball may be thrown in performing the test. The equipment 716C-E may include cones placed at prescribed distance(s) from the equipment 716A and/or launch line 718 (e.g., the distances may be one or more radial distances so that the equipment 716A, 716C and 716E describe an angle, which angle may be bisected by the line formed between equipment 716A and equipment 716D). The area 712 may be established in, e.g., a portion of a yard, a field, park, a sporting field, a parking lot, or any other area that adequately supports the athlete's proper performance of the performance test. In example embodiments, activity space 710 may exclude any one or more of the foregoing, including all of the foregoing, or may include any one or more of the foregoing in combination with one or more alternative or additional test elements.

With further reference to FIG. 7A, the activity space 710 may include various test elements other than those described above. In example embodiments, test elements may include one or more of the following, e.g.: (i) in an initial, kneeling position, the athlete's knees may be on, or behind, but not over the launch line 718; (ii) so kneeling, the athlete's knees are to be parallel, and the athlete's feet are to be plantar flexed, i.e., pointed away from the launch direction, with the toes flush to ground, pointed or substantially pointed (e.g., the toes may not be curled so as to provide additional bracing force to the ground); (iii) the ball is to be grasped with both hands, the hands being aligned with a diameter of the ball and being positioned on opposite sides of the ball; (iv) the knees are to remain in contact with the ground or kneepad until at least the release of the ball (e.g., the complete release of the ball, such that no portion of the ball remains in contact with any part of the athlete's body); (v) the ball 716B is to land within boundary 714; and (vii) the athlete's body or portions of the body may not cross the launch line until the ball is fully released. In example embodiments, test elements may exclude any one or more of the foregoing, including all of the foregoing, or may include any one or more of the foregoing in combination with one or more alternative or additional test elements.

With reference to FIGS. 7A and 7B, a kneeling power ball chest launch performance test may contemplate various test components performed in activity space 710. In example embodiments, test components may include one or more of the following, e.g.: (i) the athlete assumes a prescribed, initial position (e.g., kneeling, with the back erect and facing toward equipment 716C-E), while holding the arms (including the ball 716B) out and above the head); (ii) the athlete, in the initial, kneeling position, remains motionless or substantially motionless (e.g., no rocking or similar movement) for a prescribed time prior to test start (e.g., 1 or more seconds, or such other time, and in any case so as to support the purposes of motionlessness in athleticism rating and, in some examples described herein, in image processing); (iii) the athlete's first movement or substantial movement (e.g., the ball being brought down to the chest as the hips are brought back to the heels); (iv) the athlete's movement of a particular body part, or movement of plural body parts, or relative movement among plural body parts, or aggregate body movement, relating to the translating the ball forward and up toward the release point; (v) the athlete launches the ball via both hands, without favoring one arm, without a throwing rotation of either arm and without rotation about the spine; (vi) test start, i.e., the athlete's release of the ball; and, (vii) test completion, i.e., the ball landing, e.g., at a landing point 720 at a distance from the launch line 718, in a direction toward equipment 716C-E. In example embodiments, test components may exclude any one or more of the foregoing, including all of the foregoing, or may include any one or more of the foregoing in combination with one or more alternative or additional test components.

As to the kneeling power ball chest launch performance test, test results (as described below) may be assessed as the distance between the launch line 718 (e.g., the edge in the direction of the equipment 716C-E) and the landing point 720 (e.g., the central point of the where the ball first lands). Such test results may be obtained from the elapsed time between the release of the ball and the ball landing. Additionally or alternatively, such test results may be obtained by a computation following from the flight time from release to landing. Other test results may or may not be assessed from one or more of other listed, or alternative or additional, test components, alone or in any combination.

Some test elements associated with activity spaces 700 and/or 710 are shown in FIG. 7A, while others are not. Additional test elements may include ambient conditions, such as, e.g., wind speed and direction, ground condition, rain or other precipitation, temperature, humidity, and the like. Violations of one or more of these conditions may or may not void the test. In example embodiments, the conditions may be employed to annotate the test results. As another example, the conditions may be factored into the performance test, including, e.g., to adjust the test results for comparison or to modify the scoring or rating employing non-adjusted test results.

In such athleticism rating and scoring systems and methods, the athlete's performance of performance test(s) is measured and/or otherwise converted into representative data (herein, such measurement and/or conversion is sometimes referred to by the term "measurement", as well as its derivatives thereof; and, such representative data sometimes is referred to by the term "test results"). In example embodiments, measurements may include dimensional metrics, such as, e.g., time (e.g., elapsed time, of a run, jump or agility test, or of a thrown ball's flight), distance (e.g., distance of a thrown object's flight), angle (e.g., angle of change in direction), and/or position (e.g., one body part relative to another or relative to a reference, such as the ground or an obstacle). In example embodiments, measurements may include non-dimensional metrics, such as, e.g., counts. Such non-dimensional metrics may be applied to, e.g.: (i) repetitions, e.g., a count of executions of test component(s) in a performance test (for example, total number of push-ups executed in a fixed time, whether the execution is proper or not); and/or (ii) fouls, e.g., a count of errors in a performance test (for example, total number of push-ups in which the athlete bounced their chest off the ground).

Fouls and any associated foul metrics may be implemented variously within a performance test. Implemented "fouls" may be associated, e.g., with the athlete's improper execution of one or more test components of a performance test and/or with the athlete's improper departure from an activity space. An athlete's improper execution of a test component may include, as examples: crossing of legs/feet during a shuffle movement (e.g., wherein a proper shuffle contemplates movement via legs/feet repeatedly being separated and then brought together, without crossing); failing to reach or exceed a threshold angle among body parts (e.g., a knee bend in a lunge or a squat); and/or tumbling or other gross loss of body control. An athlete's improper departure from an activity space may include, as examples: moving or being outside any area or boundary inside which a performance test is to be performed (e.g., in the kneeling launch test, throwing the ball outside the boundary 714); disturbing a test element (e.g., upending a cone in an agility course); failing to interact properly with a test element (e.g., failing to touch a cone when such touch is a test element; or touching a cone when not touching is a test element; or failing to round a cone or to stay to the inside or outside of a cone; etc.); failing to abide a test element (e.g., failing to maintain prescribed time conditions, such as motionlessness for a set time, or executing a repetition after a latency period and/or recovery interval has expired); and/or improperly exploiting a test element (e.g., pushing or pulling on a course marker as impetus for a test's change-of-direction, or bouncing one's chest off the ground as impetus for the upward movement in a push-up).

In example embodiments, foul(s) and any associated metric(s) may be consequential. Consequences may be variously implemented, including, e.g.: (a) disqualification (aka rejection) of a test result (such as responsive to, e.g., any of: a false start, a running start, an improper ball grasp during or rocking movement in a kneeling power ball chest launch test, assuming a position that delivers an unfair advantage in a test; a foul exceeding a predetermined threshold; any/or an aggregate foul count exceeding a predetermined threshold); (b) adding a predetermined time quantum to a test result measured via of time metric, e.g., such time quantum being responsive to the time benefit accrued due to the improper movement, possibly together with a penalty (e.g., 0.02 seconds for each upended cone, wherein the benefit to the athlete's time is predetermined to be 0.01 seconds for each such upended cone and wherein 0.01 seconds is assessed as a penalty); or (c) subtracting a predetermined distance quantum to a test result measured via of distance metric, e.g., such distance quantum being responsive to the benefit accrued due to the improper movement, possibly together with a penalty. In example embodiments, the resultant test results are the test results from measurement, as subjected to any adjustment (e.g., via disqualification, addition, subtraction or otherwise).

In example embodiments, only consequential fouls are detected, measured and acted on, such as being reported as to, treated or otherwise included in or with, test results. In example embodiments, consequential fouls may be acted on by negating test results. In example embodiments, non-consequential fouls may be detected (alone or together with consequential fouls), which detection may be acted on, e.g., for coaching or other direction, such as to instruct the athlete toward addressing such fouls and, thereby, enabling improvement of test results.

In example embodiments, a performance test may be directed to an athletic skill. In example embodiments, each performance test may be directed to a respective athletic skill. In example embodiments, at least one performance test may be directed to more than one athletic skill. In example embodiments, at least one performance test may be directed to more than one athletic skill and that test shares at least one such athletic skill with another performance test. In example embodiments, not only are the performance test(s) linked to athletic skill(s), e.g., in any of the various combinations set forth above, but also at least one athletic skill has particular relevance to a sport motivating the undertaking of performance testing. Generally, whether or not a performance test is directed to an athletic skill, a performance test implicates performance characteristics, including, as examples, speed, agility, reaction time, quickness, and power.

In an illustrative example applicable to basketball, a battery of performance tests may be formulated so as to evaluate athletic skills particular to that sport. For example, the battery of performance tests may include one or more of, e.g.: a no-step vertical jump, a kneeling power ball chest launch, a ¾-court sprint, and a lane agility drill. The kneeling power ball chest launch conforms to the test previously described herein. The ¾-court sprint is a sprint conducted on a basketball court. The no-step vertical jump contemplates a standing, two-footed jump, typically conducted in bare or stocking feet, starting from a prescribed squat or standing position, and from such position, the athlete explodes to project themselves upwardly using both arms and legs (e.g., from the standing position, the athlete coils via, e.g., bending of the knees, before uncoiling to explode upwardly), whereby test results may be assessed, e.g., as to the time in the air, or otherwise. The lane agility drill contemplates a timed navigation around a basketball lane demarcated by cones, including forward/backward running movements, side-to-side shuffling, coupled with one or more location-specific, court-floor touches and other form requirements, whereby test results may be assessed, e.g., as to the time to completely navigate the lane, subject to fouls, e.g., for falling down, for upending a cone, for failure as to form requirements and/or for failing to shuffle at all or properly.

Each such performance test may be included in such battery because the test relates to at least one athletic skill relevant to basketball. For example, the vertical jump test reflects explosive power which may manifest rebounding ability and/or shot-blocking skills. In turn, the power-ball chest launch reflects upper-body power which may manifest post-up skills, rebounding skills, and/or defensive skills. The court sprint may manifest skills for offense (e.g., fast breaking ahead of defenders), defense (e.g., getting back to cover) and/or the floor game (e.g., running down a loose ball). The lane agility drill may manifest defensive skills (e.g., shutdown, one-on-one defending). As well, each such performance test implicates performance characteristics (e.g., vertical jump and chest launch implicate, respectively, lower and upper body power; the sprint implicates speed, the lane agility drill implicates speed, agility and quickness).

Via the systems and methods set forth herein, an athlete's conduct of performance test(s) leads to test results, rating(s) and/or score(s) that may be predictive, indicative or otherwise representative of the athlete's potential in a specific sport, in various sports, in any sport, in one non-specified sport, or in one or more other activities (herein, such "predictive, indicative or representative" is sometimes referred to by the term "representative" or its derivatives). The athlete's potential may be represented by the raw test results from any one or more performance test(s). The athlete's potential may be represented by a combination of two or more test results. The athlete's potential may be represented by applying test results in an analytical framework, whether the test results as applied individually and/or in various combinations. In example embodiments, test results may be applied in an analytical framework toward obtaining an athletic rating or score. In example embodiments, test results may be applied in an analytical framework that employs statistical analysis techniques toward obtaining an athletic rating or score, including, e.g., an athletic rating or score that is related to data associated with a universe of athletes. In example embodiments, an analytical framework may provide: (i) test results from each performance test for a given athlete are normalized by comparing the test results to a database providing the distribution of test results among a universe of athletes; (ii) based on that test results' percentile rank among the distribution of test results, each of the test results is assigned a raw score; and (iii) so-assigned raw scores derived from the at least two different performance tests for an athlete are used to produce an athleticism rating or score. In example embodiments, an analytical framework may follow the framework set forth above, while employing a universe of athletes similar to the given athlete, wherein, e.g., such similarity may be based on factors such as age, gender, sport, competition type (e.g., college, club, high school, etc.), playing level (e.g., varsity, regional-select, practice-squad, recreational, etc.) or other factors, including combinations of any of these and/or other factors. In example embodiments, an analytical framework may follow the framework set forth above, while also applying (with or without the employ of the universe of similar athletes described above) a scaling factor to the athleticism rating or score, whereby the ratings or scores of the given athlete and among a group of tested athletes fall within a desired range. Exemplary systems and methods for providing an athletic rating or score are described in U.S. Pat. No. 8,292,788, which is incorporated herein by reference in its entirety for any and all non-limiting purposes.

Figure 8:
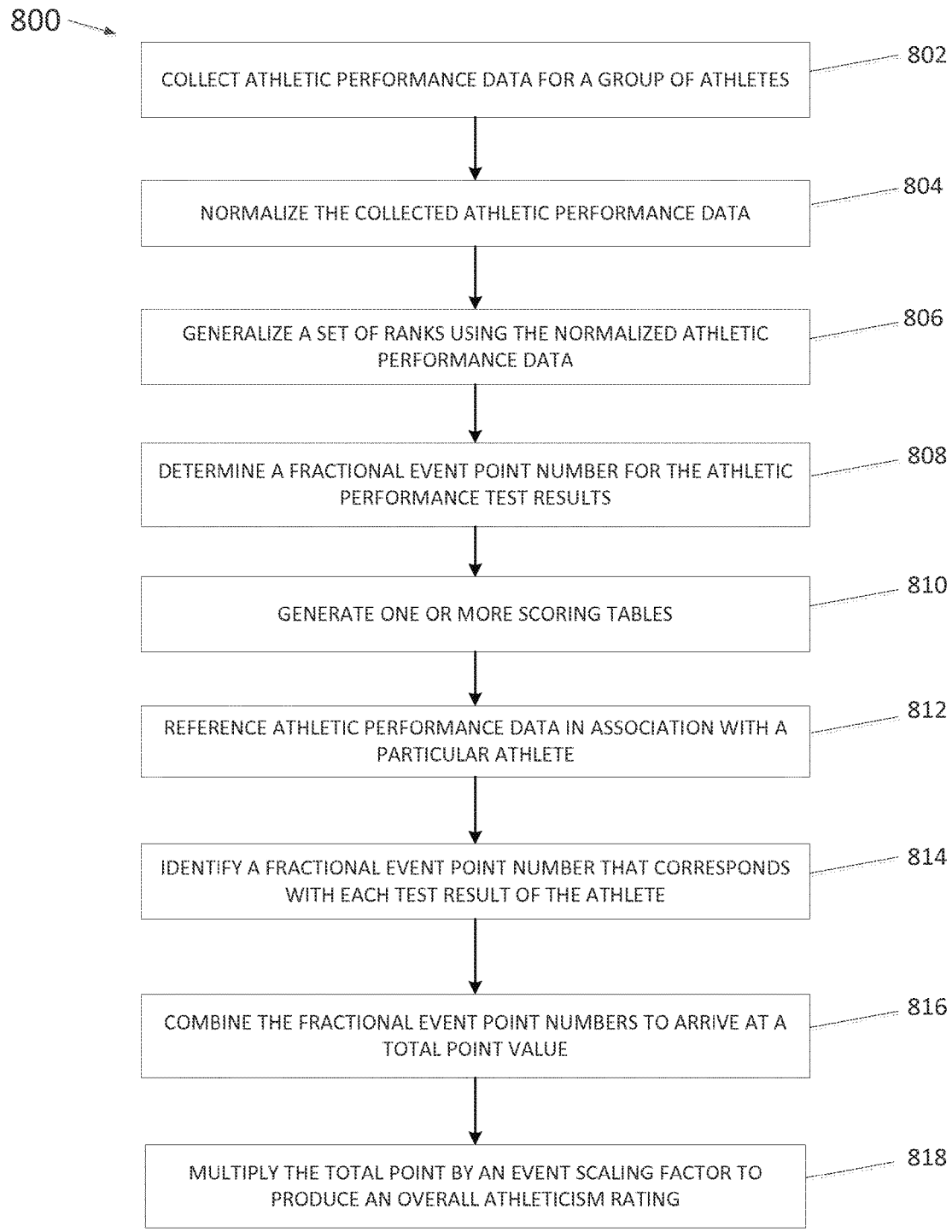
FIG. 8 is a flowchart of an example method that may be implemented to generate an athleticism rating or score in accordance with certain embodiments.

With reference to FIG. 8, an example method 800 for generating an athleticism rating or score is illustrated. An athleticism rating or score may be generated for a particular athlete in association with a defined sport, such as basketball. Such an athleticism rating or score may then be used, for example, to recognize athleticism of an individual and/or to compare athletes.

Initially, at step 802, athletic performance data related to a particular sport is collected for a group of athletes. Athletic performance data might include, by way of example and not limitation, test results from a battery of basketball-directed performance tests described above, or any of these, alone or together with one or more other performance tests. Athletic performance data may be recorded for a statistically relevant sample size of athletes, e.g., hundreds or thousands. Such athletic performance data may be stored on a computer readable medium, such as in a data store (e.g., a database).

At step 804, the collected athletic performance data, such as test results from performance tests as described herein, may be normalized. In example embodiments, test results (e.g., raw test results) for each performance test conducted in association with a defined sport may be normalized. In example embodiments, raw test results for each athlete may be standardized in accordance with a common scale. Normalization enables a comparison of data corresponding with different performance tests. In one embodiment, a normalized athletic performance datum is a percentile of the empirical cumulative distribution function (ECDF). As one skilled in the art will appreciate, any method may be utilized to obtain normalized performance data (i.e., athletic performance data that has been normalized).

At step 806, the normalized athletic performance data may be used to generate a set of ranks. The set of ranks includes an assigned rank for each athletic performance test result included within a scoring table. A scoring table (e.g., a lookup table) includes a set of athletic performance test results, or possibilities thereof. Each athletic performance test result within a scoring table corresponds with an assigned rank and/or a fractional event point number. In one embodiment, the athletic performance data is sorted and a percentile of the empirical cumulative distribution function (ECDF) is calculated for each value. As such, the percentile of the empirical cumulative distribution function represents a rank for a specific athletic performance test result included in the scoring table. In this regard, each athletic performance test result is assigned a rank based on that test result's percentile among the normal distribution of test results. The rank (e.g., percentile) depends on the raw test measurements and is a function of both the size of the normative data set and the component test values. A scoring table might include observed athletic performance test results and unobserved athletic performance test results. A rank that corresponds with an unobserved athletic performance test result may be assigned (imputed) using interpolation of the observed athletic performance test data.

At step 808, a fractional event point number (i.e. raw score) may be determined for each athletic performance test result. A fractional event point number for a particular athletic performance test result is determined or calculated based on the corresponding assigned rank. That is, the set of assigned ranks, or percentiles, is transformed into an appropriate point scale. In one embodiment, a statistical function, such as an inverse-Weibull transformation, provides such a transformation of the ECDF.

At step 810, one or more scoring tables may be generated. As previously mentioned, a scoring table (e.g., a lookup table) includes a set of athletic performance test results, or possibilities thereof. Each athletic performance test result within a scoring table corresponds with an assigned rank and/or a fractional event point number. In some cases, a single scoring table that includes data associated with multiple tests and/or sports may be generated. Alternatively, multiple scoring tables may be generated. For instance, a scoring table might be generated for each sport or for each athletic performance test. One or more scoring tables, or a portion thereof (e.g., athletic test results, assigned ranks, fractional event point numbers, etc.) may be stored in a data store, such as database.

As indicated at step 812, athletic performance data in association with a particular athlete is referenced (e.g., received, obtained, retrieved, identified, or the like). That is, as described herein, test results for a battery of performance tests may be referenced. As also described herein, the battery of performance tests may be predefined in accordance with a particular sport or other physical activity. As also described herein, using the systems and methods described herein, performance test(s) may be tracked and assessed by the particular athlete rendering the athlete independent in this regard from institutions, coaches, recruiters or the like. In example embodiments, the athlete may be enabled to do so, e.g., via use of one or more portable electronic device(s) which device(s) support capabilities further described herein, which capabilities include, but are not limited to, image acquisition, particularly acquisition of a sequence of images (e.g., such sequence of images including video frames and/or still images) with acquisition parameters so as to enable sufficient image data for image processing to yield outputs that, in turn, enable provision of test results. In example embodiments, such portable electronic device(s) may include a general purpose device, such as a smart phone (e.g., the HTC One X+) or may be a special purpose device (e.g., integrating capabilities specifically to provide a system and/or method in accordance with the descriptions herein). In example embodiments, as described further herein, such portable electronic device(s) are arranged by the athlete in association with the applicable activity space 700, 710 in order to enable image acquisition as to the respective performance test.

At step 814812, a fractional event point number that corresponds with each test result of the athlete may be identified. Using a scoring table, a fractional event point number may be looked up or recognized based on the athletic performance test result for the athlete. In certain embodiments, the best or other most suitable result from each test is translated into a fractional event point number by referencing the test result in the lookup table for each test. Although method 800 generally describes generating a scoring table having a rank and a fractional event point number that corresponds with each test result to use to lookup a fractional event point number for a specific athletic performance test result, alternative methods may be utilized to identify or determine a fractional event point number for a test result. For instance, in some cases, upon receiving an athlete's test results, a rank and/or a fractional event point number could be determined. In this regard, an algorithm may be performed in real time to calculate a fractional event point number for a specific athletic performance test result. By way of example only, an athletic performance test result for a particular athlete may be compared to a distribution of test results of athletic data for athletes similar to the athlete, and a percentile ranking for the test result may be determined. Thereafter, the percentile ranking for the test result may be transformed to a fractional event point number.

At step 816, the fractional event point number for each relevant test result for the athlete is combined or aggregated to arrive at a total point score. That is, the fractional event point number for each test result for the athlete is summed to calculate the athlete's total point score. At step 818, the total point score may be multiplied by an event scaling factor to produce an overall athleticism rating. An event scaling factor may be determined using the number of rated events and/or desired rating range. Athletic data associated with a particular athlete, such as athletic test results, ranks, fractional event point numbers, total point values, overall athleticism rating, or the like, may be stored on a non-transitory computer-readable medium, for example in a data store, such as a database.

Referring again to FIG. 7A and as described herein, in example embodiments, athleticism rating systems and methods may be employed by the athlete independently and yet to obtain credible test results, rating(s) or score(s). In example embodiments, the athlete may be enabled to do so, e.g., via use of one or more portable electronic device(s) 724A, 724B, which device(s) include image acquisition capabilities. In example embodiments, each such device's image acquisition capabilities are used to acquire images of a performance test. As shown in FIG. 7A, a portable electronic device 724A/B may be arranged by or for the athlete in association with the performance test's respective activity space 700, 710. So arranged, the portable electronic device 724A/B may be enabled to acquire images of the athlete's conduct as to a performance test.

A device 724 may be arranged to enable such image acquisition in various manners, including, e.g., by a mount or by being hand held. As shown in FIG. 7A, the athlete may arrange a portable electronic device 724B so that it is held by a second person (e.g., a friend, teammate or another athlete also self-directing their own performance tests, etc.). As also shown in FIG. 1D, the athlete may arrange a portable device 724A via a mount on a tripod 726, whereby the mount enables the device's field of view 734A for image acquisition to be directed so as to cover the respective performance test. Alternatively, and provided such image acquisition is enabled, the athlete may otherwise arrange a device 724 via other mounts or other fixed devices (herein referred to collectively by the term "mount" and its derivatives), including via, e.g.: (i) placement directly on turf or ground (e.g., if the activity space is an outdoor field, such as a playing field); (ii) placement directly on a court (e.g., if the activity space is a basketball, volleyball or other indoor court); (iii) insertion in a bag pocket; or (iv) mounting on an item located in association with the activity space (e.g., a tree, a basketball post, a football post, a lamp post, a wall, etc.). Alternatively, another individual 728, which may be a trainer, coach, friend, colleague or other person, may hold and/or operate the portable device 724.

Among these arrangements, a device 724 may be provided with lesser or greater stability. When arranged via a tripod 726, a device 724 typically is provided with substantial stability. When arranged via a mount other than a tripod 726, a device 724 typically is yet provided with a level of enhanced stability, at least as compared to a hand-held arrangement. By contrast, when in a hand-held arrangement, a device 724 may be provided with less stability, or inconsistent stability, as compared to a mounted arrangement.

When stably arranged, e.g., via a tripod 726, a device 724 tends not to move, or not to move substantially, during image acquisition of a performance test. That stable arrangement typically enables image acquisition without, or with insubstantial, impact as to the acquired images and associated image data. A less stable arrangement—or an arrangement providing stability below a minimum threshold (e.g., under ambient conditions)—tends to subject acquired images and associated image data to a non-insubstantial impact. Such impact may include, e.g., aberrant motion of objects in the imaging. As an example, the device's physical movement may cause an object to appear to have motion among the images, notwithstanding that the object's corresponding physical item may have been stationary during the images' acquisition. As another example, if an object's corresponding physical item were to have actually been moving during the images' acquisition, the object may appear to have motion that is greater or lesser than the corresponding item's actual, physical movement. With aberrant motion of objects caused by the device's physical movement (e.g., physical movement of the device's imaging acquisitions capabilities, particularly the imaging chip), all objects of the images are impacted. Accordingly, in example embodiments, systems and methods contemplate employ of image processing technologies for detecting, estimating and otherwise addressing such aberrant motion, which technologies may be selected not only for capabilities re such addressing role, but also for compatibility with the image-based measurements as to performance tests as contemplated herein and, thus, to support provision of credible test results.

As previously described with reference to FIG. 7A, a portable electronic device 724A, 724B may be arranged so that the device may be enabled to acquire images as to a performance test. In example embodiments, in acquiring images, a portable electronic device is not only arranged to enable image acquisition generally, but also positioned to provide proper image acquisition (i.e., image acquisition enabling image processing technologies to yield outputs enabling image-based measurements as to performance tests). Such positioning may respond to various factors, including, e.g., (i) the applicable test's activity space (e.g., physical dimensions) and (ii) the focal length, aperture and quality of the device's imaging lens, as well as the format/resolution applicable to the imaging. Generally, the lens' focal length is indicative of (i.e., inversely proportional to) the device's field of view 734A, B, while the focal length/aperture are indicative of the depth of field. The imaging's format/resolution is indicative of the amount of image data.

As an example with reference to FIG. 7A, a portable electronic device 724A may be positioned so that the device's field of view 734A enables image acquisition of the athlete as the athlete conducts the arrowhead agility performance test. In such positioning, the field of view 734A covers the entirety of the activity space 700, so as to enable imaging of all of the athlete's activities throughout the test. However, in order to cover that entirety within the field of view 734A, the device 724 may be positioned at a distance from the activity space 700 which distance has the activity space 700 toward, or even effectively in, the imaging's background 730. As well, the device 724 may be positioned at a distance which has the activity space 700 partly in the imaging's background 730 and partly in the imaging's foreground 732. In either case, one or more objects (such as, the object that corresponds to the athlete) may be insufficiently imaged, such that insufficient image data is available for image processing technologies to yield outputs enabling image-based measurements as to performance tests and, thus, to support provision of credible test results. In example embodiments, systems and methods contemplate employ of image processing technologies for detecting improper positioning, including, e.g., to notify the athlete to re-position.

As shown in FIG. 7A, a portable electronic device 724A, 724B may be properly positioned whether or not the field of view 734A, 734B covers the entirety of the performance test. As an example, as shown in FIG. 7A, the device 724A may be properly positioned and have its field of view 734A covering the entirety of the activity space 700 as to the arrowhead agility performance test. However, the device 724A, so positioned, has its field of view 734A not covering the entirety of the activity space 710 shown in FIG. 1D, which space 710 is associated with the kneeling power ball chest launch performance test. As to at least the portion of the activity space 710 that is not covered by the field of view 734A, a second portable electronic device 724B, via its field of view 734B, may be employed in order to provide entire coverage of the kneeling power ball chest launch performance test. Accordingly, in example embodiments, systems and methods may contemplate employment of communication/control technologies and/or image processing technologies, so as to variously coordinate plural portable electronic devices 724 (e.g., calibration, shutter synchronization and/or offsets) and process among such devices' plural sequences of acquired images (e.g., mosaic processing).

As described herein, in example embodiments, via use of one or more portable electronic device(s) 724A, 724B, an athlete may be enabled to employ athleticism rating systems and methods independently to obtain credible test results, rating(s) and/or score(s). In example embodiments, a portable electronic device 724A, 724B that so enables an athlete includes image acquisition capabilities. In example embodiments, a portable electronic device 724A, 724B includes not only image acquisition capabilities, but also other capabilities, including, e.g., one or more of: (i) processing capabilities; (ii) communication capabilities (e.g., supporting wireless communications for communications/control among portable electronic devices 724, as well as with other sensor, electronic or computer devices); (iii) networking capabilities (e.g., for communications in any one or more networks, such as body area networks (BAN), personal area networks (PAN), local area networks (LAN) and wide area networks (WAN)); (iv) data acquisition capabilities (e.g., via one or more sensors internal or external to the device 724, such as one or more accelerometer(s), gyroscope(s), compass(es), other magnetometers, barometer(s), other pressure sensor(s), thermometer(s), other temperature sensor(s), microphone(s), other sonic sensor(s) (e.g., ultra-sonic sensor(s)), infrared (iR) sensor(s), and/or other electromagnetic radiation sensor(s)); (v) input/control capabilities (e.g., including via physical buttons, logical buttons enabled via a touch screen, voice input controls, and/or other input controls); (vi) output/notification capabilities (e.g., via LED light(s), a display, a touch-sensitive display, speaker(s), other audio transducer); and/or (vii) location detection capabilities (e.g., for identifying location(s) relative to other devices 724, or relative to sensors, equipment, or devices, or relative to test elements or the activity space, such as by GPS, AGPS signal analysis, signal strength measurements, or other technologies, including via data acquired from sensors, transceivers or other electronic devices embedded in equipment, apparel, footwear and/or accessories, and/or in other device(s) 724, including in combination(s), and/or in combination(s) with other devices 724).

In example embodiments that include processing capabilities, such processing capabilities may be implemented so as to execute, or cause to be executed, one or more sets of software instructions, including, e.g., mobile software application(s) and/or embedded applications, and/or operating system(s). Such processing capabilities, executing one or more such software instruction set(s) may be implemented to control such image acquisition capabilities, in whole or in part (such software instruction set(s) herein sometimes referred to by the term "image acquisition software"). Such processing capabilities and image acquisition software, either alone or together, may enable, one or more of, as examples: acquisition of one or more sequences of images (e.g., sequences of still images and/or video frames, which sequences of images and/or frames are herein sometimes referred to by the term "images" or "imaging"); control of the start and stop of each such sequence (including, e.g., coordinating among plural devices' imaging acquisition capabilities); control of any latency applicable to any sequence (e.g., delay between sequences and/or time offset for starting acquisition, such as against a reference or among plural devices' image acquisition capabilities); control of the acquisition frequency (e.g., frames or images acquired per unit time); control of the resolution and/or formatting applicable to the imaging (e.g., total pixels per image or frame, and/or the number of lines per image or frame and the number of pixels per line); control of any pre-processing of acquired image data (e.g., imager noise reduction, contrast control, etc.); and/or, control or selection of other imaging parameters.

In embodiments that include processing capabilities, such processing capabilities may be implemented so as to execute, or cause to be executed, one or more sets of computer-executable instructions on one or more non-transitory computer-readable mediums implementing one or more image processing technologies (such example instruction set(s) herein sometimes referred to by the term "image processing software"). In example embodiments, such image processing software includes image processing technologies directed to processing, analyzing, and otherwise extracting information from the one or more sequences of images acquired with respect to one or more performance tests, such information yielding outputs enabling provision of test results and, ultimately, to enable assessment of athletic rating(s) or score(s), as described herein. In example embodiments, such image processing software may implement one or more technologies, including, e.g., any of various technologies of or relating to computer vision. In example embodiments, such image processing software may implement one or more image processing technologies sometimes referenced, sometimes among other terms, as: sequential frame analysis; sequential image analysis; image sequence analysis; video sequence analysis; stixel motion analysis, optical flow analysis; motion vector analysis; frame motion analysis; motion estimation; feature-based motion estimation; motion detection; change detection; frame differencing; sequential image differencing; segmentation; feature (based) segmentation; object segmentation; color segmentation; intensity segmentation; motion (based) segmentation; change detection segmentation; feature extraction; object recognition; pattern recognition; pattern matching; position estimation; background subtraction; image filtering; and global motion detection/removal (e.g., toward negating ego-motion). It is understood that the foregoing technologies list is not exhaustive. It is understood that the foregoing technologies list may include one or more generic among respective species, and/or components of either. It is understood that the foregoing technologies list may include one or more terms for the same, or substantially the same, or overlapping, technologies. It is understood that, in any employed image processing software, output(s) of any first of such listed technologies may be input(s) for such first or one or more second listed technology and, in turn, output(s) from such second listed technology or technologies may be input(s) for such second listed technologies or such first listed technology, in one or more iterations/recursions/updates. It is also understood that such software, supporting such technologies, may be configured to employ a priori knowledge of the performance test (e.g., test elements, test components, athlete height and other characteristics, anticipated test duration(s), etc.) so as to enhance both acquisition of imaging sequences (e.g., via sufficiently early start, and sufficiently late termination, of acquisition relative to the conduct of the performance test) and analysis of imaging as described herein (e.g., to advance segmentation/detection/motion estimation among objects, including in phases among objects and sub-objects, such as, in a first phase, analysis as to general movement, such as of the athlete's body and, in a second phase, analysis of specific or relative movement of/among the athlete's body, head, torso, arms, legs, etc.). It is also understood that any image processing technologies generally provides for processing of (i) still images (individually or as some set or sequence), (ii) video or videos (e.g., plural video clips, such clips having a known relationship there among in re a performance test); and/or (iii) any combination of still image(s), video, and/or videos. (Any such processing, such as via any such image processing technologies, may sometimes be referred to herein by the term "image processing".)

In example embodiments, such processing capabilities executing image processing software may be implemented so as to process, or cause to be processed (e.g., via the device's one or more operating system(s) or embedded software instruction sets), one or more sequences of images acquired with respect to one or more performance tests toward yielding outputs for enabling provision of test results for one or more such performance tests. In various example embodiments, processing capabilities executing image processing software may be implemented so as to process, or cause to be processed (e.g., via the device's one or more operating system(s) or embedded software instruction sets), one or more sequences of images acquired with respect to one or more performance tests, wherein such processing may be directed to one or more of the following operations, e.g.: (i) identifying images associated with the athlete's test start and test completion, as same are described herein (e.g., for test start, an image corresponding to the athlete's first movement or substantial movement, or to a test element changing state (e.g., a ball is released); and, for test completion, an image corresponding to the athlete's interaction with a test element (e.g., crossing a line) or a specific test element exhibiting a predetermined state change (e.g., a thrown ball landing)); (ii) detecting, confirming and/or monitoring test elements, via imaging (e.g., confirming arrangement of cones at proper locations and separations; confirming proper area properties, such as levelness and absence of obstacles, ambient conditions, etc.); (iii) identifying, detecting, confirming and/or monitoring test components, via imaging (e.g., confirming the athlete assumes a prescribed, initial position and, in the initial position, the athlete remains motionlessness or substantially motionlessness for a prescribed time prior to test start; confirming athlete form, such as via relative positioning or orientation among two or more body parts before, at test start, or during conduct of, a test; confirming relative positioning or orientation of the athlete's body or specified body part(s) relative to a test element before, at test start, or during conduct of, a test); (iv) detecting, measuring and acting on fouls (e.g., detecting consequential and/or non-consequential fouls), as described herein; (v) detecting, estimating and otherwise addressing aberrant motion of imaging objects (e.g., aberrant motion caused by physical movement of the portable electronic device's image acquisition capabilities); and/or (v) detecting improper positioning of the portable electronic device 724A, 724B in the employ of its image acquisition capabilities respecting a performance test. It is understood that, in some example embodiments, processing capabilities executing image processing software may be implemented so as to exclude any one or more of the foregoing operations, including all of the foregoing operations, or may include any one or more of the foregoing operations in combination with one or more alternative or additional operations.

In embodiments that include processing capabilities, such processing capabilities may be implemented so as to execute, or cause to be executed, one or more sets of computer-executable instructions on one or more non-transitory computer-readable mediums implementing one or more athleticism processing technologies (such instruction set(s) herein sometimes referred to by the term "athleticism processing software"). Such processing capabilities, executing such athleticism processing software, may be implemented to provide, from the outputs of the image processing software, either/both test results for one or more such performance tests and athleticism rating(s), as described herein. In example embodiments, based on the image processing software detecting images associated, respectively with test start and test completion in the conduct of a performance test, the athleticism processing software may be implemented to identify the number of images from the test start to the test completion and, based on the acquisition frequency, calculate test results for such conduct as an elapsed time. In example embodiments, based on the image processing software detecting images associated, respectively with test milestones arising in the conduct of a performance test, the athleticism processing software may be implemented to identify the number of images from the test start to one or more selected test milestones, from any selected test milestone to any other selected test milestones, and/or from any one or more selected test milestones to the test completion; and, based on the acquisition frequency, calculate test results for such conduct as an elapsed time. In example embodiments, based on the image processing software detecting images associated, respectively with test milestones arising in the conduct of a performance test, the athleticism processing software may be implemented to images associated with any test milestone, or among selected test milestones, or among any selected test milestone and test start and/or test completion, such image processing being directed, e.g., to identify issues of form, or to identify opportunities to improve performance as to test component(s), or to otherwise enhance performance, such as for coaching, whether for self-coaching or for assistance from a coach, trainer or otherwise. Such image processing and analysis as to form, e.g., may be directed to identifying, confirming, assessing or otherwise analyzing, as to the athlete's body or body parts, relative positioning or orientation among two or more body parts, or positioning or orientation of the body or body part(s) relative to one or more test elements, e.g., in or among test milestones, test start and/or test completion.

In example embodiments, whether test results are applied individually and/or in various combinations, the athleticism processing software may implement, invoke, or otherwise enable an analytical framework toward obtaining an athleticism rating or score. In example embodiments, the athleticism processing software may implement, invoke, or otherwise enable an analytical framework that employs statistical analysis techniques as described herein, toward obtaining an athletic rating or score, including, e.g., an athletic rating or score that is related to data associated with a universe of athletes.

It is understood that, in one or more of the example embodiments described herein that employ a portable electronic device 724, such example embodiments may be implemented to employ, additionally or alternatively, device(s) other than a portable electronic device 724. It is also understood that, as to one or more of the example embodiments described herein, a portable device 724 may be implemented via general purpose architecture (i.e., hardware, software, etc. toward supporting operations different from, in additional to, or potentially in the absence of the imaging-directed operations described herein), or via an application specific architecture (i.e., hardware, software, etc. toward supporting only the operations described herein), or via another approach so that the device enables the operations described herein by means of some combination with one or more other devices. It is also understood that, as to one or more of the example embodiments describing processing herein, such processing may be variously executed, including, as examples: (i) via a portable electronic device 724 (e.g., via such device's internal processing capabilities); (ii) among portable electronic devices 724 (e.g., via communications and/or networking capabilities); (iii) among one or more portable electronic devices 724 in combination with one or more processing capabilities external to any such device 724; (iv) via processing capabilities external to any such device 724 (e.g., processing capabilities provided in association with one or more sensors, or by means of an athlete's device other than device 724, or through one or more remote processing center(s), or via cloud services), any one or more of which may be accessed via, a.o., an athlete's BAN, PAN, LAN or WAN; or (iv) at any time and over time, by any one of these, or among any combination of these (e.g., as arbitrated respecting and otherwise responsive to, a.o., processing volume, time constraints, competing processing constraints/priorities, power/energy demands/capacities, processing power, etc.).

Figure 9:
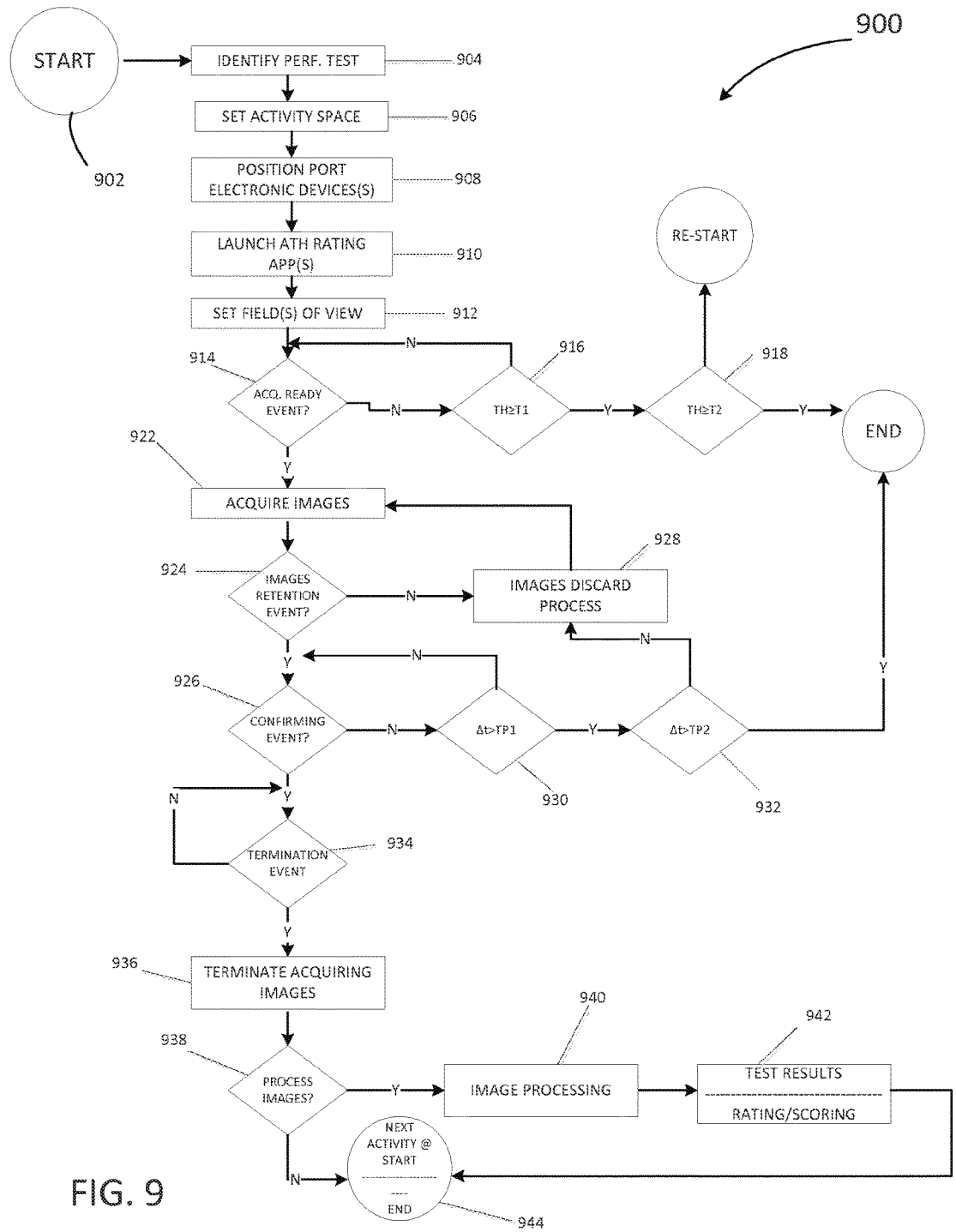
FIG. 9 is a flowchart of an example method that may be implemented to generate an athleticism rating using imaging data in accordance with certain embodiments

Referring to FIG. 9, an exemplary method 900 is illustrated for generating an athleticism rating(s) or score(s), via imaging. As described herein, an athleticism rating or score may be generated for a particular athlete in association with a defined sport (e.g., basketball), and any such athleticism rating or score may then be used, for example, to recognize athleticism of an individual and/or to compare athletes.

At step 902, labeled "Start", the method may be initiated. As an example, the method may be initiated by, e.g., an athlete electing to conduct a performance test. As another example, the method may be initiated iteratively, including, as examples: (i) if the athlete elects to conduct, in series, a battery of performance tests; (ii) as to any performance test, plural iterations of the test are prescribed; (iii) from images acquired during conduct of any performance test, image processing detects a foul, or other circumstances that negates the test and motivates starting anew; and/or (iv) an improper condition is detected (e.g., a tail wind when a sprinting performance test is anticipated), so as to motivate starting anew. In example embodiments, the athlete may so elect with or without employing any device 724 or otherwise. That is, the athlete may so elect by committing to conduct performance tests.

At step 904, a performance test may be identified. In example embodiments, the athlete may identify a performance test without aid of any device. In other example embodiments, the athlete may employ a portable electronic device 724 (e.g., having a display and executing computer-executable instructions on a non-transitory computer-readable medium (e.g. mobile software application(s)) directed to an athleticism rating(s) method), whereby the identification may be via a graphic user interface. Such graphic user interface may employ any of various user interface facilities (e.g., menus) to support identification, including, as examples, displaying supported tests so as to enable the athlete to select there among, displaying tests by sport), displaying tests as batteries (by sport), displaying the current test in a series of tests so as to guide the athlete (e.g., through a battery of tests), displaying the tests that the athlete has previously conducted or indicated interest in conducting, and the like. In example embodiments, in this step 904, the athlete may reject, select or confirm a performance test.

At step 906, the activity space may be set. In example embodiments, the athlete (alone or with assistance) may physically establish, deploy, obtain or otherwise set up the activity space, including as to any one or more of the test's area, boundary, equipment or other prescribed test elements. In example embodiments, the athlete may be enabled to do so via use of plural device(s) 724, or via use of the device(s) 724 in combination with, or via employ of, associated mechanisms, which mechanisms may or may not be electronic in nature. Electronic mechanisms may include or support ranging and orientation capabilities, including via compass, signal strength, laser ranging, or other facilities. Non-electronic mechanisms may include or support ranging and orientation capabilities via having defined size or markings. As to use of electronic mechanisms and/or plural devices 724, the devices 724 and electronic mechanisms may coordinate to determine distances via signal strength metering or other ranging there between, and orientation via, e.g., compassing. As to use of the non-electronic mechanisms, the devices 724 may determine distances and orientations by imaging, i.e., the ratio of imaged to actual size of the non-electronic mechanism(s) at candidate location(s), such locations oriented via, e.g., the device's compass.

At step 908, portable electronic device(s) 724 are arranged/positioned for image acquisition. As described herein, such device(s) may be arranged via various mounts or by being hand-held (e.g., by a person selected by the athlete). In this step, such device(s) may be positioned in association with the area/boundary of the activity space. Such positioning may be preliminary, in that the positioning may be adjusted to improve imaging acquisition (e.g., toward positioning the activity space in the imaging foreground 732, as described herein, including with respect to step 912 below).

At step 910, as to example embodiments employing a portable electronic device 724 that executes, or causes to be executed, one or more sets of software instructions, one or more of such instruction set(s) may be launched. In example embodiments, such instructions set(s) are directed to supporting athletic rating(s), as described herein. In example embodiments, at step 910, launch may be directed to one or more of image acquisition software, image processing software, and/or athleticism processing software, alone or in combination, including, in combination with one or more of, e.g., other mobile software application(s), and/or embedded applications, and/or operating system(s). In example embodiments, such image acquisition software, image processing software, and/or athleticism processing software may be integrated (e.g., as an athleticism rating "app").

At step 910, as to example embodiments employing a portable electronic device 724, such launch may be variously provided. In an example embodiment wherein the device 724 is implemented via general purpose architecture (e.g., as a smart phone), launch may be provided, e.g., via an athlete (or assistant) touching an icon on a touch screen display, which icon represents the applicable software. In an example embodiment wherein the device 724 is implemented via an application specific architecture, launch may be provided, e.g., when an athlete (or assistant) powers on the device. In either case, launch via step 910 may be omitted if, at step 904, the athlete identified the test via the device 724, as described therein.

At step 912, the field of view is set for image acquisition as to the activity space. In example embodiments wherein image acquisition capabilities are provided via portable electronic device(s) 724, the athlete may arrange/position portable device(s) 724 whereby the field of view 734 is directed to cover some or all of the activity space associated with a respective performance test, as described herein.

In so arranging/positioning device(s) 724 as to field of view, however, device 724 may be arranged/positioned at a distance from the activity space 700 which distance is sufficiently large as to risk one or more imaged objects (e.g., the imaging sequence's object that corresponds to the athlete) being insufficiently imaged for proper image processing. Other positioning, arrangement or other physical staging issues may also arise, including, as examples: (i) positioning that introduces lighting issues (e.g., sun or other bright light, or shadows or other low light, or other lighting that may impede proper image acquisition); (ii) positioning sufficiently proximate to or in the activity space so as to risk one or more imaged objects not being acquired at all or not fully acquired (e.g., although detection of the athlete's kneeling is sought, proximate positioning may cause imaging to omit objects corresponding to the athlete's knees); (iii) arrangement(s) in which camera movement is substantial, or excessively high (e.g., as to a hand-held imaging device, image motions sourced from device movement may be substantially or overly difficult to remove or otherwise address); and/or (iv) circumstances implicating excessive or overly confusing motion present in the sequence of images (e.g., besides the athlete, other active persons are in the field of view, particularly in the foreground of the activity space, in sufficient number and/or at sufficient activity level(s) as to impede image processing or confidence therein).

Responsive to issues arising from positioning, arrangement or otherwise relating to physically staging the device with respect to image acquisition, example embodiments, at step 912, may implement pre-test image processing, i.e., toward one or more of: detecting any imaging issues; characterizing the issues; notifying the athlete of the issues; suggesting potential solutions or other means to address the issues; suspending or terminating next steps in operations, including until some or all issue(s) are resolved or sufficiently resolved; iterating any one or more of these; and/or shutting down. As described herein, in example embodiments, the device 724 may suggest re-positioning of the device, both as to distance In example embodiments, at step 912 or other pre-test step, ambient conditions may be detected, analyzed (e.g., against test elements) and acted upon, as described herein. Such ambient conditions may be detected via device(s) 724, including via, e.g., (i) sensors, whether such sensors are internal to device(s) 724 or are external thereto, such as integrated into the athletes apparel, footwear or accessories or provided in other devices within the athlete's instant BAN, PAN, or LAN; (ii) data sources, which data sources may be accessible to the device(s) 724 based on LAN or WAN (e.g., where device(s) 724 comprise a smart phone, weather service entities may provide current local conditions via cellular or Wi-Fi connectivity, or the athletic rating software may include feature(s)/function(s) enabling such data to be obtained. In example embodiments, ambient conditions may be analyzed and acted upon by, a.o. possibilities, precluding or voiding a test, or informing a change in the setup of the activity space (e.g., re-positioning the test elements so that a sprint is run with wind directed perpendicular to the running lane).

At decision 914, example embodiments may implement an "acquisition ready" event test. In such step 914, if an acquisition ready event is or has been detected, image acquisition will proceed. If such ready event is not or has not been detected, image acquisition will not proceed. In the latter case, example embodiments may provide for the test to be repeated until a ready event is detected. Other example embodiments may provide for the test to repeated until one or more configured threshold(s) are met or exceeded, e.g., number of repetitions, a timer expires (e.g., starting from launch or other reference), or otherwise. Such other example embodiments may provide for (i) repetition(s) of any of the foregoing steps, or components of the foregoing steps (e.g., identification of a performance test, or confirmation of a previously identified performance test, or pre-test image processing, or ambient conditions detection), or (ii) ending operations, or (iii) having repetitions subject to a first threshold (T1 at decision 916) and re-starting or ending operations subject to a second such threshold (T2 at decision 918). A re-start may include, as examples, notification to the athlete via a device's output/notification capabilities (e.g., a visible warning signal, such as via a LED light; a warning screen splashed on the display; an audible warning signal sounded by speaker(s), or a combination of these). Alternatively, the process may terminate if the threshold is larger than T2 at decision 918 (e.g., see element 920).

In example embodiments, an "acquisition ready" event may be variously implemented. As examples, a ready event may be implemented to be, as examples: (i) properly concluding any of the steps 904-912, or components thereof; (ii) properly re-positioning so as to enable image processing; (iii) engaging prescribed input/control capabilities of device(s) 724 (e.g., pushing a prescribed physical or logical button, or articulating a prescribed voice command as to voice input controls), including via a device 724 that may be retained by the athlete (e.g., device 112 of FIG. 1); and/or (iv) performing (by the athlete or for the athlete, such as by an assistant) prescribed act(s), such act(s) being amenable for detection via image acquisition or data acquisition capabilities (e.g., exhibiting a prescribed body gesture for reception via the image acquisition capabilities, or issuing a prescribed gesture via sensors embedded in apparel, footwear, and/or accessories).

At step 922, images may be acquired. As described herein, such images may be acquired variously. In example embodiments, generally, image acquisition is subject to parameters which may be configured so as to enable, enhance, optimize or otherwise provide for image processing for the purposes described herein. In example embodiments as described herein, images may be acquired via one or plural devices 724. As an example of plural devices 724, two devices are employed, wherein (i) such devices are calibrated for operation together (e.g., via known calibration approaches), so that (ii) one device 724 may acquire images associated with test start, and (iii) a second device 724 may acquire images associated with test completion. As another example employing two devices 724, both devices 724 may capture test start and/or test completion, whereby the images from each may be combined, in whole or in part, or otherwise, towards obtaining enhanced image processing and, thereby, enhanced assessments of initiation image and/or completion image (and/or, through shutter offsets, enhanced timing precision) and, in turn, enhanced test results and athleticism rating(s).

At decision 924, example embodiments may implement an "images retention" event test. At decision 924, if an images retention event is or has been detected, image acquisition operations continue, and operations flow, e.g., to decision 926. If such event is not or has not been detected, image acquisition operations continue, but example embodiments may implement an image discard process 928.

In example embodiments, an images retention event may be implemented so as to enable acquisition of images in anticipation of upcoming test start for a performance test, while also providing, e.g., if test start is subject to delay, retention of a reasonable number of images (e.g., so as to preserve image storage space for relevant images). As an example, if image acquisition is proceeding, but the athlete has not yet entered the activity space, images retention may not be merited. As another example, if image acquisition is proceeding and the athlete has entered the activity space, but not progressing toward initiation of performance test images, then retention may not be merited. As another example, if images acquisition is proceeding and the athlete has not only entered the activity space, but also is progressing toward initiation of performance test conduct, images retention may be merited.

An images retention event may be variously implemented. In example embodiments, an images retention event may be implemented to be or to be associated with, as examples: (i) the athlete engaging (or having engaged by an assistant) prescribed input/control capabilities of device(s) 724 (e.g., pushing a prescribed physical or logical button, or articulating a prescribed voice command as to voice input controls), including via a device 724 that may be retained by the athlete (e.g., portable device 112 of FIG. 1); (ii) the athlete performing (or having performed by an assistant) prescribed act(s), such act(s) being amenable for detection via image acquisition or data acquisition capabilities (e.g., exhibiting a prescribed body gesture for reception via the image acquisition capabilities, or issuing a prescribed gesture via sensors embedded in apparel, footwear, and/or accessories); and/or (iii) the athlete preparing in the activity space to conduct a performance test, which conduct preparation may be amenable to detection by image acquisition capabilities.

As to conduct preparation as an images retention event, example embodiments may be implemented to detect any/selected such events via image processing. In configuring image processing for such detection, understood is that the athlete is preparing in the activity space and, as such, that acquired images may be anticipated to include object(s) corresponding to the athlete, and that at least such object(s) may exhibit motion(s) among images, e.g., from image to image in the sequence. With such understandings, an images retention event may be deemed to have occurred if, as an example, motion is detected that satisfies (e.g., meets, or exceeds) a selected images retention threshold. In this example approach, such detection may assess motion across a selected number of consecutive images in a sequence, or may be applied as to a selected number of non-consecutive images in a sequence, or otherwise.

As to prescribed act(s), example embodiments may be implemented in which such act(s) include one or more test components. As examples, such act(s) may be an "initial position" (as described hereinabove), or may be such "initial position" combined with preceding or subsequent athlete activity. To illustrate, an arrowhead agility performance test, as described herein, may include, among other test components serving as or to formulate prescribed act(s) both (i) a prescribed stance as an initial position and (ii) a prescribed period of motionlessness or substantial motionlessness in such stance prior to test start. As another illustration, a kneeling power ball chest launch performance test, as described herein, may include, among other test components serving as or to formulate prescribed act(s), both (i) a prescribed, kneeling stance as an initial position and (ii) a prescribed period of motionless or substantially motionless in such stance prior to test start.

For an images event retention test wherein selected test component(s) serve to signal the event, example embodiments are implemented toward detecting such test components and, upon such detection, enabling operations to proceed. In configuring image processing for such detection, understood is that the athlete is preparing in the activity space and, as such, that acquired images may be anticipated to include object(s) corresponding to the athlete, and that at least such object(s) may exhibit motions among images, e.g., from image to image in the sequence. With such understandings and employing image processing, an images retention event may be deemed to have occurred if, as an example, motion of the sequence is detected to approach or pass a selected threshold (e.g., pass below a low threshold, as such motion value may follow from or be associated with the prescribed motionlessness associated with an "initial position"). Further to the above, an images retention event may be deemed to have occurred if, as an example, motion in the sequence is detected not only to approach or pass a selected threshold, but also to be sustained at or near, or otherwise within some range thereabout (e.g., for a time period relating to the prescribed period of athlete motionlessness in the "initial position"). In this example approach, such detection may be implemented in various ways, including, as examples, to assess motion across a selected number of consecutive images in a sequence, or may be applied as to a selected number of non-consecutive images in a sequence, or otherwise.

Example embodiments may be implemented to detect an images retention event via a combination of foregoing approaches. As an example, image processing may be employed in such embodiments to detect an images retention event when the motion of the sequence approaches or passes a selected threshold, including, e.g., with the qualification that such motion value is preceded and/or followed by a relatively higher or lower motion value.

In the foregoing example approaches, such detection may or may not be limited to detection of motion as to object(s) corresponding to the athlete (e.g., relevant motion may be that among frames as a whole). As such, images retention event detection may be implemented via image processing at a relatively high level (e.g., via frame differencing).

Under the circumstance wherein an images retention event is not detected, example embodiments may include an image discard process, which process may be variously implemented. As examples, an image discard process may discard (e.g., from image memory) images as follows: (i) discard all images acquired as of a configured step (e.g., that decision 926 or a prior step, such as, e.g., ready event, at step 914); (ii) discard a configured quantity of images (e.g., via a number of images, or as to a percentage of the total number of images, with such number or percentage being determined via various understandings, estimates or other factors, including, e.g., the acquisition frequency and typical time periods that may be associated with activities prefatory to performance test conduct); or (iii) discard a calculated number of images (e.g., based on image memory size, image acquisition time, image acquisition frequency, image resolution, number of imagers, estimated imaging durations, safety margins, etc.). In example embodiments, an image discard process discards images that precede images of potential relevance to an images retention event. In example embodiments, an image discard process protects images that are potentially relevant to detection of an images retention event, e.g., by not discarding at all, or by preserving in a buffer, e.g., for a configured time.

From the images retention event, operations flow to a "confirming" event test, at decision 926. If a confirming event is or has been detected, image acquisition continues, and operations flow, e.g., to decision 934. If such confirming event is not or has not been detected, image acquisition continues, and operations flow to a standby process, at decisions 930, 932.

In example embodiments, a standby process may be various implemented. An example standby process is depicted in FIG. 9, via decisions 930 and 932. At decision 930, if a confirming event is not or has not been detected, a first time condition may be tested, which time condition may be implemented by comparing a timer to a first time period threshold (TP1). At decision 932, if a confirming event is not or has not been detected, a second time condition may be tested, which time condition may be implemented by comparing a timer to a second time period threshold (TP2). The first and second time conditions may or may not share either or both the same timer and/or the same time period threshold. The first and/or second timer may be started (or re-started), as examples: (i) upon detection of the images retention event; (ii) upon initiation of image acquisition for the performance test; or (ii) upon some other event or via some other configuration (e.g., trigger, cue, etc.). The first timer may be started concurrently with one of the foregoing, while the second timer may be started with the same or another. The time period thresholds TP1 and TP2 may be variously configured, including responsive to one or more of: the available image memory, the image acquisition frequency, the image resolution, the anticipated time duration for conducting the performance test, and/or other parameters/conditions. In example embodiments, TP2 is greater than TP1.

In the example standby process depicted in FIG. 9, at decision 930, if the first timer fails to satisfy (e.g., meet or exceed) the first time period threshold TP1, operations return to the confirming event of decision 926 decision 926. At decision 930, if the first timer satisfies TP1, operations flow to decision 932. At decision 932, if the second timer fails to satisfy (e.g., meet or exceed) the second time period threshold TP2, operations flow: to the image discard process, at step 928 and, from the image discard process, to the acquire images process, at step 922, and then to the images retention event test, at decision 924. As such, if the first timer satisfies TP1 without the second timer satisfying TP2, images may be discarded. Moreover, the previously-detected existing images retention event becomes ineffective (i.e., as if that images retention event had not been detected), such that the images retention event test is renewed. At decision 932, if the second timer satisfies the second time period threshold TP2, operations end.

In example embodiments, a confirming event may be implemented so as to enable continued acquisition of images in anticipation of imminent athlete initiation of a performance test, while also providing e.g., if such initiation is subject to delay, retention of a reasonable number of images (e.g., so as to preserve image storage space for relevant images). In example embodiments, a confirming event follows an images retention event, which images retention event may be detected, as previously described, via image processing directed to detecting, e.g., athlete activity prefatory to performance test conduct. However, after detection of an images retention event based, the athlete may or may not initiate the performance test, whether at all or timely. Accordingly, in example embodiments, a confirming event may be implemented, such as to enforce a level of discipline as to operations, including as to the athlete.

A confirming event may be variously implemented. In example embodiments, a confirming event may be implemented to be, or to be associated with, as examples: (i) the athlete engaging (or having engaged by an assistant) prescribed input/control capabilities of device(s) 724 (e.g., pushing a prescribed physical or logical button, or articulating a prescribed voice command as to voice input controls), including via a device 724 that may be retained by the athlete (e.g., portable device 112 of FIG. 1); (ii) the athlete performing (or having performed by an assistant) prescribed act(s), such act(s) being amenable for detection via image acquisition or data acquisition capabilities (e.g., exhibiting a prescribed body gesture for reception via the image acquisition capabilities, or issuing a prescribed gesture via sensors embedded in apparel, footwear, and/or accessories); (iii) the athlete preparing in the activity space to conduct a performance test; (iv) the athlete initiating conduct of a performance test (e.g., a "test start", as described herein) or otherwise conducting a performance test; and/or (v) a combination of one or more of these.

The descriptions herein respecting image processing to detect an images retention event inform image processing for detecting a confirming event. In image processing to detect a confirming event, it is understood not only that the athlete is present in, and at least at times moving in, the activity space, but also that the athlete may imminently initiate, or have initiated, performance test conduct, e.g., test start. As such, acquired images may be anticipated to include object(s) corresponding to the athlete, which object(s) exhibit motions among images in imaging sequence. With such understandings, a confirming event may be deemed to have occurred if, as an example, motion in the imaging sequence is detected that satisfies (e.g., meets or exceeds) a selected confirming event threshold. In example embodiments, such confirming event threshold may be greater than the images retention event threshold, which greater value is congruent with detection that may include test start, rather than initial position/motionlessness (e.g., greater athlete movement tends to correspond to greater object motion in the imaging of that movement).

As to the athlete performing prescribed act(s) as a confirming event, example embodiments may be implemented in which the prescribed act(s) are or are formulated using one or more test components. In example embodiments, such act(s) may include, e.g.: "test start"; other test component(s) implicating athlete movement; "initial position" (as previously described); or combinations of one or more of these. So employing any such test components in formulating such act(s), example embodiments may be implemented to detect a confirming event via image processing, including, e.g., image processing informed by the descriptions as to detecting an images retention event.

If a confirming event is identified via image processing's detection of a test start, such detection may, in effect, identify a specific image of the imaging sequence that corresponds to the athlete's initiation of the performance test (such specific image sometimes referred to herein as an "initiation image"). Similarly, such confirming event detection may result from means other than image processing (e.g., via data acquisition, communication and/or processing capabilities, of or among devices(s) 724 and/or sensors), which detection may tag a specific image, such specific image having been acquired at a time corresponding to such detection. Moreover, such confirming event detection may result from a combination of such means with the image processing detection. Such specific image(s) may, in some circumstances, be one of two images that bracket the initiation image (e.g., if the image data indicates that the athlete's initiation of the performance test occurred between two consecutive images in the imaging sequence), such that the initiation image may be resolved via interpolation of two images. In example embodiments, such specific image(s) may be treated as placeholder(s) for further image processing toward concluding on an initiation image, e.g. further image processing employing more powerful processing methods in order to determine the initiation image.

In some example embodiments, an images retention event test, as in decision 924, may be omitted in favor of, or may otherwise be combined in, a confirming event test, as in decision 926.

From the confirming event test, operations may flow to a termination event test, at decision 934. If a termination event is or has been detected, operations may flow to the terminate acquired images process, at step 936. In example embodiments, if a termination event is not or has not been detected, image acquisition continues and will continue until a termination event is detected. In other example embodiments, if a termination event is not or has not been detected, operations may be implemented to flow to a standby process (not shown). Any termination event standby process may be structured the same as, or similar, to the confirming event standby process shown at decisions 930 and 932. As an example, a termination event standby process may be implemented based on a max time period threshold (e.g., a time during which the test should be completed, such time period being configured from a priori knowledge of the performance test and/or from a universe of historical data assembled from athletes having (properly) conducted such test). In such example, the termination event standby process includes a timer that is compared to the max time period threshold, such that, if no termination event is or has been detected when the timer satisfies the threshold, operations flow to the terminate acquired images process, at step 936.

In example embodiments, a termination event may be implemented so as to enable discontinuation of image acquisition so that unnecessary or irrelevant images are not acquired. In example embodiments, image acquisition may be terminated following the athlete's completion of the test.

A termination event may be variously implemented. In example embodiments, a termination event may be implemented to be, or to be associated with, as examples: (i) the athlete engaging (or having engaged by an assistant) prescribed input/control capabilities of device(s) 724 (e.g., pushing a prescribed physical or logical button, or articulating a prescribed voice command as to voice input controls), including via a device 724 that may be retained by the athlete (e.g., portable device 112 of FIG. 1); (ii) the athlete performing (or having performed by an assistant) prescribed act(s), such act(s) being amenable for detection via image acquisition or data acquisition capabilities (e.g., exhibiting a prescribed body gesture for reception via the image acquisition capabilities, or issuing a prescribed gesture via sensors embedded in apparel, footwear, and/or accessories); (iii) the athlete or equipment, or both, reaching or passing prescribed location(s) in or as to the activity space (e.g., relative to one or more test elements), as determined via data acquired from sensors embedded in the equipment, in the athlete's apparel, footwear, and/or accessories, or in a device 724 carried on the athlete, including in combination(s) thereof, and/or in combination(s) with other devices 724 and/or with other sensors, transceivers or other electronic devices, within the athlete's instant BAN, PAN, or LAN, such location(s) being determined via any of various means, including GPS, AGPS, signaling, signal strength measures, or otherwise; (iv) the athlete completing conduct, or otherwise causing completion, of a performance test via, e.g., the athlete's completion of a test component (e.g., completing a number of repetitions of a drill over a finite, prescribed time), the athlete's interaction with a test element (e.g., crossing a finish line) or a test element—acted on by the athlete—achieving a prescribed state change (e.g., an athlete-thrown ball transitioning from flight to landing), as described herein (e.g., such completion sometimes referred to herein by the term "test completion", as previously described); (v) the athlete physically departing the activity space, or remaining in the activity space, but with no physical activity relevant to the performance test; and/or (vi) a combination of one or more of these.

The descriptions herein respecting image processing to detect an images retention event and/or a confirming event inform image processing for detecting a termination event. In image processing to detect a termination event, it is understood not only (i) that the athlete has been present in, and at least at times has been physically moving in, the activity space, but also (ii) that the athlete will complete conduct of the performance test, or that the test will otherwise be completed (e.g., test completion) and, in turn, that the athlete's physical movement within the activity space may decline or end (e.g., at least as to the test). As well, the nature of the performance test is known, including any equipment employed (including its size, shape, anticipated location(s)), any relevant interactions between the athlete and the equipment (and the relative timing within the test) and anticipated state changes as to the equipment (e.g., including movements thereof, and changes in or termination of such movement(s)). As such, acquired images may be anticipated to include object(s) corresponding to the athlete and/or the equipment, at least some of which object(s) will exhibit motion(s) among images, e.g., from image to image in the sequence. With such understandings, a termination event may be deemed to have occurred, as an example, if objects and objects' motion(s) are detected which correspond to athlete activity and/or equipment activity that is consistent with completion of the performance test. Examples include image processing may detect, e.g.: (i) a test completion (e.g., the athlete having crossed the start-stop line 708, such as, e.g., any body part crossing a vertical plane associated with the cone(s) physically demarcating such line 708, whether such lens is positioned on such line or remote therefrom and/or at an angle thereto; (ii) an athlete activity directed to departure from the activity space, or to movement into and/or loitering in the periphery of the activity space, including an absence or substantial absence thereof (e.g., any of which alone or together may indicate that the athlete has ceased or substantially ceased movement and/or conduct of the test); (iii) and/or, a (final) state change for equipment (e.g., as anticipated for the test as to known equipment).

If a termination event is identified via image processing's detection of a test completion, such detection may, in effect, identify a specific image of the imaging sequence that corresponds to the end point of the performance test (such specific image sometimes referred to herein as a "completion image"). Similarly, such termination event detection may result from means other than image processing (e.g., via data acquisition, communication and/or processing capabilities, of or among devices(s) 724 and/or sensors), which detection may tag a specific image, such specific image having been acquired at a time corresponding to such detection. Moreover, such termination event detection may result from a combination of such means with the image processing detection. Such specific image(s) may, in some circumstances, be one of two images that bracket the completion image (e.g., if the image data indicates that the athlete's completion of the performance test occurred between two consecutive images in the imaging sequence), such that the completion image may be resolved via interpolation of two images. In example embodiments, such specific image(s) may, as previously stated respecting an initiation image, be treated as placeholder(s) for further image processing toward concluding on a completion image, e.g. further image processing employing more powerful processing methods in order to determine the completion image.

Responsive to detection of a termination event at decision 934 (or to a termination event standby process), operations flow to a terminate acquired images process, at step 936. In the terminate acquired images process, image acquisition is terminated. Such termination may be variously implemented. In example embodiments, such termination may be effected upon the detection of the termination event. In other example embodiments, such termination may be effected after a configured time period has passed from detection of the termination event (e.g., toward recording additional images relevant or that may be relevant to image processing). Such configured time period may respond to various understandings, estimates or other factors, including, e.g.: time periods associated with the performance test; image memory size; image acquisition frequency; image resolution; number of imagers; safety margins, etc.).

From termination of image acquisition at step 936, operations flow to decision 940, in which a determination is made whether to submit the acquired images to image processing. If the determination at step 936 is not to so submit, operations flow to step 944, at which step operations may be (i) re-started so as to proceed with further performance testing (e.g., to repeat the current performance test for the test's prescribed number of repetitions, or to advance to the next performance test in the battery of tests in which the current performance test resides, or to select a new battery of tests or an individual test), or (ii) ended. If the determination at step 936 is to submit for image processing, operations flow to image processing at step 940, and from imaging processing to a test results/rating/scoring process at step 942.

At step 940, image processing may be performed. In example embodiments, as described herein, image processing may be implemented to detect images associated with one or more of test start, test milestone(s), and/or test completion. As described herein, image processing may yield: an initiation image corresponding to test start; a completion image corresponding to test completion; and/or a milestone image corresponding to each respective test milestone. As described herein, image processing may yield more than one image corresponding to any one or more of test start, test completion and/or a test milestone. That is, image processing may, in some circumstances, yield two images that bracket the physical event, e.g., if the image data indicates that the physical event occurred between two consecutive images in the imaging sequence), in which case, image processing may yield an interpolated image, i.e., an image that resolves the two images.

In example embodiments, image processing may be performed iteratively. As an example, image processing may be implemented so as to be performed in phases among all objects and the object(s) corresponding to the athlete: (i) in a first phase, image processing may analyze as to motion(s) corresponding to all or substantially all physical movement captured in the imaging (e.g., overall motion present in the image data among frames in an image sequence); and (ii) in a second phase, image processing may analyze as to motion(s) corresponding to overall movement of the athlete's body. As another example, image processing may be implemented so as to be performed in phases among the object corresponding to the athlete: (i) in a first phase, image processing may analyze as to motion(s) corresponding to overall movement of the athlete's body and (ii) in a second phase, image processing may analyze as to motion(s) corresponding to movement or relative movement of/among the athlete's head, torso, arms, legs, etc. In either of these foregoing examples, the objects and motions corresponding to the athlete's body, body parts and body movements may be implemented so that such objects and motions are analyzed in combination(s), such as aggregate motion or relative motion, including relative to an object corresponding to test element(s) (e.g., a ball or a start/stop line). As to either of these approaches, image processing may be implemented to address aberrant motion, such as that associated with physical movement of the device's imaging acquisitions capabilities, particularly the device's imaging chip.

In example embodiments, image processing at step 940 (i.e., for purposes of yielding outputs for the test results/rating/scoring process, at step 942) may be implemented so as to be initiated during image acquisition. In such embodiments, such image processing may execute concurrently, or in coordination, with other processes. In such embodiments, for example, image processing may be employed in earlier steps, such as for the confirming event test at decision 926, toward detecting the initiation image thereat, and such as for the termination event test at decision 934, toward detecting the completion image thereat. As described herein, such confirming event test at decision 926 and such termination event test at decision 934 may identify placeholder images as to an initiation image and/or a termination image, including for further image processing toward concluding on an initiation or termination image for test results purposes. In such case, such further image processing may be initiated concurrently with or following such tests, with or without any the termination of image acquisition at step 936. Moreover, such further image processing may employ more powerful processing methods in order to determine the initiation and/or completion image, including the phased approach described above.

Image processing at step 940 may be implemented to admit input from the athlete. As an example, image processing may be implemented via portable electronic device(s) 724, including in connection with a mobile application. Such device executing such mobile application may provide a user interface experience by which the athlete (or an assistant) engages the device's input/control capabilities (e.g., pushing a prescribed physical or logical button, or articulating a prescribed voice command as to voice input controls), so as to provide such input. As an example, via such user interface experience, the athlete may be engaged to review all or part of an image sequence associated with the athlete's performance test conduct, so as to, e.g.: (i) identify irrelevant portions of the imaging, e.g., prefatory and/or post-completion activities, (ii) associate one or more candidate images with one or more of test start, test completion, and/or test milestone(s) (e.g., the athlete selects a frame which the athlete considers to display an image corresponding to the athlete's initiation or completion of the performance test or of any test milestone thereof, and/or (iii) identify object(s) in the image (e.g., via a touch-sensitive display, the athlete may select or circumscribe a piece of equipment and/or the athlete's body or selected body parts, any one or more of which identifications may enhance image processing founded on such object(s)). Toward so engaging the athlete, the user interface experience may display queries, requests, instructions, guidance or other feed forward so as to direct proper/timely input from the athlete.

In example embodiments, image processing at step 940 may yield outputs that are provided to the test results/rating/scoring process, at step 942. Such outputs may include any one or more of the initiation, completion and milestone images (e.g., for display to the athlete or others). Such outputs may also include data that enables measurements, including in format and content, appropriate to measurements provided via the test results/rating/scoring process, at step 942. As an example, such output data may include the frame numbers, frame times, or other frame addressing, any of which may be absolute or against a reference. Such output data may also be provided together with the image acquisition frequency, any time offsets (e.g., shutter offset among plural imagers), or the like. Such output data, via format and content, enables, e.g., the measure of time differences, which time differences may be test results or may enable calculation of test results. As an example, for the arrowhead agility performance test, the image processing output may include the initiation image, the completion image and the image acquisition frequency in frames per second, with the initiation image denoted as frame #F1, the completion image denoted by frame #F2 and the image acquisition frequency denoted as FPS, such that measurement of the elapsed time for the test is the (#F2-#F1)/FPS. In such case, if #FP1=0, #FP2=3000, and FPS=50 fps, the measurement is (3000−0)/50=60 seconds. As another example, for the power ball chest launch performance test, similar outputs may be provided, with the measurement yielding an elapsed time capturing the ball's flight, which elapsed time, together with the balls known weight and the athlete's known profile (height, etc.), may be applied to a predetermined ballistics formula toward measuring distance of the ball's flight.

We claim:

1. A computer-implemented method for determining an athletic attribute of an athlete comprising:
   initiating a first trigger, the first trigger configured to indicate to an athlete to initiate performance of a predefined physical activity;
   responsive to initiating the first trigger, initiating capturing a plurality of sequential images with a first camera;
   determining a first image, within the plurality of sequential images, that correlates to a timing of the initiating of the first trigger;
   automatically associating a trigger flag with the first image;
   processing a plurality of sequential images to identify an initiation image, the processing comprising:
      identifying pixels in the plurality of sequential images that correspond to a specific first body portion of an athlete, wherein the first body portion is selected based upon a predetermined physical activity the athlete is to perform; and
      determining, based upon the identified pixels, whether the pixels are altered between a plurality of images within the plurality of sequential images such that the alteration satisfies a first body portion movement quality threshold;
   determining a reaction value for the athlete based upon a duration between the first image and the initiation image,
      utilizing the initiation image in a determination of at least one performance attribute of the athlete; and
   calculating a rating of the athlete based on the at least one performance attribute.

2. The method of claim 1, further comprising:
   processing at least a portion of the plurality of sequential images to locate completion image comprising image data of the athlete completing the predetermined physical activity; and
   calculating a physical activity duration based upon the initiation image and the completion image.

3. The method of claim 2, wherein the attribute is at least one of: speed, endurance, and combinations thereof.

4. The method of claim 1, wherein the processing of the plurality of sequential images comprises the utilization of an optical flow process.

5. The method of claim 3, wherein an output of the optical flow process is provided as an input to a process comprising:
   providing flow field data comprising a pixel-distance change of an identified object from a first image to a second image; and using the flow field data to identify a specific type of motion of the athlete represented in the plurality of sequential images during performance of the predetermined physical activity.

6. The method of claim 5, further comprising:
using the identified specific type of motion to identify an action comprising at least one of: initiation of the activity, acceleration, velocity, tempo, distance travelled by an object, or completion of the activity.

7. The method of claim 4, wherein a first frame rate between a first set two images within the plurality of sequential images is different than a second frame rate between a second set of images within the plurality of sequential images, the method further comprising:
quantifying an accurate time between the images having the first frame rate and an accurate time between images having the second time frame rate; and
utilizing the accurate time in the optical flow process.

8. The method of claim 1, further comprising:
initiating a second trigger to indicate to the athlete to perform a predefined movement during performance of the physical activity;
determining a second image, of the plurality of images, that correlates to a timing of the second trigger;
associating a second trigger flag with the second image;
associating a third flag with a third image correlating to the athlete performing the predefined movement; and
determining a second reaction value for the athlete based upon the duration between the second image and the third image.

9. The method of claim 1, further comprising:
utilizing the reaction value and the performance attribute in a sport-specific ranking algorithm to obtain a single athletic score for the athlete.

10. The method of claim 1, wherein a first frame rate between a first set of two images between the first image and the initiation image is different than a second frame rate between a second set of two images between the first image and the initiation image, the method further comprising:
accounting for different frame rates when determining the time duration.

11. The method further of claim 1, further comprising:
receiving sensor data from a sensor operatively attached to the athlete during performance of the physical activity; and
utilizing the sensor data to conduct image stabilization upon at least a portion of the plurality of sequential images before identifying the movement quality threshold.

12. The method of claim 1, further comprising:
receiving sensor data from a sensor operatively attached to the athlete during performance of the physical activity; and
utilizing the sensor data in conjunction with an optical flow process to identify at least one of the initiation image and an end image.

13. An apparatus comprising:
one or more processors;
memory storing computer executable instructions that, when executed by the one or more processors, cause the apparatus to:
initiate a first trigger, the first trigger configured to indicate to an athlete to initiate performance of a predefined physical activity;
responsive to initiating the first trigger, initiate capturing a plurality of sequential images with a first camera;
determine a first image, within the plurality of sequential images, that correlates to a timing of the initiating of the first trigger;
automatically associate a trigger flag with the first image;
process a plurality of sequential images to identify an initiation image by:
identifying pixels in the plurality of sequential images that correspond to a specific first body portion of an athlete, wherein the first body portion is selected based upon a predetermined physical activity the athlete is to perform; and
determining, based upon the identified pixels, whether the pixels are altered between a plurality of images within the plurality of sequential images such that the alteration satisfies a first body portion movement quality threshold;
determine a reaction value for the athlete based upon a duration between the first image and the initiation image;
utilize the initiation image in a determination of a performance attribute of the athlete; and
calculate a rating of the athlete based on the performance attribute.

14. The apparatus of claim 13, the memory storing computer executable instructions that, when executed by the one or more processors, cause the apparatus to:
process at least a portion of the plurality of sequential images to locate a completion image comprising image data of the athlete completing the predetermined physical activity; and
calculate a physical activity duration based upon the initiation image and the completion image.

15. The apparatus of claim 14, wherein an output of the optical flow process is provided as an input to a process comprising:
providing flow field data comprising a pixel-distance change of an identified object from a first image to a second image; and
using the flow field data to identify a specific type of motion of the athlete represented in the image data during performance of the predetermined physical activity.

16. The apparatus of claim 15, the memory storing computer executable instructions that, when executed by the one or more processors, cause the apparatus to:
use the identified specific type of motion to identify an action comprising at least one of: initiation of the activity, acceleration, velocity, tempo, distance travelled by an object, or completion of the activity.

17. The apparatus of claim 13, wherein the processing of the plurality of images comprises the utilization of an optical flow process.

18. A system comprising:
a first computing device configured to:
initiate a first trigger, the first trigger configured to indicate to an athlete to initiate performance of a predefined physical activity;
responsive to initiating the first trigger, initiate capturing a plurality of sequential images with a first camera;
determine a first image, within the plurality of sequential images, that correlates to a timing of the initiating of the first trigger;
automatically associate a trigger flag with the first image;

process a plurality of sequential images to identify an initiation image by:
  identifying pixels in the plurality of sequential images that correspond to a specific first body portion of an athlete, wherein the first body portion is selected based upon a predetermined physical activity the athlete is to perform; and
  determining, based upon the identified pixels, whether the pixels are altered between a plurality of images within the plurality of sequential images such that the alteration satisfies a first body portion movement quality threshold;
determine a reaction value for the athlete based upon a duration between the first image and the initiation image;
utilize the initiation image in a determination of a performance attribute of the athlete; and
calculate a rating of the athlete based on the performance attribute; and a second computing device configured to receive the first trigger.

19. The system of claim 18, the first computing device further configured to:
  process at least a portion of the plurality of sequential images to locate a completion image comprising image data of the athlete completing the predetermined physical activity; and
  calculate a physical activity duration based upon the initiation image and the completion image.

20. The system of claim 18, wherein the processing of the plurality of images comprises the utilization of an optical flow process.

* * * * *

UNITED STATES PATENT AND TRADEMARK OFFICE
CERTIFICATE OF CORRECTION

PATENT NO. : 10,121,065 B2
APPLICATION NO. : 14/773946
DATED : November 6, 2018
INVENTOR(S) : Ota et al.

Page 1 of 1

It is certified that error appears in the above-identified patent and that said Letters Patent is hereby corrected as shown below:

In the Claims

Column 54, Claim 2, Line 53:
After "locate", insert --a--

Column 54, Claim 5, Line 63:
Delete "claim 3," and insert --claim 4,--

Column 55, Claim 7, Line 17:
Before "frame", delete "time"

Column 55, Claim 10, Line 41:
Before "duration.", delete "time"

Column 55, Claim 11, Line 42:
After "method", delete "further"

Column 57, Claim 18, Line 19:
After "and", insert --¶--

Signed and Sealed this
First Day of February, 2022

Drew Hirshfeld
*Performing the Functions and Duties of the
Under Secretary of Commerce for Intellectual Property and
Director of the United States Patent and Trademark Office*